US012545909B2

(12) United States Patent
Harper et al.

(10) Patent No.: US 12,545,909 B2
(45) Date of Patent: Feb. 10, 2026

(54) DUX4 RNA SILENCING USING RNA TARGETING CRISPR-CAS13B

(71) Applicant: RESEARCH INSTITUTE AT NATIONWIDE CHILDREN'S HOSPITAL, Columbus, OH (US)

(72) Inventors: Scott Quenton Harper, Powell, OH (US); Afrooz Rashnonejad, Columbus, OH (US)

(73) Assignee: RESEARCH INSTITUTE AT NATIONWIDE CHILDREN'S HOSPITAL, Columbus, OH (US)

( * ) Notice: Subject to any disclaimer, the term of this patent is extended or adjusted under 35 U.S.C. 154(b) by 998 days.

(21) Appl. No.: 17/419,171

(22) PCT Filed: Dec. 31, 2019

(86) PCT No.: PCT/US2019/069048
§ 371 (c)(1),
(2) Date: Jun. 28, 2021

(87) PCT Pub. No.: WO2020/142479
PCT Pub. Date: Jul. 9, 2020

(65) Prior Publication Data
US 2022/0106592 A1 Apr. 7, 2022

Related U.S. Application Data

(60) Provisional application No. 62/786,670, filed on Dec. 31, 2018.

(51) Int. Cl.
| | |
|---|---|
| C12N 15/11 | (2006.01) |
| A61K 31/7105 | (2006.01) |
| A61K 31/713 | (2006.01) |
| A61K 38/46 | (2006.01) |
| A61P 21/00 | (2006.01) |
| C12N 9/22 | (2006.01) |
| C12N 15/86 | (2006.01) |
| C12N 15/90 | (2006.01) |

(52) U.S. Cl.
CPC .......... *C12N 15/11* (2013.01); *A61K 31/7105* (2013.01); *A61K 31/713* (2013.01); *A61K 38/465* (2013.01); *A61P 21/00* (2018.01); *C12N 9/22* (2013.01); *C12N 15/86* (2013.01); *C12N 15/907* (2013.01); *C12N 2310/20* (2017.05); *C12N 2750/14143* (2013.01); *C12N 2800/80* (2013.01)

(58) Field of Classification Search
CPC .......... C12N 15/11; C12N 9/22; C12N 15/86; C12N 15/907; C12N 2310/20; C12N 2750/14143; C12N 2800/80; A61P 21/00; A61K 31/7105; A61K 31/713; A61K 38/465
See application file for complete search history.

(56) References Cited

U.S. PATENT DOCUMENTS

| | | | |
|---|---|---|---|
| 5,173,414 A | 12/1992 | Lebkowski et al. | |
| 5,658,776 A | 8/1997 | Flotte et al. | |
| 5,786,211 A | 7/1998 | Johnson | |
| 5,871,982 A | 2/1999 | Wilson et al. | |
| 6,258,595 B1 | 7/2001 | Gao et al. | |
| 6,566,118 B1 | 5/2003 | Atkinson et al. | |
| 7,282,199 B2 | 10/2007 | Gao et al. | |
| 7,618,814 B2 * | 11/2009 | Bentwich | G16B 20/30 536/24.31 |
| 7,790,449 B2 | 9/2010 | Gao et al. | |
| 9,469,851 B2 | 10/2016 | Harper et al. | |
| 10,865,445 B2 * | 12/2020 | van der Maarel | C12Q 1/6809 |
| 11,180,755 B2 * | 11/2021 | Harper | A61P 21/00 |
| 2005/0228172 A9 * | 10/2005 | Wang | C12Q 1/6883 536/24.3 |
| 2017/0211142 A1 * | 7/2017 | Smargon | G16B 25/00 |
| 2018/0340187 A1 * | 11/2018 | Rodino-Klapac | A01K 67/0276 |
| 2021/0348161 A1 * | 11/2021 | Rodriguez Perales | A61P 35/00 |
| 2024/0026356 A1 * | 1/2024 | Harper | C12N 15/113 |
| 2024/0093191 A1 * | 3/2024 | Saad | A61P 21/00 |

FOREIGN PATENT DOCUMENTS

| | | | | |
|---|---|---|---|---|
| CA | 2826273 A1 * | 8/2012 | | A61P 21/00 |
| WO | 1995/13365 A1 | 5/1995 | | |
| WO | 1995/13392 A1 | 5/1995 | | |

(Continued)

OTHER PUBLICATIONS

Sheng J, Li T-T, Zhang H-H, Xu H-F, Cai X-M, Xu R, Ji Q-Q, Wu Y-M, Huang T and Yang X-J. (2023). CT and MR imaging features of soft tissue rhabdoid tumor: compared with rhabdomyosarcoma in children. Front. Pediatr. 11:1199444. (Year: 2023).*
Abudayyeh et al., RNA targeting with CRISPR-Cas13, Nature, 550(7675):280-4 (2017).
Bosnakovski et al., Muscle pathology from stochastic low level DUX4 expression in an FSHD mouse model, Nature Commun., 8(1):550 (2017).
Carter, Adeno-associated virus vectors, Current Opinions in Biotechnology, 3(5):533-539 (1992).
Chew et al., DUX4 Suppresses MHC Class I to Promote Cancer Immune Evasion and Resistance to Checkpoint Blockade, Developmental Cell., 50(5): 658-71.e7 (2019).
Clark et al., A stable cell line carrying adenovirus-inducible rep and cap genes allows for infectivity titration of adeno-associated virus vectors, Gene. Therapy, 3(12):1124-1132 (1996).

(Continued)

*Primary Examiner* — Janet L Andres
*Assistant Examiner* — Carey Alexander Stuart
(74) *Attorney, Agent, or Firm* — MARSHALL, GERSTEIN & BORUN LLP

(57) ABSTRACT

RNA interference-based nucleic acids encoding double homeobox 4 (DUX4)-encoding guide RNAs (gRNA), or gRNAs that specifically hybridize to a target nucleic acid encoding DUX4 and methods for inhibiting the expression of DUX4 using the gRNAs and Cas13 are provided. The methods have application in the treatment of muscular dystrophies including, but not limited to, facioscapulohumeral muscular dystrophy (FSHD), and cancer, and other disorders associated with elevated DUX4 expression.

22 Claims, 16 Drawing Sheets

Specification includes a Sequence Listing.

(56) References Cited

FOREIGN PATENT DOCUMENTS

| WO | 1996/17947 | A1 | 6/1996 | | |
|---|---|---|---|---|---|
| WO | 1997/06243 | A1 | 2/1997 | | |
| WO | 1997/08298 | A1 | 3/1997 | | |
| WO | 1997/09441 | A2 | 3/1997 | | |
| WO | 1997/21825 | A1 | 6/1997 | | |
| WO | 1998/09657 | A2 | 3/1998 | | |
| WO | 1999/11764 | A2 | 3/1999 | | |
| WO | 2001/83692 | A2 | 11/2001 | | |
| WO | 2013/016352 | A1 | 1/2013 | | |
| WO | 2016/115490 | A1 | 7/2016 | | |
| WO | 2017/070605 | A1 | 4/2017 | | |
| WO | WO-2017/073619 | A1 | 5/2017 | | |
| WO | WO-2018057863 | A1 | * | 3/2018 | ............ A61K 48/00 |
| WO | 2018/170333 | A1 | 9/2018 | | |
| WO | 2018/191388 | A1 | 10/2018 | | |

OTHER PUBLICATIONS

Clark et al., Highly purified recombinant adeno-associated virus vectors are biologically active and free of detectable helper and wild-type viruses, Hum. Gene. Ther., 10(6):1031-1039 (1999).

Cox et al., RNA editing with CRISPR-Cas13, Science, 358(6366):1019-1027 (2017).

Cserjesi et al., Myogenin induces the myocyte-specific enhancer binding factor MEF-2 independently of other muscle-specific gene products, Mol. Cell. Biol., 11(10):4854-4862 (1991).

Davidson et al., Current prospects for RNA interference-based therapies, Nat. Rev. Genet., 12(5):329-40 (2011).

Davidson et al., Viral delivery of recombinant short hairpin RNAs, Methods Enzymol., 392:145-73 (2005).

De et al., High levels of persistent expression of alpha1-antitrypsin mediated by the nonhuman primate serotype rh.10 adeno-associated virus despite preexisting immunity to common human adeno-associated viruses, Mol. Ther., 13(1):67-76 (2006).

Gao et al., Clades of Adeno-associated Viruses are Widely Disseminated in Human Tissues, J. Virol., 78:6381-6388 (2004).

Gao et al., Introducing genes into mammalian cells: Viral vectors. In: Green MR, Sambrook J, editors. Molecular cloning: A laboratory manual, New York: Cold Spring Harbor Laboratory Press, 2:1209-1313 (2012).

Giesige et al., AAV-mediated follistatin gene therapy improves functional outcomes in the TIC-DUX4 mouse model of FSHD, JCI Insight, 3(22):e123538 (2018).

Goyenvalle et al., Rescue of dystrophic muscle through U7 snRNA-mediated exon skipping, Science, 306(5702):1796-9 (2004).

Harper, Progress and challenges in RNA interference therapy for Huntington disease, Arch. Neurol., 66(8):933-8 (2009).

Hermonat et al., Use of adeno-associated virus as a mammalian DNA cloning vector: transduction of neomycin resistance into mammalian tissue culture cells, Proc. Natl. Acad. Sci. U.S.A., 81(20):6466-6470 (1984).

International Application No. PCT/US19/69048, International Preliminary Report on Patentability, mailed Jul. 15, 2021.

International Application No. PCT/US19/69048, International Search Report and Written Opinion, mailed Apr. 9, 2020.

Johnson et al., Muscle creatine kinase sequence elements regulating skeletal and cardiac muscle expression in transgenic mice, Mol. Cell. Biol., 9(8):3393-3399 (1989).

Jones et al., Facioscapulohumeral muscular dystrophy family studies of DUX4 expression: evidence for disease modifiers and a quantitative model of pathogenesis, Human Molecular Genetics, 21(20):4419-30 (2012).

Kunkel et al., Analysis of deletions in DNA from patients with Becker and Duchenne muscular dystrophy, Nature, 322(6074):73-7 (1986).

Kunkel et al., Upstream elements required for efficient transcription of a human U6 RNA gene resemble those of U1 and U2 genes even though a different polymerase is used, Genes Dev., 2(2):196-204 (1988).

Laughlin et al., Cloning of infectious adeno-associated virus genomes in bacterial plasmids, Gene., 23(1):65-73 (1983).

Lebkowski et al., Adeno-associated virus: a vector system for efficient introduction and integration of DNA into a variety of mammalian cell types, Mol. Cell. Biol., 8:3988-96 (1988).

Levy et al., Therapeutic exon 'switching' for dysferlinopathies?, Eur. J. Hum. Genet., 18(9):969-70 (2010).

Mader et al., A steroid-inducible promoter for the controlled overexpression of cloned genes in eukaryotic cells, Proc. Natl. Acad. Sci. U.S.A., 90(12):5603-5607 (1993).

Marsic et al., Vector Design Tour de Force: Integrating Combinatorial and Rational Approaches to Derive Novel Adeno-associated Virus Variants, Molecular Therapy, 22(11):1900-1909 (2014).

Mclaughlin et al., Adeno-associated virus general transduction vectors: analysis of proviral structures, J. Virol., 62(6):1963-73 (1988).

Mori et al., Two novel adeno-associated viruses from cynomolgus monkey: pseudotyping characterization of capsid protein, Virology, 330(2):375-383 (2004).

Muscat et al., Multiple 5'-flanking regions of the human alpha-skeletal actin gene synergistically modulate muscle-specific expression, Mol. Cell. Biol., 7(11):4089-4099 (1987).

Muzyczka, Use of Adeno-Associated Virus as a General Transduction Vector for Mammalian Cells, Current Topics in Microbiology and Immunology, 158:97-129 (1992).

Okimoto et al., CIC-DUX4 oncoprotein drives sarcoma metastasis and tumorigenesis via distinct regulatory programs, J. Clin. Invest., 129(8):3401-3406 (2019).

Paddison et al., Stable suppression of gene expression by RNAi in mammalian cells, Proc. Natl. Acad. Sci. U.S.A., 99(3):1443-8 (2002).

Paul et al., Effective expression of small interfering RNA in human cells, Nat. Biotechnol., 20(5):505-8 (2002).

Paul et al., Increased Viral Titer Through Concentration of Viral Harvests from Retroviral Packaging Lines, Human Gene Therapy, 4(5):609-615 (1993).

Paule et al., Survey and summary: transcription by RNA polymerases I and III, Nucleic Acids Res., 28(6):1283-98 (2000).

Perrin et al., An experimental rabies vaccine produced with a new BHK-21 suspension cell culture process: use of serum-free medium and perfusion-reactor system, Vaccine, 13(13):1244-1250 (1995).

Rashnonejad et al., Large-Scale Production of Adeno-Associated Viral Vector Serotype-9 Carrying the Human Survival Motor Neuron Gene, Mol. Biotechnol., 58(1):30-6 (2016).

Rashnonejad et al., O.8DUX4 mRNA silencing with CRISPR-Cas13 gene therapy as a prospective treatment for Facioscapulohumeral muscular dystrophy, Neuromuscular Disorders, 29:XP085844571 (2019).

Samulski et al., Cloning of adeno-associated virus into pBR322: rescue of intact virus from the recombinant plasmid in human cells, Proc. Natl. Acad. Sci. U.S.A., 79(6):2077-2081 (1982).

Samulski et al., Helper-free stocks of recombinant adeno-associated viruses: normal integration does not require viral gene expression, J. Virol., 63(9):3822-3828 (1989).

Schenpp et al., Highly purified recombinant adeno-associated virus vectors. Preparation and quantitation, Methods Mol. Med., 69:427-443 (2002).

Semenza et al., Hypoxia-inducible nuclear factors bind to an enhancer element located 3' to the human erythropoietin gene, Proc. Natl. Acad. Sci. U.S.A., 88(13):5680-5684 (1991).

Senapathy et al., Molecular cloning of adeno-associated virus variant genomes and generation of infectious virus by recombination in mammalian cells, J. Biol. Chem., 259:4661-4666 (1984).

Smargon et al., Cas13b is a Type VI-B CRISPR-Associated RNA-Guided RNase Differentially Regulated by Accessory Proteins Csx27 and Csx28, Molecular Cell., 65(4):618-30 (2017).

Srivastava et al., Nucleotide Sequence and Organization of the Adeno-Associated Virus 2 Genome, J. Virol., 45:555-564 (1983).

Tratschin et al., A human parvovirus, adeno-associated virus, as a eucaryotic vector: transient expression and encapsidation of the procaryotic gene for chloramphenicol acetyltransferase, Mol. Cell. Biol., 4(10):2072-2081 (1984).

(56) References Cited

OTHER PUBLICATIONS

Tratschin et al., Adeno-associated virus vector for high-frequency integration, expression, and rescue of genes in mammalian cells, Mol. Cell. Biol., 5(11):3251-3260 (1985).

Wallace et al., Pre-clinical safety and off-target studies to support translation of AAV-mediated RNAi therapy for FSHD, Mol. Ther. Methods Clin. Dev., 8:121-130 (2018).

Wallace et al., RNA interference inhibits DUX4-induced muscle toxicity in vivo: implications for a targeted FSHD therapy, Mol. Ther., 20(7):1417-1423 (2012).

Wang et al., Construction and analysis of compact muscle-specific promoters for AAV vectors, Gene. Therapy, 15(22):1489-1499 (2008).

Wein et al., Efficient bypass of mutations in dysferlin deficient patient cells by antisense-induced exon skipping, Hum. Mutat., 31(2):136-42 (2010).

Wein et al., Translation from a DMD exon 5 IRES results in a functional dystrophin isoform that attenuates dystrophinopathy in humans and mice, Nature Medicine, 20(9):992-1000 (2014).

Weintraub et al., The myoD gene family: nodal point during specification of the muscle cell lineage, Science, 251:761-766 (1991).

Zhang et al., Myoediting: Toward Prevention of Muscular Dystrophy by Therapeutic Genome Editing, Physiological Reviews, 98(3):1205-1240 (2018).

* cited by examiner

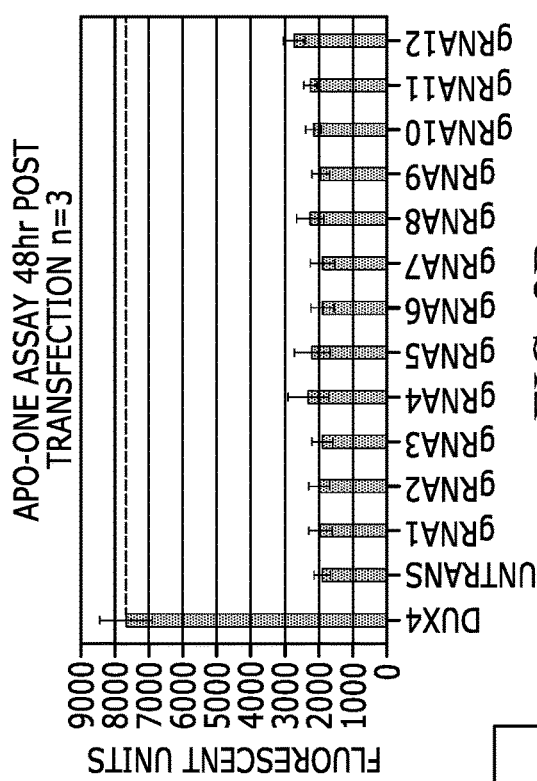
FIG. 2A
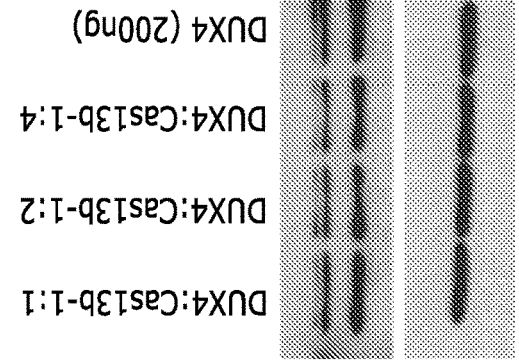
FIG. 2B
FIG. 2D
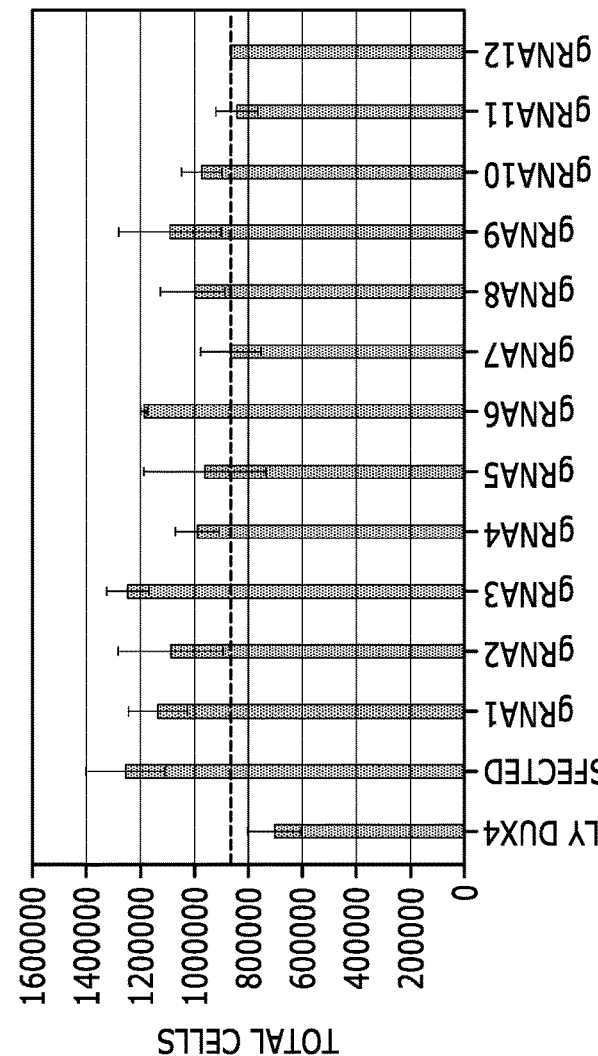
FIG. 2C 30 nt length gRNA sequences:
Description of each part:

BOLD UPPERCASE LETTERS: HUMAN U6 PROMOTER
lowercase letters: reverse complement of target site
<u>UPPERCASE LETTER WITH UNDERLINE: CAS13B DIRECT REPEAT</u>
<u>TTTTT</u>: termination signal gRNA1: targeting sequence 5'-attcagatctgtttcagaatcgaagggcc-3' (SEQ ID NO: 14)

**GAGGGCCTATTTCCCATGATTCCTTCATATTTGCATATACGATACAAGGCTGTTAGAGAGATAATTGGAATTAATTTGACTGTAAACACA
AAGATATTAGTACAAAATACGTGACGTAGAAAGTAATAATTTCTTGGGTAGTTTGCAGTTTTAAAATTATGTTTAAAATGGACTATCAT
ATGCTTACCGTAACTTGAAAGTATTTCTTGGCTTTATATATCTTGTGGAAAGGACGAAACACC**ggcccttgattctgaaaccagatctgaat
<u>GTTGTGGAAGGTCCAGTTTTGAGGGGCTATTACAACTTTTT</u>
(SEQ ID NO: 38)

gRNA2: targeting sequence 5'-agtccaggattcagatctgtttcagaatc-3' (SEQ ID NO: 15)

**GAGGGCCTATTTCCCATGATTCCTTCATATTTGCATATACGATACAAGGCTGTTAGAGAGATAATTGGAATTAATTTGACTGTAAACACA
AAGATATTAGTACAAAATACGTGACGTAGAAAGTAATAATTTCTTGGGTAGTTTGCAGTTTTAAAATTATGTTTAAAATGGACTATCAT
ATGCTTACCGTAACTTGAAAGTATTTCTTGGCTTTATATATCTTGTGGAAAGGACGAAACACC**gattctgaaaccagatctgaatcctgact
<u>GTTGTGGAAGGTCCAGTTTTGAGGGGCTATTACAACTTTTT</u>
(SEQ ID NO: 39)

gRNA3: targeting sequence 5'-agctggccagagagacgggcctcccggagtc-3' (SEQ ID NO: 16)

**GAGGGCCTATTTCCCATGATTCCTTCATATTTGCATATACGATACAAGGCTGTTAGAGAGATAATTGGAATTAATTTGACTGTAAACACA
AAGATATTAGTACAAAATACGTGACGTAGAAAGTAATAATTTCTTGGGTAGTTTGCAGTTTTAAAATTATGTTTAAAATGGACTATCAT
ATGCTTACCGTAACTTGAAAGTATTTCTTGGCTTTATATATCTTGTGAAAGGACGAAACACC**gactccgggaggccgtctctctggccag
<u>ctGTTGTGGAAGGTCCAGTTTTGAGGGGCTATTACAACTTTTT</u>
(SEQ ID NO: 40)

FIG. 5 gRNA4: targeting sequence 5'-acggggcgctctccacccteagctcctc-3' (SEQ ID NO: 17)

**GAGGGCCTATTTCCCATGATTCCTTCATATTTGCATATACGATACAAGGCTGTTAGAGAGATAATTGGAATTAATTTGACTGTAAACACA
AAGATATTAGTACAAAATACGTGACGTAGAAAGTAATAATTTCTTGGGTGCAGTTTGCAGTTTAAAATTATGTTTAAAATTATGTTTAAAATGGACTATCAT
ATGCTTACCGTAACTTGAAAGTATTTCGATTTCTTGGCTTTATATATCTTGTGTGAAAGGACGAAACACC**cgtGTTGTGAAGGTCCAGTTTTGAGGGCTATTACAACTTTTT
(SEQ ID NO: 41)

gRNA5: targeting sequence 5'-ctcctcgtggcctccgcacccgggcaaaagc-3' (SEQ ID NO: 18)

**GAGGGCCTATTTCCCATGATTCCTTCATATTTGCATATACGATACAAGGCTGTTAGAGAGATAATTGGAATTAATTTGACTGTAAACACA
AAGATATTAGTACAAAATACGTGACGTAGAAAGTAATAATTTCTTGGGTAGTTTGCAGTTTAAAATTATGTTTAAAATGGACTATCAT
ATGCTTACCGTAACTTGAAAGTATTTCGATTTCTTGGCTTTATATATCTTGTGTGAAAGGACGAAACACC**gcttttgcccgggtgcggaggccaccgag
gagGTTGTGAAGGTCCAGTTTTGAGGGCTATTACAACTTTTT
(SEQ ID NO: 42)

gRNA6: targeting sequence 5'-agtttctgcagcaggcgcaacctctcctaga-3' (SEQ ID NO: 19)

**GAGGGCCTATTTCCCATGATTCCTTCATATTTGCATATACGATACAAGGCTGTTAGAGAGATAATTGGAATTAATTTGACTGTAAACACA
AAGATATTAGTACAAAATACGTGACGTAGAAAGTAATAATTTCTTGGGTAGTTTGCAGTTTAAAATTATGTTTAAAATGGACTATCAT
ATGCTTACCGTAACTTGAAAGTATTTCGATTTCTTGGCTTTATATATCTTGTGTGAAAGGACGAAACACC**gtctaggagagaggttgcctgctgcagaa
actGTTGTGAAGGTCCAGTTTTGAGGGCTATTACAACTTTTT
(SEQ ID NO: 43)

gRNA7: targeting sequence 5'-agtttctgcagcaggcgcaacctctcctagaaac-3' (SEQ ID NO: 20)

**GAGGGCCTATTTCCCATGATTCCTTCATATTTGCATATACGATACAAGGCTGTTAGAGAGATAATTGGAATTAATTTGACTGTAAACACA
AAGATATTAGTACAAAATACGTGACGTAGAAAGTAATAATTTCTTGGGTAGTTTGCAGTTTAAAATTATGTTTAAAATGGACTATCAT
ATGCTTACCGTAACTTGAAAGTATTTCGATTTCTTGGCTTTATATATCTTGTGTGAAAGGACGAAACACC**gttttctaggagagaggttgcctgctgcag
aaactGTTGTGAAGGTCCAGTTTTGAGGGGCTATTACAACTTTTT
(SEQ ID NO: 44)

FIG. 5 CONTINUED gRNA8: targeting sequence 5'-tgagagactccacaccgcggagaactgcca-3' (SEQ ID NO: 21)

GAGGGCCTATTTCCCATGATTCCTTCATATTTGCATATACGATACAAGGCTGTTAGAGAGATAATTAATTTGACTGTAAACAC
AAAGATATATTAGTACAAAATACGTGACGTAGAAAGTAATAATTTCTGGGTAGTTGCAGTTTGCAGTTTAAAATTATGTTTAAAATGGACTATC
ATATGCTTACCGTAACTTGAAAGTATTTCGATTTCTGGCTTTATATATCTTGTGGAAAGGACGAAACACC*gtggcagttctccgcggtgtggagt
ctctca*GTTGTGGAAGGTCCAGTTTTGAGGGGCTATTACAACTTTTT
(SEQ ID NO: 45)

gRNA9: targeting sequence 5'-cccggtgagagactccacaccgcggagaac-3' (SEQ ID NO: 22)

GAGGGCCTATTTCCCATGATTCCTTCATATTTGCATATACGATACAAGGCTGTTAGAGAGATAATTAATTTGACTGTAAACAC
AAAGATATATTAGTACAAAATACGTGACGTAGAAAGTAATAATTTCTGCAGTTTGCAGTTTAAAATTATGTTTAAAATGGACTATC
ATATGCTTACCGTAACTTGAAAGTATTTCGATTTCTGGCTTTATATATCTTGTGGAAAGGACGAAACACC*gttctccgcggtggagtcttcac
cgggg*GTTGTGGAAGGTCCAGTTTTGAGGGGCTATTACAACTTTTT
(SEQ ID NO: 46)

gRNA10: targeting sequence 5'-gagctcgctcctctgtgccctgttc-3' (SEQ ID NO: 23)

GAGGGCCTATTTCCCATGATTCCTTCATATTTGCATATACGATACAAGGCTGTTAGAGAGATAATTAATTTGACTGTAAACAC
AAAGATATATTAGTACAAAATACGTGACGTAGAAAGTAATAATTTCTGGGTAGTTGCAGTTTGCAGTTTAAAATTATGTTTAAAATGGACTATC
ATATGCTTACCGTAACTTGAAAGTATTTCGATTTCTGGCTTTATATATCTTGTGGAAAGGACGAAACACC*gaacaagggcacagagaggccag
cgagctc*GTTGTGGAAGGTCCAGTTTTGAGGGGCTATTACAACTTTTT
(SEQ ID NO: 47)

gRNA11: targeting sequence 5'-ctgaatgtctccccacctttcgacgctgtc-3' (SEQ ID NO: 24)

GAGGGCCTATTTCCCATGATTCCTTCATATTTGCATATACGATACAAGGCTGTTAGAGAGATAATTAATTTGACTGTAAACAC
AAAGATATATTAGTACAAAATACGTGACGTAGAAAGTAATAATTTCTGGGTAGTTGCAGTTTGCAGTTTAAAATTATGTTTAAAATGGACTATC
ATATGCTTACCGTAACTTGAAAGTATTTCGATTTCTGGCTTTATATATCTTGTGGAAAGGACGAAACACC*gacagcgtcggaaggtggggg
gagacattcag*GTTGTGGAAGGTCCAGTTTTGAGGGGCTATTACAACTTTTT
(SEQ ID NO: 48)

FIG. 5 CONTINUED gRNA13: targeting sequence 5'-tgtgcccttgttcttccgtgaaattctggc-3' (SEQ ID NO: 55)

GAGGGCCTATTTCCCATGATTCCTTCATATTTGCATATACGATACAAGGCTGTTAGAGAGATAATTGGAATTAATTTGACTGTAAACAC
AAAGATAATTAGTACAAAATACGTGACGTAGAAAGTAATAATTTCTTGGGTAGTTTGCAGTTTTAAAATTATGTTTAAAATGGACTATC
ATATGCTTACCGTAACTTGAAAGTATTTCGATTTCTTGGCTTTATATATCTTGTTATATATCTTGATATATCTATTTGAGGGGCTATTACAACTTTTT
*ggcaca*GTTGTGGAAGGTCCAGTTTTGAGGGGCTATTACAACTTTTT*gccagaatttcacgaagaacaag*
(SEQ ID NO: 63)

gRNA14: targeting sequence 5'-gtgcgcacccggctgacgtgcaagggagc-3' (SEQ ID NO: 56)

GAGGGCCTATTTCCCATGATTCCTTCATATTTGCATATACGATACAAGGCTGTTAGAGAGATAATTGGAATTAATTTGACTGTAAACAC
AAAGATAATTAGTACAAAATACGTGACGTAGAAAGTAATAATTTCTTGGGTAGTTTGCAGTTTTAAAATTATGTTTAAAATGGACTATC
ATATGCTTACCGTAACTTGAAAGTATTTCGATTTCTTGGCTTTATATATCTTGTGGAAAGGACGAAACACC*gctcccttgacgtcagccgggtgc*
*gcac*GTTGTGGAAGGTCCAGTTTTGAGGGGCTATTACAACTTTTT
(SEQ ID NO: 64)

gRNA15: targeting sequence 5'-tcccggagtccaggattcagatctgtttc-3' (SEQ ID NO: 57)

GAGGGCCTATTTCCCATGATTCCTTCATATTTGCATATACGATACAAGGCTGTTAGAGAGATAATTGGAATTAATTTGACTGTAAACAC
AAAGATAATTAGTACAAAATACGTGACGTAGAAAGTAATAATTTCTTGGGTAGTTTGCAGTTTTAAAATTATGTTTAAAATGGACTATC
ATATGCTTACCGTAACTTGAAAGTATTTCGATTTCTTGGCTTTATATATCTTGTGGAAAGGACGAAACACC*gaaaccagatctgaatcctggactc*
*cggga*GTTGTGGAAGGTCCAGTTTTGAGGGGCTATTACAACTTTTT
(SEQ ID NO: 65)

gRNA16: targeting sequence 5'-ctgttttcagaatcgaagggccaggcaccc-3' (SEQ ID NO: 58)

GAGGGCCTATTTCCCATGATTCCTTCATATTTGCATATACGATACAAGGCTGTTAGAGAGATAATTGGAATTAATTTGACTGTAAACAC
AAAGATAATTAGTACAAAATACGTGACGTAGAAAGTAATAATTTCTTGGGTAGTTTGCAGTTTTAAAATTATGTTTAAAATGGACTATC
ATATGCTTACCGTAACTTGAAAGTATTTCGATTTCTTGGCTTTATATATCTTGTGGAAAGGACGAAACACC*ggtgcctgccttgccttgattctgaaa*
*ccag*GTTGTGGAAGGTCCAGTTTTGAGGGGCTATTACAACTTTTT
(SEQ ID NO: 66)

FIG. 5 CONTINUED

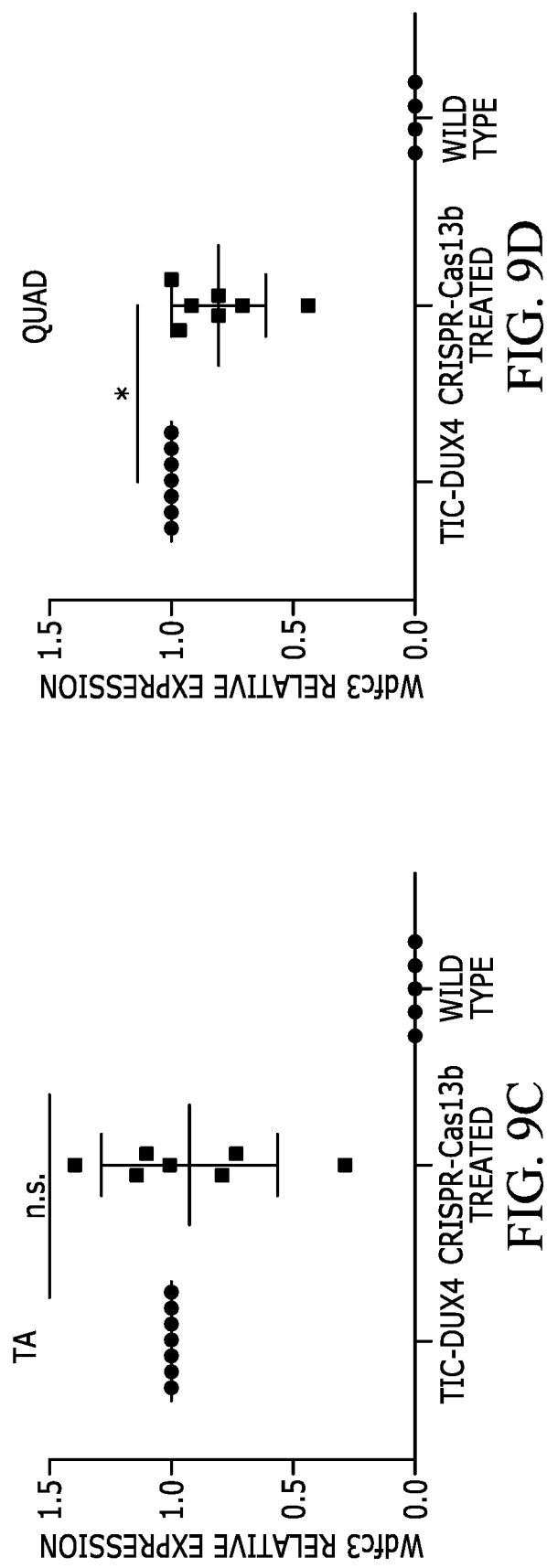

DUX4 RNA SILENCING USING RNA TARGETING CRISPR-CAS13B

STATEMENT OF GOVERNMENT INTEREST

This invention was made with government support under AR078395 awarded by the National Institutes of Health. The government has certain rights in the invention.

FIELD

The disclosure relates to CRISPR/Cas13 products and methods for silencing or inhibiting the expression of the double homeobox 4 (DUX4) gene on human chromosome 4q35. The disclosure provides a recombinant gene editing complex comprising a recombinant gene editing protein, i.e., Cas13, and a nucleic acid encoding a guide RNA (gRNA) that specifically hybridizes to a target nucleic acid sequence encoding a region of the DUX4 gene, wherein binding of the complex to the target nucleic acid sequence results in inhibition of DUX4 gene expression. Recombinant adeno-associated viruses of the disclosure deliver DNAs encoding such gRNA that knock down the expression of DUX4. The methods have application in the treatment of muscular dystrophies including, but not limited to, facioscapulohumeral muscular dystrophy (FSHD), and other disorders where DUX4 inhibition would be indicated, such as cancer.

INCORPORATION BY REFERENCE OF THE SEQUENCE LISTING

This application contains, as a separate part of disclosure, a Sequence Listing in computer-readable form (filename: 53307A_Seqlisting.txt; 34,420 bytes—ASCII text file created Dec. 30, 2019) which is incorporated by reference herein in its entirety.

BACKGROUND

Muscular dystrophies (MDs) are a group of genetic diseases. The group is characterized by progressive weakness and degeneration of the skeletal muscles that control movement. Some forms of MD develop in infancy or childhood, while others may not appear until middle age or later. The disorders differ in terms of the distribution and extent of muscle weakness (some forms of MD also affect cardiac muscle), the age of onset, the rate of progression, and the pattern of inheritance.

Facioscapulohumeral muscular dystrophy (FSHD) is a genetic degenerative muscle disease characterized by slowly progressive weakness, in which the muscles of the face, shoulder blades and upper arms are among the most affected. FSHD, originally named Landouzy-Dejerine, is usually autosomal dominant, an inherited form of muscular dystrophy (MD) that initially affects the skeletal muscles of the face (facio), scapula (scapula or shoulder blades) and upper arms (humeral). FSHD is the third most common genetic disease of skeletal muscle and is present in the population at between about 4-12 in 100,000. Historically, FSHD was classified as the third most common MD, affecting one in 20,000 individuals worldwide. However, recent data indicate FSHD is the most common MD in Europe, suggesting its worldwide incidence may be underestimated.

Symptoms may develop in early childhood and are usually noticeable in the teenage years, with 95% of affected individuals manifesting disease by age 20 years. A progressive skeletal muscle weakness usually develops in other areas of the body as well and is often asymmetrical. Life expectancy can be threatened by respiratory insufficiency, and up to 20% of affected individuals become severely disabled, requiring use of a wheel chair or mobility scooter. Currently, no therapeutic treatment is available for this severe disorder, leaving patients with only the choice of symptom management.

There are two clinically indistinguishable forms of FSHD, called FSHD1 and FSHD2. The majority of cases (~95%) are classified as FSHD1, while the remainder are classified as FSHD2 or show typical FSHD presentation but are not yet genetically characterized. Stated simply, both forms of FSHD are caused by de-repression of the toxic DUX4 gene. The DUX4 open-reading frame is encoded within D4Z4 repeats located on the human chromosome 4q subtelomere. Humans may have different copy numbers of D4Z4 repeats on both 4q alleles. D4Z4 arrays larger than 10 in number are typically embedded in heterochromatin and, as a result, the DUX4 gene located in each repeat is suppressed.

FSHD1 is caused by a congenital reduction in the number of D4Z4 repeats on one allele (1-10 D4Z4 copies), which in turn disrupts the epigenetic silencing of the region. FSHD2 results from mutations in chromatin modifier genes (SMCHD1, DNMT3B) that also lead to epigenetic de-repression of D4Z4 repeats. In both instances, the DUX4 gene can be transcribed into DUX4 mRNA. However, reduced epigenetic silencing of DUX4 is not sufficient to give rise to FSHD because the individual repeats lack polyA signals to stabilize DUX4 transcript. Inheritance of a specific chromosomal background, called 4qA, which contains the pLAM region located adjacent to the last repeat, is required to cause FSHD. The pLAM region contributes a polyA signal to the last DUX4 copy. Thus, if DUX4 transcription occurs on the 4qA haplotype, the full-length DUX4 transcript located nearest the telomere is stabilized and translated into DUX4 protein, which is toxic to muscle. There remains a need in the art for a treatment for such muscular dystrophies, including FSHD, and products and methods for treatment. Likewise, because DUX4 is implicated in various cancers, there remains a need in the art for a treatment for cancers associated with expression of DUX4, where inhibition of DUX 4 is therapeutic.

SUMMARY

Provided herein are products and methods for treating a muscular dystrophy adversely affected by the expression or overexpression of double homeobox 4 (DUX4). In some aspects, the muscular dystrophy is FSHD.

The disclosure provides nucleic acids, compositions and viral vectors comprising the nucleic acids which are designed to inhibit DUX4 expression with the assistance of Cas13, methods for using these products for inhibiting and/or interfering with expression of a DUX4 gene in a cell, methods for treating a subject suffering from a muscular dystrophy, and a recombinant gene editing complex comprising at least one nucleic acid comprising a nucleotide sequence encoding Cas13 or a Cas13 ortholog or variant; and at least one nucleic acid comprising a nucleotide sequence encoding a guide RNA (gRNA) that specifically hybridizes to a target nucleic acid sequence encoding a DUX4 and a Cas13b direct repeat sequence, wherein binding of the complex to the target nucleic acid sequence results in inhibition of DUX4 gene expression.

In some aspects, the disclosure provides a nucleic acid encoding a DUX4-encoding gRNA comprising the nucleotide sequence set forth in any one of SEQ ID NOs: 3-13 and 51-54.

In some aspects, the disclosure provides a nucleic acid encoding a DUX4-encoding gRNA that specifically hybridizes to a target nucleic acid encoding DUX4 comprising the nucleotide sequence set forth in any one of SEQ ID NOs: 14-24 and 55-58.

In some aspects, the nucleic acid further comprises a Cas13b direct repeat sequence. In some aspects, the Cas13b direct repeat is located downstream or at the 3' terminus of the nucleic acid encoding the DUX4-encoding gRNA. In some aspects, the Cas13b direct repeating sequence comprises the nucleotide sequence set forth in SEQ ID NO: 37, or a variant thereof comprising at least about 90% identity to the nucleotide sequence set forth in SEQ ID NO: 37.

In some aspects, the disclosure provides a nucleic acid comprising the nucleotide sequence set forth in any one of SEQ ID NOs: 25-35 and 59-62 or a variant thereof comprising at least about 90% identity to the nucleotide sequence set forth in any one of SEQ ID NOs: 25-35 and 59-62.

In some aspects, the nucleic acids of the disclosure further comprise a promoter sequence. In some aspects, the promoter is any of U6, U7, tRNA, H1, minimal CMV, T7, EF1-alpha, Minimal EF1-alpha, or a skeletal muscle-specific promoter. In some aspects, the muscle-specific promoter is unc45b, tMCK, minimal MCK, CK6, CK7, MHCK7, or CK1.

In some aspects, the disclosure provides a nucleic acid comprising the nucleotide sequence set forth in any one of SEQ ID NOs: 38-48 and 63-66, or a variant thereof comprising at least about 90% identity to the nucleotide sequence set forth in any one of SEQ ID NOs: 38-48 and 63-66.

In some aspects, the disclosure provides an adeno-associated virus (AAV) comprising any one or more nucleic acids provided in the disclosure. In some aspects, the AAV comprises multiple copies of the same nucleic acids. For example, in some aspects, the AAV comprises multiple copies of the same gRNA. In some aspects, the AAV comprises multiple copies of different nucleic acids. For example, in some aspects, the AAV comprises multiple copies of a combination of gRNAs. In some aspects, the virus comprises rep and cap genes. In some aspects, the virus lacks rep and cap genes. In some aspects, the adeno-associated virus is a recombinant AAV (rAAV). In some aspects, the adeno-associated virus is a self-complementary recombinant AAV (scAAV). In some aspects, the AAV is AAV-1, AAV-2, AAV-3, AAV-4, AAV-5, AAV-6, AAV-7, AAV-8, AAV-9, AAV-10, AAV-11, AAV-12, AAV-13, AAV-anc80, or AAV rh.74. In some aspects, the AAV is AAV-9.

The disclosure also provides any one or more of the nucleic acids of the disclosure and any one or more of the AAV of the disclosure in a composition. In some aspects, the composition also comprises a diluent, an excipient, and/or an acceptable carrier. In some aspects, the carrier is a pharmaceutically acceptable carrier or a physiologically acceptable carrier.

In some aspects, the disclosure provides a method of inhibiting and/or interfering with expression of a DUX4 gene in a cell comprising contacting the cell with an adeno-associated virus or a composition comprising any of the nucleic acids comprising the nucleotide sequence set forth in any one of SEQ ID NOs: 3-13 and 51-54; 25-35 and 59-62; and 38-48 and 63-66, and/or a nucleic acid encoding a DUX4-encoding gRNA that specifically hybridizes to a target nucleic acid encoding DUX4 comprising the nucleotide sequence set forth in any one of SEQ ID NOs: 14-24 and 55-58; and an adeno-associated virus comprising a nucleic acid encoding a Cas13 protein, or a Cas13 ortholog or variant thereof. In some aspects, the Cas13 protein is Cas13b or a Cas13b ortholog or variant thereof. In some aspects, the Cas13b protein is encoded by the nucleotide sequence set out in SEQ ID NO: 36, or a variant thereof comprising at least about 80% identity to the sequence set out in SEQ ID NO: 36. In some aspects, the method further comprises contacting the cell with an adeno-associated virus comprising a nucleic acid encoding a DUX4 inhibitory RNA. In some aspects, the expression of the nucleic acid encoding a DUX4 inhibitory RNA is under the control of a U6 promoter, a U7 promoter, a T7 promoter, a tRNA promoter, an H1 promoter, a minimal EF1-alpha promoter, a miniCMV promoter, a CMV promoter, a muscle creatine kinase (MCK) promoter, an alpha-myosin heavy chain enhancer-/MCK enhancer-promoter (MHCK7), or a desmin promoter.

In some aspects, the disclosure provides a method of treating a subject suffering from a muscular dystrophy comprising administering to the subject an effective amount of an adeno-associated virus or a composition comprising any of the nucleic acids comprising the nucleotide sequence set forth in any one of SEQ ID NOs: 3-13 and 51-54; 25-35 and 59-62; and 38-48 and 63-66, and/or a nucleic acid encoding a DUX4-encoding gRNA that specifically hybridizes to a target nucleic acid encoding DUX4 comprising the nucleotide sequence set forth in any one of SEQ ID NOs: 14-24 and 55-58; and an adeno-associated virus comprising a nucleic acid encoding a Cas13 protein, or a Cas13 ortholog or variant thereof. In some aspects, the Cas13 protein is Cas13b or a Cas13b ortholog or variant thereof. In some aspects, the Cas13b protein is encoded by the nucleotide sequence set out in SEQ ID NO: 36, or a variant thereof comprising at least about 80% identity to the sequence set out in SEQ ID NO: 36. In some aspects, the method further comprises contacting the cell with an adeno-associated virus comprising a nucleic acid encoding a DUX4 inhibitory RNA. In some aspects, the expression of the nucleic acid encoding a DUX4 inhibitory RNA is under the control of a U6 promoter, a U7 promoter, a T7 promoter, a tRNA promoter, an H1 promoter, a minimal EF1-alpha promoter, a miniCMV promoter, a CMV promoter, a muscle creatine kinase (MCK) promoter, an alpha-myosin heavy chain enhancer-/MCK enhancer-promoter (MHCK7), or a desmin promoter. In various aspects, the muscular dystrophy is FSHD.

In some aspects, the disclosure provides a method of treating a muscular dystrophy in a subject in need thereof comprising administering an effective amount of an adeno-associated virus to the subject, wherein the genome of the adeno-associated virus comprises (a) at least one nucleic acid encoding a double homeobox 4 (DUX4)-encoding guide RNA (gRNA) comprising the nucleotide sequence set forth in any one of SEQ ID NOs: 3-13 and 51-54; (b) at least one nucleic acid encoding a DUX4-encoding guide RNA (gRNA) that specifically hybridizes to a target nucleic acid encoding DUX4 comprising the nucleotide sequence set forth in any one of SEQ ID NOs: 14-24 and 55-58; at least one nucleic acid comprising the nucleotide sequence set forth in any one of SEQ ID NOs: 25-35 and 59-62, or a variant thereof comprising at least about 90% identity to the nucleotide sequence set forth in any one of SEQ ID NOs: 25-35 and 59-62; (d) at least one nucleic acid comprising the nucleotide sequence set forth in any one of SEQ ID NOs:

38-48 and 63-66, or a variant thereof comprising at least about 90% identity to the nucleotide sequence set forth in any one of SEQ ID NOs: 38-48 and 63-66; or (e) a combination of any of (a)-(d) thereof. In some aspects, the method further comprises administering to the subject an effective amount of an adeno-associated virus comprising a nucleic acid encoding a Cas13 protein, or a Cas13 ortholog or variant. In some aspects, the Cas13 protein is Cas13b or a Cas13b ortholog or variant thereof. In some aspects, the Cas13b protein is encoded by the nucleotide sequence set out in SEQ ID NO: 36, or a variant thereof comprising at least about 80% identity to the sequence set out in SEQ ID NO: 36. In some aspects, the method further comprises contacting the cell with an adeno-associated virus comprising a nucleic acid encoding a DUX4 inhibitory RNA. In some aspects, the expression of the nucleic acid encoding a DUX4 inhibitory RNA is under the control of a U6 promoter, a U7 promoter, a T7 promoter, a tRNA promoter, an H1 promoter, a minimal EF1-alpha promoter, a miniCMV promoter, a CMV promoter, a muscle creatine kinase (MCK) promoter, an alpha-myosin heavy chain enhancer-/MCK enhancer-promoter (MHCK7), or a desmin promoter. In various aspects, the muscular dystrophy is FSHD.

In some aspects, the disclosure provides a method of treating a subject suffering from a cancer associated with DUX4 expression or an elevated level of DUX4 expression comprising administering to the subject an effective amount of an adeno-associated virus or a composition comprising any of the nucleic acids comprising the nucleotide sequence set forth in any one of SEQ ID NOs: 3-13 and 51-54; 25-35 and 59-62; and 38-48 and 63-66, and/or a nucleic acid encoding a DUX4-encoding gRNA that specifically hybridizes to a target nucleic acid encoding DUX4 comprising the nucleotide sequence set forth in any one of SEQ ID NOs: 14-24 and 55-58; and an adeno-associated virus comprising a nucleic acid encoding a Cas13 protein, or a Cas13 ortholog or variant thereof. In some aspects, the Cas13 protein is Cas13b or a Cas13b ortholog or variant thereof. In some aspects, the Cas13b protein is encoded by the nucleotide sequence set out in SEQ ID NO: 36, or a variant thereof comprising at least about 80% identity to the sequence set out in SEQ ID NO: 36. In some aspects, the method further comprises contacting the cell with an adeno-associated virus comprising a nucleic acid encoding a DUX4 inhibitory RNA. In some aspects, the expression of the nucleic acid encoding a DUX4 inhibitory RNA is under the control of a U6 promoter, a U7 promoter, a T7 promoter, a tRNA promoter, an H1 promoter, a minimal EF1-alpha promoter, a miniCMV promoter, a CMV promoter, a muscle creatine kinase (MCK) promoter, an alpha-myosin heavy chain enhancer-/MCK enhancer-promoter (MHCK7), or a desmin promoter. In various aspects, the cancer is DUX4+ cancer. In various aspects, the cancer is bladder cancer, breast cancer, cervical cancer, endometrial cancer, esophageal cancer, lung cancer, kidney cancer, ovarian cancer, rhabdoid cancer (or rhabdosarcoma), sarcoma, stomach cancer, testicular cancer, thymoma, melanoma, or metastatic melanoma.

In some aspects, the disclosure provides a method of treating a cancer associated with DUX4 expression or an elevated level of DUX4 expression in a subject in need thereof comprising administering an effective amount of an adeno-associated virus to the subject, wherein the genome of the adeno-associated virus comprises (a) at least one nucleic acid encoding a double homeobox 4 (DUX4)-encoding guide RNA (gRNA) comprising the nucleotide sequence set forth in any one of SEQ ID NOs: 3-13 and 51-54; (b) at least one nucleic acid encoding a DUX4-encoding guide RNA (gRNA) that specifically hybridizes to a target nucleic acid encoding DUX4 comprising the nucleotide sequence set forth in any one of SEQ ID NOs: 14-24 and 55-58; at least one nucleic acid comprising the nucleotide sequence set forth in any one of SEQ ID NOs: 25-35 and 59-62, or a variant thereof comprising at least about 90% identity to the nucleotide sequence set forth in any one of SEQ ID NOs: 25-35 and 59-62; (d) at least one nucleic acid comprising the nucleotide sequence set forth in any one of SEQ ID NOs: 38-48 and 63-66, or a variant thereof comprising at least about 90% identity to the nucleotide sequence set forth in any one of SEQ ID NOs: 38-48 and 63-66; or (e) a combination of any of (a)-(d) thereof. In some aspects, the method further comprises administering to the subject an effective amount of an adeno-associated virus comprising a nucleic acid encoding a Cas13 protein, or a Cas13 ortholog or variant. In some aspects, the Cas13 protein is Cas13b or a Cas13b ortholog or variant thereof. In some aspects, the Cas13b protein is encoded by the nucleotide sequence set out in SEQ ID NO: 36, or a variant thereof comprising at least about 80% identity to the sequence set out in SEQ ID NO: 36. In some aspects, the method further comprises contacting the cell with an adeno-associated virus comprising a nucleic acid encoding a DUX4 inhibitory RNA. In some aspects, the expression of the nucleic acid encoding a DUX4 inhibitory RNA is under the control of a U6 promoter, a U7 promoter, a T7 promoter, a tRNA promoter, an H1 promoter, a minimal EF1-alpha promoter, a miniCMV promoter, a CMV promoter, a muscle creatine kinase (MCK) promoter, an alpha-myosin heavy chain enhancer-/MCK enhancer-promoter (MHCK7), or a desmin promoter. In various aspects, the cancer is DUX4+ cancer. In various aspects, the cancer is bladder cancer, breast cancer, cervical cancer, endometrial cancer, esophageal cancer, lung cancer, kidney cancer, ovarian cancer, rhabdoid cancer (or rhabdosarcoma), sarcoma, stomach cancer, testicular cancer, thymoma, melanoma, or metastatic melanoma.

In some aspects, the disclosure provides a recombinant gene editing complex comprising at least one nucleic acid comprising a nucleotide sequence encoding Cas13 or a Cas13 ortholog or variant; and at least one nucleic acid comprising a nucleotide sequence encoding a gRNA that specifically hybridizes to a target nucleic acid sequence encoding a DUX4 and a Cas13b direct repeat sequence, wherein binding of the complex to the target nucleic acid sequence results in inhibition of DUX4 gene expression. In some aspects, the nucleic acid comprises the nucleotide sequence encoding the gRNA and the Cas13b direct repeat sequence comprising (a) at least one nucleic acid encoding a double homeobox 4 DUX4-encoding gRNA comprising the nucleotide sequence set forth in any one of SEQ ID NOs: 3-13 and 51-54; (b) at least one nucleic acid encoding a DUX4-encoding gRNA that specifically hybridizes to a target nucleic acid encoding DUX4 comprising the nucleotide sequence set forth in any one of SEQ ID NOs: 14-24 and 55-58; (c) at least one nucleic acid comprising the nucleotide sequence set forth in any one of SEQ ID NOs: 25-35 and 59-62, or a variant thereof comprising at least about 90% identity to the nucleotide sequence set forth in any one of SEQ ID NOs: 25-35 and 59-62; at least one nucleic acid comprising the nucleotide sequence set forth in any one of SEQ ID NOs: 38-48 and 63-66, or a variant thereof comprising at least about 90% identity to the nucleotide sequence set forth in any one of SEQ ID NOs: 38-48 and 63-66; or (e) a combination of any of (a)-(d) thereof. In some aspects, the recombinant gene editing complex further comprises an adeno-associated virus comprising a nucleic acid encoding a Cas13 protein, or a Cas13 ortholog or variant. In some aspects, the Cas13 protein is Cas13b or a Cas13b ortholog or variant thereof. In some aspects, the Cas13b protein is encoded by the nucleotide sequence set out in SEQ ID NO: 36, or a variant thereof comprising at least about 80% identity to the sequence set out in SEQ ID NO: 36. In some aspects, the recombinant gene editing complex further comprises an adeno-associated virus comprising a nucleic acid encoding a DUX4 inhibitory RNA. In some aspects, the expression of the nucleic acid encoding a DUX4 inhibitory RNA is under the control of a U6 promoter, a U7 promoter, a T7 promoter, a tRNA promoter, an H1 promoter, a minimal EF1-alpha promoter, a miniCMV promoter, a CMV promoter, a muscle creatine kinase (MCK) promoter, an alpha-myosin heavy chain enhancer-/MCK enhancer-promoter (MHCK7), or a desmin promoter. In various aspects, the recombinant gene editing complex is used in the treatment of a muscular dystrophy or in the production of a medicament for the treatment of a muscular dystrophy. In some aspects, the recombinant gene editing complex is used in the treatment of FSHD or in the production of a medicament for the treatment of FSHD.

In some aspects, the disclosure provides the use of the nucleic acids and the recombinant gene editing complex described herein for the production of a medicament for decreasing DUX4 expression and/or DUX4 overexpression in a cell and/or for the treatment of a muscular dystrophy. In some aspects, the muscular dystrophy is FSHD.

Other features and advantages of the present disclosure will become apparent from the following detailed description. It should be understood, however, that the detailed description and the specific examples, while indicating preferred embodiments of the disclosure, are given by way of illustration only, because various changes and modifications within the spirit and scope of the disclosure will become apparent to those skilled in the art from this detailed description.

BRIEF DESCRIPTION OF THE DRAWINGS

FIG. 2A-D show results of screening of CRISPR-Cas13b gRNA sequences designed to silence the DUX4 gene in HEK293 cells. FIG. 2A shows results of Western blot testing of the ability of each gRNA (gRNA1-12, as described herein) to efficiently silence the DUX4 gene at the protein level. Alpha-tubulin served as the loading control. FIG. 2B shows caspase-3/7 cell death assay 48 hrs after transfection. DUX4 causes cell death, and cells expressing DUX4 alone have elevated caspase-3/7 activity, which indicates cells were undergoing apoptosis. In contrast, all DUX4-transfected cells that received Cas13b with an effective guide RNA (gRNA 1-12) were protected from cell death, indicated by baseline levels of caspase-3/7 activity. FIG. 2C shows results of a cell viability assay, which confirms the data in FIG. 2B. There were significantly more living cells in DUX4-transfected samples treated with Cas13b and gRNAs compared to samples that received DUX4 alone. FIG. 2D shows results of a control experiment using Western blot to demonstrate that Cas13b by itself, without a guide RNA, does not decrease DUX4 protein expression.

FIG. 3A shows untreated FSHD myotubes. FIG. 3B shows untreated healthy myotubes. FIG. 3C shows Cas13b transfected FSHD myotubes. FIG. 3D shows FSHD myotubes treated with Cas13b+gRNA3. FIG. 3E shows FSHD myotubes treated with Cas13b+gRNA9. DUX4 mRNA foci are detected as dark punctate spots, indicated by arrows. DUX4 RNA foci were decreased in CRISPR-Cas13b gRNA treated samples (FIGS. 3D and 3E).

FIG. 5 shows the DUX4 targeting sequences for gRNA1-11 and 13-16 (SEQ ID NOs: 14-24 and 55-58) and the gRNA1-11 and 13-16 expression cassettes (SEQ ID NOs: 38-48 and 63-66) comprising a human U6 promoter, a gRNA (as set out in SEQ ID NOs: 3-13 and 51-54), and a Cas13b direct repeat (SEQ ID NO: 37) as disclosed in various aspects of the disclosure.

FIG. 9A-C shows results of in vivo experiments with a TIC-DUX4 mouse model. FIG. 9A shows that TIC-DUX4 mice can be induced to develop mild and progressive muscle pathology as indicated by relative expression of WAP four-disulfide core domain protein 3 (WFDC3) in mouse muscle (tibia anterior (TA), gastrocnemius (GAS), and triceps (TRI) over time with tamoxifen treatment alone. FIG. 9B shows increasing DUX4 expression and tissue damage in TA and GAS muscles of TIC-DUX4 mice after 1 mg/kg tamoxifen administered three times per week over time (without the administration of gRNA targeting DUX4. FIG. 9C-E show the results of neonatal intramuscular injection of AAV-CRISPR-Cas13 (comprising gRNA1) in TIC-DUX4 mice. Neonatal TIC-DUX4 mice (1-2 days neonatal) were unilaterally co-injected with of 5e10 AAV.Cas13 and AAV.gRNA1 in 1-2 d. Four weeks later mice were started on the tamoxifen protocol (1 mg/kg, three times per week for four weeks). Expression of WFDC3 was reduced in mice treated with gRNA1 and Cas13b.

DETAILED DESCRIPTION

Figure 1A:
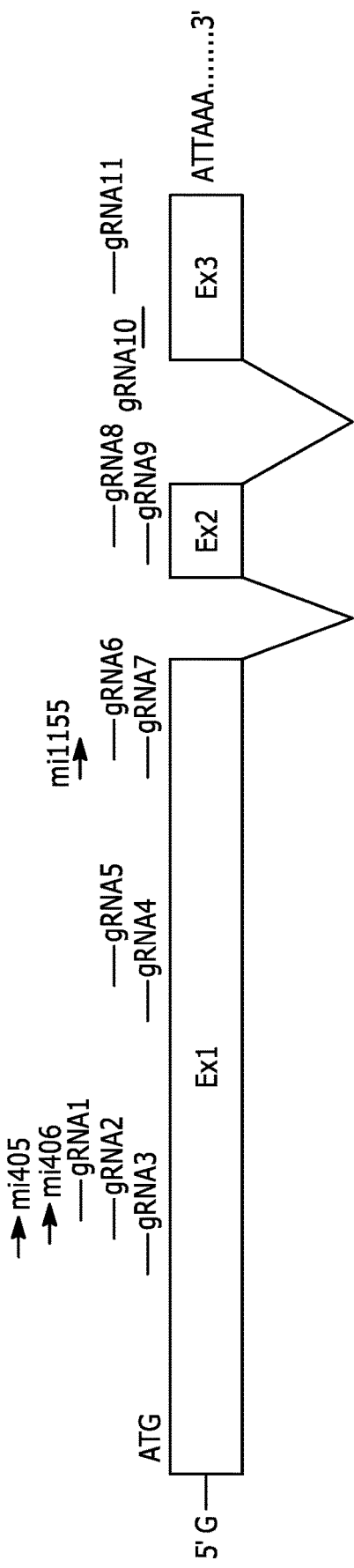
FIG. 1A-B shows targeting sites of each Cas13b gRNA on DUX4 mRNA. The gray boxes indicate DUX4 exon1, exon2, and exon3. Intron1, exon2, intron2, and exon3 act as a 3'UTR of DUX4. DUX4 targeting miRNA leads are shown with arrows. The miRNA-position matched gRNAs are shown with lines. Guide RNAs 1-11 are set out in FIG. 1A. Guide RNAs 1-11 and 13-16 are set out in FIG. 1B.

The present disclosure provides a novel strategy to accomplish double homeobox protein 4 (DUX4) gene silencing at the mRNA level using CRISPR/Cas13 because the expression of DUX4 in muscle is known to cause muscular dystrophy including, but not limited to, facioscapulohumeral muscular dystrophy (FSHD). Thus, in some aspects, the products and methods described herein are used in the treatment of FSHD.

The emergence of DUX4 as an important prospective therapeutic target for FSHD has lowered the barrier to pursuing translational research for FSHD. By reducing DUX4 expression via the use of guide RNAs targeted to DUX4 mRNA along with the Cas13b system, there is the ability to provide a treatment for the disease. This disclosure provides evidence that DUX4 gene silencing, triggered by engineered artificial guide RNAs along with exploitation of the Cas13 system, downregulates DUX4 expression to provide protection from cell death and a promising therapeutic approach to treat muscular dystrophies, such as FSHD.

The DUX4 gene encodes an approximately 45 kDA protein; see UniProtKB-Q9UBX2 (DUX4_HUMAN). De-repression of the DUX4 gene is involved in disease pathogenesis of FSHD. De-repression can occur through two known mechanisms: D4Z4 repeat contraction, or mutation in chromatin modifier genes SMCHD1 or DNMT3B. For the former, in unaffected subjects, the D4Z4 array consists of 11-100 repeats, while in FSHD1 patients, the array is reduced to 1-10 repeats (PubMed:19320656). Either condition can cause DNA hypomethylation at chromosome 4q35, thereby creating a chromosomal environment permissive for DUX4 expression.

DUX4 is located in D4Z4 macrosatellite which is epigenetically repressed in somatic tissues. D4Z4 chromatin relaxation in FSHD1 results in inefficient epigenetic repression of DUX4 and a variegated pattern of DUX4 protein expression in a subset of skeletal muscle nuclei. Ectopic expression of DUX4 in skeletal muscle activates the expression of stem cell and germline genes, and, when overexpressed in somatic cells, DUX4 can ultimately lead to cell death.

Each D4Z4 repeat unit has an open reading frame (named DUX4) that encodes two homeoboxes; the repeat-array and ORF is conserved in other mammals. The encoded protein has been reported to function as a transcriptional activator of numerous genes, including some considered to be FSHD disease biomarkers, including ZSCAN4, PRAMEF12, TRIM43, and MBD3L2 (PMID: 24861551). Contraction of the macrosatellite repeat causes autosomal dominant FSHD. Alternative splicing results in multiple transcript variants.

In some aspects, the nucleic acid encoding human DUX4 is set forth in the nucleotide sequence set forth in SEQ ID NO: 1. In some aspects, the amino acid sequence of human DUX4 is set forth in the amino acid sequence set forth in SEQ ID NO: 2. In various aspects, the methods of the disclosure also target isoforms and variants of the nucleotide sequence set forth in SEQ ID NO: 1. In some aspects, the variants comprise 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, and 70% identity to the nucleotide sequence set forth in SEQ ID NO: 1. In some aspects, the methods of the disclosure target isoforms and variants of nucleic acids comprising nucleotide sequences encoding the amino acid sequence set forth in SEQ ID NO: 2. In some aspects, the variants comprise 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, and 70% identity to a nucleotide sequence that encodes the amino acid sequence set forth in SEQ ID NO: 2.

There is currently no treatment for FSHD, and despite its relative abundance among the muscular dystrophies, very few FSHD-targeted translational studies have been published. Several FSHD candidate genes have been identified, but numerous recent studies support that the primary contributor to FSHD pathogenesis is the pro-apoptotic DUX4 gene, which encodes a transcription factor. Thus, in the simplest terms, DUX4-overexpression is a primary pathogenic insult underlying FSHD.

The disclosure includes the use of CRISPR/Cas13 to silence or downregulate DUX4 expression to ameliorate and/or treat subjects with muscular dystrophies including, but not limited to, FSHD or other disorders resulting from the mutated DUX4 gene and the resultant altered version of mRNA. CRISPR-Cas adaptive immune systems defend microbes against foreign nucleic acids via RNA-guided endonucleases. Cas13 enzymes are quickly becoming major players in the CRISPR field for precise RNA editing (Cox et al., RNA editing with CRISPR-Cas13, Science 358(6366): 1019-27, 2017). Thus, CRISPR/Cas13 is a mechanism of gene regulation in eukaryotic cells that has been considered for the treatment of various diseases.

The disclosure includes the use of CRISPR/Cas13 to silence or downregulate DUX4 expression to ameliorate and/or treat subjects with a DUX4-expressing cancer. It has been reported that DUX4, an early embryonic transcription factor that is typically silenced in normal tissues, is re-expressed in many solid tumors of the bladder, breast, lung, kidney, stomach and other organ sites (Chew et al., Developmental Cell 50(5): 658-71.e7 (2019). DUX4 is also implicated in melanoma and metastatic melanoma. Id. DUX4 is usually expressed when an embryo forms and develops, but is later epigenetically repressed and silenced in somatic tissues. It has also been reported that DUX4 plays a role in tumorigenesis and metastasis in sarcoma (Okimoto et al., J Clin Invest. 2019; 129(8):3401-3406). All in all, DUX4 is implicated in bladder cancer, breast cancer, cervical cancer, endometrial cancer, esophageal cancer, lung cancer, kidney cancer, ovarian cancer, rhabdoid cancer (or rhabdosarcoma), sarcoma, stomach cancer, testicular cancer, thymoma, melanoma, or metastatic melanoma. Advances in cancer immunotherapies make it critical to identify genes that modulate antigen presentation and tumor-immune interactions. It has been demonstrated that DUX4 expression blocks interferon-γ-mediated induction of MHC class I, implicating suppressed antigen presentation in DUX4-mediated immune evasion. Clinical data in metastatic melanoma confirmed that DUX4 expression was associated with significantly reduced progression-free and overall survival in response to anti-CTLA-4. Thus, methods of inhibiting DUX4 expression or DUX4 overexpression, as described herein, are therapeutic in the treatment and prevention of DUX4-associated tumors or cancer.

Nucleic acid editing is used for treating genetic disease, particularly at the RNA level, where disease-relevant sequences can be rescued to yield functional protein products. Type VI CRISPR-Cas systems contain the programmable single-effector RNA-guided ribonuclease Cas13. Type VI systems were profiled in order to engineer a Cas13 ortholog capable of robust knockdown and demonstrated RNA editing by using catalytically inactive Cas13 (dCas13) to direct adenosine-to-inosine deaminase activity by ADAR2 (adenosine deaminase acting on RNA type 2) to transcripts in mammalian cells. This system, referred to as RNA Editing for Programmable A to I Replacement (RE-PAIR) can be used to edit full-length transcripts containing pathogenic mutations (Cox et al., supra).

In some aspects, the disclosure uses Type VI CRISPR-Cas systems contain the programmable single-effector RNA-guided RNases Cas13. In some aspects, the disclosure uses Cas13b (Smargon et al., Molecular Cell 65:618-30, 2017), which is a CRISPR-associated RNA-guided RNase with two crRNA variants. Cas13b processes its own CRISPR array with short and long direct repeats, cleaves target RNA, and exhibits collateral RNase activity.

The disclosure includes various nucleic acids comprising, consisting essentially of, or consisting of the various nucleotide sequences described herein. In some aspects, the nucleic acid comprises the nucleotide sequence. In some aspects, the nucleic acid consists essentially of the nucleotide sequence. In some aspects, the nucleic acid consists of the nucleotide sequence.

The disclosure includes Cas13, Cas13 orthologs, and Cas13 variants and methods of using said Cas13, Cas13 orthologs, and Cas13 variants. Thus, in some aspects, Cas13 is Cas13a, Cas13b, or Cas13c. In some aspects, the Cas13a, Cas13b, or Cas13c is mammalian codon optimized. In some aspects, the Cas13b is PspCas13b (Cat. No. pC0046, https-colon-slash-slash-addgene.org-slash-103862; also see Cox et al., Science 24: 358 (6366): 1019-1027, 2017). In exemplary aspects, Cas13 is Cas13b comprising the nucleotide sequence set out in SEQ ID NO: 36, or a variant thereof comprising at least about 70%, about 75%, about 80%, about 85%, about 90%, 91%, 92%, 93%, 94%, 95%, 96%, 97%, 98%, or 99% identity to the sequence set out in SEQ ID NO: 36. In some aspects, the Cas13 is inserted into a mammalian expression vector, including a viral vector for expression in cells. In some aspects, mammalian gRNA for Cas13a, Cas13b, or Cas13c orthologs are cloned into a mammalian expression vector, including a viral vector for expression in cells. In some aspects, the DNA encoding the guide RNA and/or the Cas13 are under expression of a promoter. In some aspects, the promoter is a U6 promoter.

In some aspects, Cas13 DUX4 RNA silencing is superior to a DNA-directed editing strategy due to the fact that the DUX4 gene is embedded within identical D4Z4 DNA repeats and even a single-site DNA editing strategy could result in excision of the entire end of chromosome 4, or production of shorter arrays of D4Z4 repeats that could alter the epigenetic status of chromosome 4 and possibly result in de-repression of DUX4. Importantly, the disclosure provides Cas13-specific guide RNAs that significantly reduce DUX4 expression.

In some aspects, the disclosure provides DUX4 RNA targeting guide RNAs (gRNA). More particularly, the disclosure provides a nucleic acid encoding a DUX4-encoding gRNA comprising the nucleotide sequence set forth in any one of SEQ ID NOs: 3-13 and 51-54. These sequences comprise antisense "guide" strand sequences of the disclosure of varying sizes. The antisense guide strand is the strand of the mature miRNA duplex that becomes the RNA component of the RNA induced silencing complex ultimately responsible for sequence-specific gene silencing. See Section 7.3 of Duan (Ed.), Section 7.3 of Chapter 7 in Muscle Gene Therapy, Springer Science+Business Media, LLC (2010).

For example, the first antisense guide strand, i.e., the gRNA of SEQ ID NO: 3, corresponds to (is the reverse complement of and therefore binds to) the DUX4 sequence set out in SEQ ID NO: 14. See FIG. 5 and Table 1, which shows the gRNA sequence and the DUX4 target sequence that it binds. The second antisense guide strand, i.e., the gRNA of SEQ ID NO: 4, binds to the DUX4 sequence set out in SEQ ID NO: 14, and so on.

Thus, the disclosure includes a nucleic acid encoding a DUX4-encoding gRNA comprising the nucleotide sequence set forth in any one of SEQ ID NOs: 3-13 and 51-54. In various aspects, the disclosure provides these gRNA as gRNA1-11 and 13-16, respectively. In some aspects, the disclosure provides gRNA12, which is used as a control. gRNA12 is a Cas13b non-targeting gRNA (Cox et al., Science 24: 358(6366):1019-27, 2017).

In various aspects, the disclosure includes a nucleic acid encoding a DUX4-encoding gRNA that specifically hybridizes to a target nucleic acid encoding DUX4 comprising the nucleotide sequence set forth in any one of SEQ ID NOs: 14-24 and 55-58. The disclosure also includes a nucleic acid further comprising a nucleotide sequence encoding a Cas13b direct repeat sequence (e.g., SEQ ID NO: 37 or a variant thereof comprising at least about 90%, 91%, 92%, 93%, 94%, 95%, 96%, 97%, 98%, or 99% identity to the sequence set out in SEQ ID NO: 37). In some aspects, the Cas13b direct repeat is located downstream or is positioned at the 3' terminus of the gRNA. In some aspects, therefore, the nucleic acid comprises, consists essentially of, or consists of the nucleotide sequence set forth in any one of SEQ ID NOs: 25-35 and 59-62. In some aspects, the nucleic acid comprises a variant comprising at least about 80%, about 85%, about 90%, about 91%, about 92%, about 93%, about 94%, about 95%, about 96%, about 97%, about 98%, or about 99% identity to the nucleotide sequence set forth in any one of SEQ ID NOs: 25-35 and 59-62. In some aspects, the disclosure includes a nucleic acid comprising a promoter, a gRNA, and a Cas13 direct repeat sequence comprising the nucleotide sequence set forth in any one of SEQ ID NOs: 38-48 and 63-66. In some aspects, the nucleic acid comprises a variant comprising at least about 70%, 75%, 80%, 81%, 82%, 83%, 84%, 85%, 86%, 87%, 88%, 89%, 90%, 91%, 92%, 93%, 94%, 95%, 96%, 97%, 98%, or 99% identity to the nucleotide sequence set forth in any one of SEQ ID NOs: 38-48 and 63-66. Such functional gRNA and constructs comprising gRNA, as described herein, are designed to target DUX4 RNA.

The disclosure includes a composition comprising any of the nucleic acids described herein in combination with a diluent, excipient, or buffer. In some aspects, the disclosure includes a vector comprising any of the nucleic acids described herein.

The delivery of these gRNAs, including gRNAs with Cas13 direct repeat sequences, along with a vector expressing a Cas13 enzyme (e.g., Cas13b) causes degradation of the DUX4 mRNA, leading to reduced DUX4 protein. In some aspects, the nucleic acid encoding the Cas13b enzyme comprises the nucleotide sequence set forth in SEQ ID NO:

36, or a variant thereof comprising at least about 70%, 75%, 80%, 85%, 90%, 91%, 92%, 93%, 94%, 95%, 96%, 97%, 98%, or 99% identity to the nucleotide sequence set forth in SEQ ID NO: 36, or a biologically active fragment thereof. In some aspects, the Cas13b gene sequence is pC0046-EF1a-PspCas13b-NES-HIV plasmid (Addgene).

In some aspects, for targeting of the DUX4 gene, one or more Cas13 construct(s) is co-transfected with one or more gRNA construct(s) into cells of interest. In additional aspects, one or more Cas13 construct(s) is co-transfected with one or more gRNA construct(s) and one or more microRNAs (miRNAs) designed to inhibit DUX4 gene expression in cells of interest.

In some aspects, the disclosure includes the use of RNA interference to downregulate or inhibit DUX4 expression. RNA interference (RNAi) is a mechanism of gene regulation in eukaryotic cells that has been considered for the treatment of various diseases. RNAi refers to post-transcriptional control of gene expression mediated by miRNAs. The miRNAs are small (21-25 nucleotides), noncoding RNAs that share sequence homology and base-pair with 3' untranslated regions of cognate messenger RNAs (mRNAs). The interaction between the miRNAs and mRNAs directs cellular gene silencing machinery to prevent the translation of the mRNAs.

In exemplary aspects, the disclosure includes the use of gRNA to interfere with DUX4 expression. In additional aspects, the disclosure includes the use of other inhibitory RNAs to be used in conjunction with the gRNA described herein to further reduce or block DUX4 expression.

As an understanding of natural RNAi pathways has developed, researchers have designed artificial shRNAs and snRNAs for use in regulating expression of target genes for treating disease. Several classes of small RNAs are known to trigger RNAi processes in mammalian cells, including short (or small) interfering RNA (siRNA), and short (or small) hairpin RNA (shRNA) and microRNA (miRNA), which constitute a similar class of vector-expressed triggers [Davidson et al., Nat. Rev. Genet. 12:329-40, 2011; Harper, Arch. Neurol. 66:933-8, 2009]. shRNA and miRNA are expressed in vivo from plasmid- or virus-based vectors and may thus achieve long term gene silencing with a single administration, for as long as the vector is present within target cell nuclei and the driving promoter is active (Davidson et al., Methods Enzymol. 392:145-73, 2005). Importantly, this vector-expressed approach leverages the decades-long advancements already made in the muscle gene therapy field, but instead of expressing protein coding genes, the vector cargo in RNAi therapy strategies are artificial shRNA or miRNA cassettes targeting disease genes-of-interest. This strategy is used to express a natural miRNA. Each shRNA/miRNA is based on hsa-miR-30a sequences and structure. The natural mir-30a mature sequences are replaced by unique sense and antisense sequences derived from the target gene.

As set out herein above, the disclosure includes the use of other inhibitory RNAs to be used in conjunction with the gRNA described herein to further reduce or block DUX4 expression. Thus, in some aspects, the products and methods of the disclosure also comprise short hairpin RNA or small hairpin RNA (shRNA) to affect DUX4 expression (e.g., knockdown or inhibit expression). A short hairpin RNA (shRNA/Hairpin Vector) is an artificial RNA molecule with a tight hairpin turn that can be used to silence target gene expression via RNA interference (RNAi). shRNA is an advantageous mediator of RNAi in that it has a relatively low rate of degradation and turnover, but it requires use of an expression vector. Once the vector has transduced the host genome, the shRNA is then transcribed in the nucleus by polymerase II or polymerase III, depending on the promoter choice. The product mimics pri-microRNA (pri-miRNA) and is processed by Drosha. The resulting pre-shRNA is exported from the nucleus by Exportin 5. This product is then processed by Dicer and loaded into the RNA-induced silencing complex (RISC). The sense (passenger) strand is degraded. The antisense (guide) strand directs RISC to mRNA that has a complementary sequence. In the case of perfect complementarity, RISC cleaves the mRNA. In the case of imperfect complementarity, RISC represses translation of the mRNA. In both of these cases, the shRNA leads to target gene silencing. In some aspects, the disclosure includes the production and administration of an AAV vector expressing DUX4 antisense sequences via shRNA. The expression of shRNAs is regulated by the use of various promoters. The promoter choice is essential to achieve robust shRNA expression. In various aspects, polymerase II promoters, such as U6 and H1, and polymerase III promoters are used. In some aspects, U6 shRNAs are used.

Thus, in some aspects, the disclosure uses U6 shRNA molecules to further inhibit, knockdown, or interfere with DUX4 gene expression. Traditional small/short hairpin RNA (shRNA) sequences are usually transcribed inside the cell nucleus from a vector containing a Pol III promoter such as U6. The endogenous U6 promoter normally controls expression of the U6 RNA, a small nuclear RNA (snRNA) involved in splicing, and has been well-characterized [Kunkel et al., Nature. 322(6074):73-7 (1986); Kunkel et al., Genes Dev. 2(2):196-204 (1988); Paule et al., Nucleic Acids Res. 28(6):1283-98 (2000)]. In some aspects, the U6 promoter is used to control vector-based expression of shRNA molecules in mammalian cells [Paddison et al., Proc. Natl. Acad. Sci. USA 99(3):1443-8 (2002); Paul et al., Nat. Biotechnol. 20(5):505-8 (2002)] because (1) the promoter is recognized by RNA polymerase III (poly III) and controls high-level, constitutive expression of shRNA; and (2) the promoter is active in most mammalian cell types. In some aspects, the promoter is a type III Pol III promoter in that all elements required to control expression of the shRNA are located upstream of the transcription start site (Paule et al., Nucleic Acids Res. 28(6):1283-98 (2000)). The disclosure includes both murine and human U6 promoters. The shRNA containing the sense and antisense sequences from a target gene connected by a loop is transported from the nucleus into the cytoplasm where Dicer processes it into small/short interfering RNAs (siRNAs).

In some embodiments, the products and methods of the disclosure comprise small nuclear ribonucleic acids (snRNAs), also commonly referred to as U-RNAs, to knockdown or further inhibit DUX4 gene expression. snRNAs are a class of small RNA molecules that are found within the splicing speckles and Cajal bodies of the cell nucleus in eukaryotic cells. Small nuclear RNAs are associated with a set of specific proteins, and the complexes are referred to as small nuclear ribonucleoproteins (snRNP, often pronounced "snurps"). Each snRNP particle is composed of a snRNA component and several snRNP-specific proteins (including Sm proteins, a family of nuclear proteins). The snRNAs, along with their associated proteins, form ribonucleoprotein complexes (snRNPs), which bind to specific sequences on the pre-mRNA substrate. They are transcribed by either RNA polymerase II or RNA polymerase III. snRNAs are often divided into two classes based upon both common sequence features and associated protein factors, such as the RNA-binding LSm proteins. The first class, known as Sm-class snRNA, consists of U1, U2, U4, U4atac, U5, U7, U11, and U12. Sm-class snRNA are transcribed by RNA polymerase II. The second class, known as Lsm-class snRNA, consists of U6 and U6atac. Lsm-class snRNAs are transcribed by RNA polymerase III and never leave the nucleus, in contrast to Sm-class snRNA. In some aspects, the disclosure includes the production and administration of an AAV vector comprising U7 snRNA for the delivery of DUX4 antisense sequences.

Figure 7:
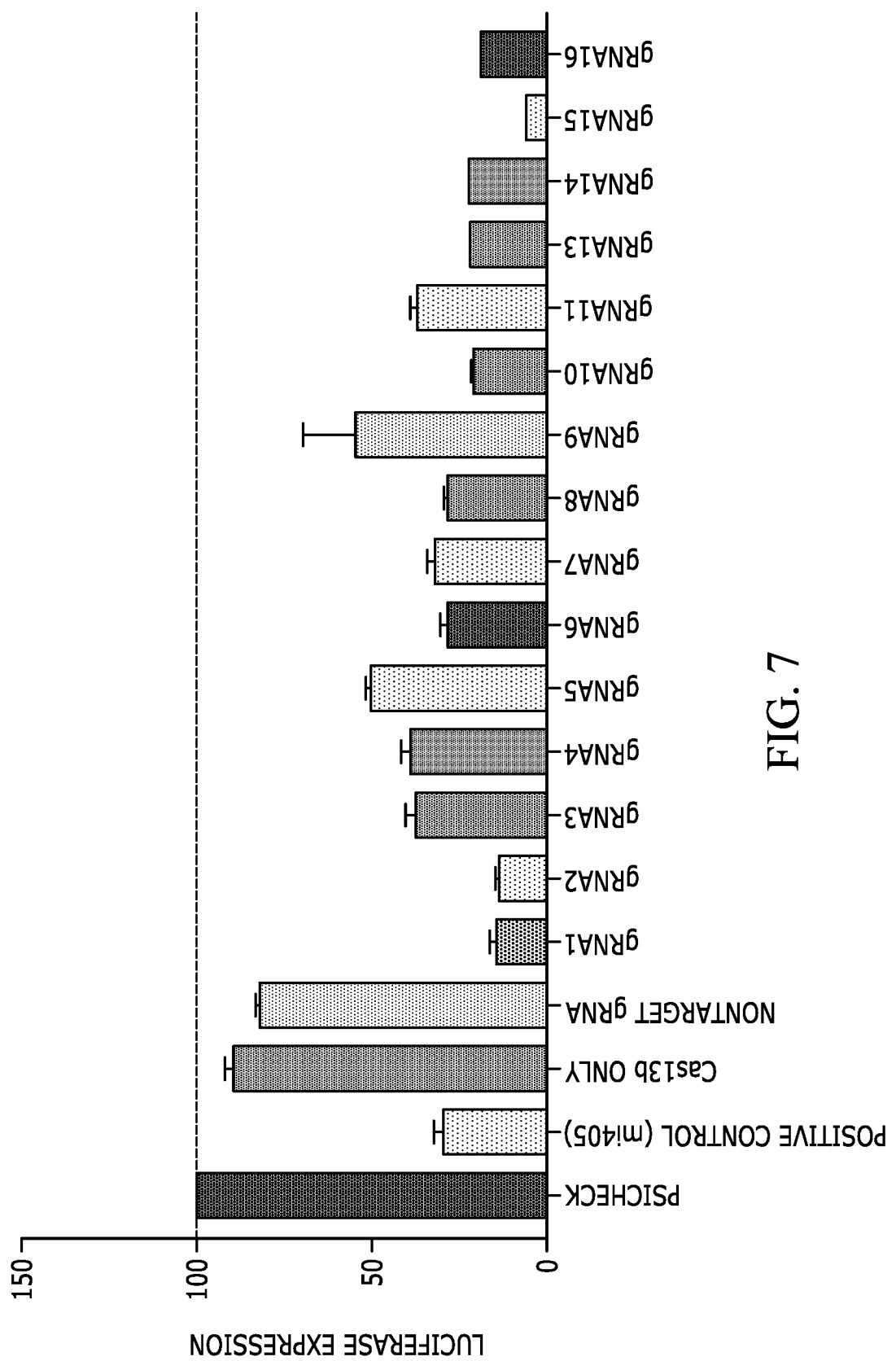
FIG. 7 shows the results of an in vitro gene silencing assay. All gRNAs were able to target DUX4 and reduce Renilla luciferase expression. The most significant silencing seen with this particular assay was achieved by gRNA1, 2, and 15.

In some aspects, the disclosure uses U7 snRNA molecules to further inhibit, knockdown, or interfere with DUX4 gene expression. U7 snRNA is normally involved in histone pre-mRNA 3' end processing but, in some aspects, is converted into a versatile tool for splicing modulation or as antisense RNA that is continuously expressed in cells [Goyenvalle et al., Science 306(5702): 1796-9 (2004)]. By replacing the wild-type U7 Sm binding site with a consensus sequence derived from spliceosomal snRNAs, the resulting RNA assembles with the seven Sm proteins found in spliceosomal snRNAs (FIG. 7). As a result, this U7 Sm OPT RNA accumulates more efficiently in the nucleoplasm and will no longer mediate histone pre-mRNA cleavage, although it can still bind to histone pre-mRNA and act as a competitive inhibitor for wild-type U7 snRNPs. By further replacing the sequence binding to the histone downstream element with one complementary to a particular target in a splicing substrate, it is possible to create U7 snRNAs capable of modulating specific splicing events. The advantage of using U7 derivatives is that the antisense sequence is embedded into a small nuclear ribonucleoprotein (snRNP) complex. Moreover, when embedded into a gene therapy vector, these small RNAs can be permanently expressed inside the target cell after a single injection [Levy et al., Eur. J. Hum. Genet. 18(9): 969-70 (2010); Wein et al., Hum. Mutat. 31(2): 136-42, (2010); Wein et al., Nat. Med. 20(9): 992-1000 (2014)]. The potential of U7snRNA systems in neuromuscular disorders using an AAV approach has been investigated in vivo (AAV.U7) [Levy et al., Eur. J. Hum. Genet. 18(9): 969-70 (2010); Wein et al., Hum. Mutat. 31(2): 136-42 (2010); Wein et al., Nat. Med. 20(9): 992-1000 (2014)]. A single injection of this AAV9.U7, targeting the defective RNA of a mouse model of Duchenne muscular dystrophy, results in long term correction of the disease in every muscle, including heart and diaphragm. The ability to target the heart is really important since DM1 patients display cardiac abnormalities.

U7 snRNA is normally involved in histone pre-mRNA 3' end processing, but also is used as a versatile tool for splicing modulation or as antisense RNA that is continuously expressed in cells. One advantage of using U7 derivatives is that the antisense sequence is embedded into a small nuclear ribonucleoprotein (snRNP) complex. Moreover, when embedded into a gene therapy vector, these small RNAs can be permanently expressed inside the target cell after a single injection.

Embodiments of the disclosure utilize vectors (for example, viral vectors, such as adeno-associated virus (AAV), adenovirus, retrovirus, lentivirus, equine-associated virus, alphavirus, pox viruses, herpes virus, polio virus, sindbis virus and vaccinia viruses) to deliver polynucleotides encoding DUX4 inhibitory RNA and DUX4 gRNA disclosed herein. In some aspects, each gRNA and each Cas13b are cloned individually into a vector. Thus, in some aspects the disclosure includes vectors comprising one or more of the nucleotide sequences described herein above in the disclosure. In some aspects, the vectors are AAV vectors. In some aspects, the vectors are single stranded AAV vectors. In some aspects the AAV is recombinant AAV (rAAV). In some aspects, the rAAV lack rep and cap genes. In some aspects, rAAV are self-complementary (sc) AAV.

In some aspects, the disclosure utilizes adeno-associated virus (AAV) to deliver nucleic acids encoding inhibitory RNAs, including the gRNA, which target the DUX4 mRNA to knock down or inhibit DUX4 expression. In some aspects, AAV is used to deliver nucleic acids encoding Cas13 or Cas13 orthologs or variants. AAV is a replication-deficient parvovirus, the single-stranded DNA genome of which is about 4.7 kb in length including 145 nucleotide inverted terminal repeat (ITRs). There are multiple serotypes of AAV. The nucleotide sequences of the genomes of the AAV serotypes are known. For example, the complete genome of AAV-1 is provided in GenBank Accession No. NC_002077; the complete genome of AAV-2 is provided in GenBank Accession No. NCP_001401 and Srivastava et al., *J. Virol.*, 45: 555-564 11983); the complete genome of AAV-3 is provided in GenBank Accession No. NC_1829; the complete genome of AAV-4 is provided in GenBank Accession No. NC_001829; the AAV-5 genome is provided in GenBank Accession No. AF085716; the complete genome of AAV-6 is provided in GenBank Accession No. NC_00 1862; at least portions of AAV-7 and AAV-8 genomes are provided in GenBank Accession Nos. AX753246 and AX753249, respectively (see also U.S. Pat. Nos. 7,282,199 and 7,790, 449 relating to AAV-8); the AAV-9 genome is provided in Gao et al., *J. Virol.*, 78: 6381-6388 (2004); the AAV-10 genome is provided in *Mol. Ther.*, 13(1): 67-76 (2006); and the AAV-11 genome is provided in *Virology*, 330(2): 375-383 (2004). Cis-acting sequences directing viral DNA replication (rep), encapsidation/packaging and host cell chromosome integration are contained within the AAV ITRs. Three AAV promoters (named p5, p19, and p40 for their relative map locations) drive the expression of the two AAV internal open reading frames encoding rep and cap genes. The two rep promoters (p5 and p19), coupled with the differential splicing of the single AAV intron (at nucleotides 2107 and 2227), result in the production of four rep proteins (rep 78, rep 68, rep 52, and rep 40) from the rep gene. Rep proteins possess multiple enzymatic properties that are ultimately responsible for replicating the viral genome. The cap gene is expressed from the p40 promoter and it encodes the three capsid proteins VP1, VP2, and VP3. Alternative splicing and non-consensus translational start sites are responsible for the production of the three related capsid proteins. A single consensus polyadenylation site is located at map position 95 of the AAV genome. The life cycle and genetics of AAV are reviewed in Muzyczka, *Current Topics in Microbiology and Immunology*, 158: 97-129 (1992).

AAV possesses unique features that make it attractive as a vector for delivering foreign DNA to cells, for example, in gene therapy. AAV infection of cells in culture is noncytopathic, and natural infection of humans and other animals is silent and asymptomatic. Moreover, AAV infects many mammalian cells allowing the possibility of targeting many different tissues in vivo. Moreover, AAV transduces slowly dividing and non-dividing cells, and can persist essentially for the lifetime of those cells as a transcriptionally active nuclear episome (extrachromosomal element). The AAV proviral genome is infectious as cloned DNA in plasmids which makes construction of recombinant genomes feasible. Furthermore, because the signals directing AAV replication, genome encapsidation and integration are contained within the ITRs of the AAV genome, some or all of the internal approximately 4.3 kb of the genome (encoding replication and structural capsid proteins, rep-cap) may be replaced with foreign DNA. The rep and cap proteins may be provided in trans. Another significant feature of AAV is that it is an extremely stable and hearty virus. It easily withstands the conditions used to inactivate adenovirus (56° to 65° C. for several hours), making cold preservation of AAV less critical. AAV may be lyophilized and AAV-infected cells are not resistant to superinfection. In some aspects, AAV is used to deliver inhibitory RNA, including the gRNA, under the control of a U6 promoter. In some aspects, AAV is used to deliver inhibitory RNA under the control of a U7 promoter. In some aspects, AAV is used to deliver both gRNA and other inhibitory RNA under the control of U7 and U6 promoters. In some aspects, AAV is used to deliver gRNA, inhibitory RNA, and Cas13 (or a Cas13 ortholog or variant) under the control of a U6 promoter.

Recombinant AAV genomes of the disclosure comprise one or more AAV ITRs flanking at least one DUX4-targeted polynucleotide construct. In some embodiments, the polynucleotide is a gRNA. In some aspects, the gRNA is administered with other polynucleotide constructs targeting DUX4. In various aspects, a gRNA is expressed under various promoters including, but not limited to, such promoters as U6, U7, tRNA, H1, minimal CMV (e.g., miniCMV), T7, EF1-alpha, Minimal EF1-alpha, skeletal muscle-specific promoters. In some aspects, such muscle-specific promoters include, but are not limited to, unc45b, tMCK, minimal MCK, CK6, CK7, MHCK7, CK1. Specifically, this strategy is used, in various aspects, to achieve more efficient expression of the same gRNA in multiple copies in a single backbone. AAV DNA in the rAAV genomes may be from any AAV serotype for which a recombinant virus can be derived including, but not limited to, AAV serotypes AAV-1, AAV-2, AAV-3, AAV-4, AAV-5, AAV-6, AAV-7, AAV-8, AAV-9, AAV-10, AAV-11, AAV-12, AAV-13, AAV-anc80, and AAV rh.74. As set out herein above, the nucleotide sequences of the genomes of various AAV serotypes are known in the art.

DNA plasmids of the disclosure comprise rAAV genomes of the disclosure. The DNA plasmids are transferred to cells permissible for infection with a helper virus of AAV (e.g., adenovirus, E1-deleted adenovirus or herpes virus) for assembly of the rAAV genome into infectious viral particles. Techniques to produce rAAV particles, in which an AAV genome to be packaged, rep and cap genes, and helper virus functions are provided to a cell are standard in the art. Production of rAAV requires that the following components are present within a single cell (denoted herein as a packaging cell): a rAAV genome, AAV rep and cap genes separate from (i.e., not in) the rAAV genome, and helper virus functions. The AAV rep genes may be from any AAV serotype for which recombinant virus can be derived and may be from a different AAV serotype than the rAAV genome ITRs, including, but not limited to, AAV serotypes AAV-1, AAV-2, AAV-3, AAV-4, AAV-5, AAV-6, AAV-7, AAV-8, AAV-9, AAV-10, AAV-11, AAV-12, AAV-13, AAV-anc80, and AAV rh.74. In some aspects, AAV DNA in the rAAV genomes is from any AAV serotype for which a recombinant virus can be derived including, but not limited to, AAV serotypes AAV-1, AAV-2, AAV-3, AAV-4, AAV-5, AAV-6, AAV-7, AAV-8, AAV-9, AAV-10, AAV-11, AAV-12, AAV-13, AAV-anc80, and AAV rh.74. Other types of rAAV variants, for example rAAV with capsid mutations, are also included in the disclosure. See, for example, Marsic et al., Molecular Therapy 22(11): 1900-1909 (2014). As noted above, the nucleotide sequences of the genomes of various AAV serotypes are known in the art. Use of cognate components is specifically contemplated. Production of pseudo-typed rAAV is disclosed in, for example, WO 01/83692 which is incorporated by reference herein in its entirety.

Recombinant AAV genomes of the disclosure comprise one or more AAV ITRs flanking a polynucleotide encoding, for example, one or more DUX4 inhibitory RNAs. Commercial providers such as Ambion Inc. (Austin, TX), Darmacon Inc. (Lafayette, CO), InvivoGen (San Diego, CA), and Molecular Research Laboratories, LLC (Herndon, VA) generate custom inhibitory RNA molecules. In addition, commercial kits are available to produce custom siRNA molecules, such as SILENCER™ siRNA Construction Kit (Ambion Inc., Austin, TX) or psiRNA System (InvivoGen, San Diego, CA). Embodiments include a rAAV genome comprising a nucleic acid comprising a nucleotide sequence set out in any of SEQ ID NOs: 25-36 and 59-62.

A method of generating a packaging cell is to create a cell line that stably expresses all the necessary components for AAV particle production. For example, a plasmid (or multiple plasmids) comprising a rAAV genome lacking AAV rep and cap genes, AAV rep and cap genes separate from the rAAV genome, and a selectable marker, such as a neomycin resistance gene, are integrated into the genome of a cell. AAV genomes have been introduced into bacterial plasmids by procedures such as GC tailing (Samulski et al., 1982, Proc. Natl. Acad. S6. USA, 79:2077-2081), addition of synthetic linkers containing restriction endonuclease cleavage sites (Laughlin et al., 1983, Gene, 23:65-73) or by direct, blunt-end ligation (Senapathy & Carter, 1984, J. Biol. Chem., 259:4661-4666). The packaging cell line is then infected with a helper virus such as adenovirus. The advantages of this method are that the cells are selectable and are suitable for large-scale production of rAAV. Other examples of suitable methods employ adenovirus or baculovirus rather than plasmids to introduce rAAV genomes and/or rep and cap genes into packaging cells.

General principles of rAAV production are reviewed in, for example, Carter, 1992, Current Opinions in Biotechnology, 1533-539; and Muzyczka, 1992, Curr. Topics in Microbial. and Immunol., 158:97-129). Various approaches are described in Ratschin et al., Mol. Cell. Biol. 4:2072 (1984); Hermonat et al., Proc. Natl. Acad. Sci. USA, 81:6466 (1984); Tratschin et al., Mol. Cell. Biol. 5:3251 (1985); McLaughlin et al., J. Virol., 62:1963 (1988); and Lebkowski et al., 1988 Mol. Cell. Biol., 7:349 (1988). Samulski et al. (1989, J. Virol., 63:3822-3828); U.S. Pat. No. 5,173,414; WO 95/13365 and corresponding U.S. Pat. No. 5,658,776; WO 95/13392; WO 96/17947; PCT/U598/18600; WO 97/09441 (PCT/US96/14423); WO 97/08298 (PCT/US96/13872); WO 97/21825 (PCT/US96/20777); WO 97/06243 (PCT/FR96/01064); WO 99/11764; Perrin et al. (1995) Vaccine 13:1244-1250; Paul et al. (1993) Human Gene Therapy 4:609-615; Clark et al. (1996) Gene Therapy 3:1124-1132; U.S. Pat. No. 5,786,211; 5,871,982; and 6,258,595. The foregoing documents are hereby incorporated by reference in their entirety herein, with particular emphasis on those sections of the documents relating to rAAV production.

The disclosure thus provides packaging cells that produce infectious rAAV. In one embodiment, packaging cells are stably transformed cancer cells, such as HeLa cells, 293 cells and PerC.6 cells (a cognate 293 line). In another embodiment, packaging cells are cells that are not transformed cancer cells, such as low passage 293 cells (human fetal kidney cells transformed with El of adenovirus), MRC-5 cells (human fetal fibroblasts), WI-38 cells (human fetal fibroblasts), Vero cells (monkey kidney cells) and FRhL-2 cells (rhesus fetal lung cells).

In some aspect, rAAV is purified by methods standard in the art, such as by column chromatography or cesium chloride gradients. Methods for purifying rAAV vectors from helper virus are known in the art and include methods disclosed in, for example, Clark et al., Hum. Gene Ther., 10(6): 1031-1039 (1999); Schenpp and Clark, Methods Mol. Med., 69 427-443 (2002); U.S. Pat. No. 6,566,118 and WO 98/09657.

In another embodiment, the disclosure includes a composition comprising rAAV comprising any of the constructs described herein. In some aspects, the disclosure includes a composition comprising the rAAV for delivering the gRNA described herein. In some aspects, the disclosure includes a composition comprising one or more of the gRNA described herein along with one or more DUX4 inhibitory RNA. In some aspects, the disclosure includes a composition comprising the rAAV for delivering the gRNA and Cas13, as described herein. In some aspects, the disclosure includes a composition comprising the rAAV for delivering the gRNA and Cas13, as described herein, and one or more DUX4 inhibitory RNA. Compositions of the disclosure comprise rAAV and one or more pharmaceutically or physiologically acceptable carriers, excipients or diluents. Acceptable carriers and diluents are nontoxic to recipients and are preferably inert at the dosages and concentrations employed, and include buffers such as phosphate, citrate, or other organic acids; antioxidants such as ascorbic acid; low molecular weight polypeptides; proteins, such as serum albumin, gelatin, or immunoglobulins; hydrophilic polymers such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugar alcohols such as mannitol or sorbitol; salt-forming counterions such as sodium; and/or nonionic surfactants such as Tween, pluronics or polyethylene glycol (PEG).

Sterile injectable solutions are prepared by incorporating rAAV in the required amount in the appropriate solvent with various other ingredients enumerated above, as required, followed by filter sterilization. Generally, dispersions are prepared by incorporating the sterilized active ingredient into a sterile vehicle which contains the basic dispersion medium and the required other ingredients from those enumerated above. In the case of sterile powders for the preparation of sterile injectable solutions, the preferred methods of preparation are vacuum drying and the freeze drying technique that yield a powder of the active ingredient plus any additional desired ingredient from the previously sterile-filtered solution thereof.

Titers of rAAV to be administered in methods of the disclosure will vary depending, for example, on the particular rAAV, the mode of administration, the treatment goal, the individual, and the cell type(s) being targeted, and may be determined by methods standard in the art. Titers of rAAV may range from about $1 \times 10^6$, about $1 \times 10^7$, about $1 \times 10^8$, about $1 \times 10^9$, about $1 \times 10^{10}$, about $1 \times 10^{11}$, about $1 \times 10^{12}$, about $1 \times 10^{13}$ to about $1 \times 10^{14}$ or more DNase resistant particles (DRP) per ml. Dosages may also be expressed in units of viral genomes (vg) (e.g., $1 \times 10^7$ vg, $1 \times 10^8$ vg, $1 \times 10^9$ vg, $1 \times 10^{10}$ vg, $1 \times 10^{11}$ vg, $1 \times 10^{12}$ vg, $1 \times 10^{13}$ vg, and $1 \times 10^{14}$ vg, respectively).

In some aspects, the disclosure provides a method of delivering any one or more nucleic acids encoding the DUX4 encoding gRNA comprising the nucleotide sequence set forth in any one of SEQ ID NOs: 3-13 and 51-54; 25-35 and 59-62; or 38-48 and 63-66, or that specifically hybridizes to a target nucleic acid encoding DUX4 comprising the nucleotide sequence set forth in any one of SEQ ID NOs: 14-24 and 55-58, to a subject in need thereof, comprising administering to the subject an AAV encoding the DUX4 encoding gRNA described herein.

In some aspects, the disclosure provides AAV transducing cells for the delivery of the DUX4 gRNA. Methods of transducing a target cell with rAAV, in vivo or in vitro, are included in the disclosure. The methods comprise the step of administering an effective dose, or effective multiple doses, of a composition comprising a rAAV of the disclosure to a subject, including an animal (such as a human being) in need thereof. If the dose is administered prior to development of the muscular dystrophy, the administration is prophylactic. If the dose is administered after the development of the muscular dystrophy, the administration is therapeutic. In embodiments of the disclosure, an effective dose is a dose that alleviates (eliminates or reduces) at least one symptom associated with the muscular dystrophy being treated, that slows or prevents progression of the muscular dystrophy, that slows or prevents progression of the muscular dystrophy, that diminishes the extent of disease, that results in remission (partial or total) of the muscular dystrophy, and/or that prolongs survival. In some aspects, the muscular dystrophy is FSHD.

Administration of an effective dose of the compositions may be by routes standard in the art including, but not limited to, intramuscular, parenteral, intravascular, intravenous, oral, buccal, nasal, pulmonary, intracranial, intracerebroventricular, intrathecal, intraosseous, intraocular, rectal, or vaginal. Route(s) of administration and serotype(s) of AAV components of rAAV (in particular, the AAV ITRs and capsid protein) of the disclosure may be chosen and/or matched by those skilled in the art taking into account the infection and/or disease state being treated and the target cells/tissue(s), such as cells that express DUX4. In some embodiments, the route of administration is intramuscular. In some embodiments, the route of administration is intravenous.

In particular, actual administration of rAAV of the present disclosure may be accomplished by using any physical method that will transport the rAAV recombinant vector into the target tissue of an animal. Administration according to the disclosure includes, but is not limited to, injection into muscle, the bloodstream, the central nervous system, and/or directly into the brain or other organ. Simply resuspending a rAAV in phosphate buffered saline has been demonstrated to be sufficient to provide a vehicle useful for muscle tissue expression, and there are no known restrictions on the carriers or other components that can be co-administered with the rAAV (although compositions that degrade DNA should be avoided in the normal manner with rAAV). Capsid proteins of a rAAV may be modified so that the rAAV is targeted to a particular target tissue of interest such as muscle. See, for example, WO 02/053703, the disclosure of which is incorporated by reference herein. Pharmaceutical compositions can be prepared as injectable formulations or as topical formulations to be delivered to the muscles by transdermal transport. Numerous formulations for both intramuscular injection and transdermal transport have been previously developed and can be used in the practice of the disclosure. The rAAV can be used with any pharmaceutically acceptable carrier for ease of administration and handling.

For purposes of intramuscular injection, solutions in an adjuvant such as sesame or peanut oil or in aqueous propylene glycol can be employed, as well as sterile aqueous solutions. Such aqueous solutions can be buffered, if desired, and the liquid diluent first rendered isotonic with saline or glucose. Solutions of rAAV as a free acid (DNA contains acidic phosphate groups) or a pharmacologically acceptable salt can be prepared in water suitably mixed with a surfactant such as hydroxypropylcellulose. A dispersion of rAAV can also be prepared in glycerol, liquid polyethylene glycols and mixtures thereof and in oils. Under ordinary conditions of storage and use, these preparations contain a preservative to prevent the growth of microorganisms. In this connection, the sterile aqueous media employed are all readily obtainable by standard techniques well-known to those skilled in the art.

The pharmaceutical forms suitable for injectable use include sterile aqueous solutions or dispersions and sterile powders for the extemporaneous preparation of sterile injectable solutions or dispersions. In all cases the form must be sterile and must be fluid to the extent that easy syringability exists. It must be stable under the conditions of manufacture and storage and must be preserved against the contaminating actions of microorganisms such as bacteria and fungi. The carrier can be a solvent or dispersion medium containing, for example, water, ethanol, polyol (for example, glycerol, propylene glycol, liquid polyethylene glycol and the like), suitable mixtures thereof, and vegetable oils. In some aspects, proper fluidity is maintained, for example, by the use of a coating such as lecithin, by the maintenance of the required particle size in the case of a dispersion and by the use of surfactants. The prevention of the action of microorganisms can be brought about by various antibacterial and antifungal agents, for example, parabens, chlorobutanol, phenol, sorbic acid, thimerosal and the like. In many cases it will be preferable to include isotonic agents, for example, sugars or sodium chloride. Prolonged absorption of the injectable compositions can be brought about by use of agents delaying absorption, for example, aluminum monostearate and gelatin.

Sterile injectable solutions are prepared by incorporating rAAV in the required amount in the appropriate solvent with various other ingredients enumerated above, as required, followed by filter sterilization. Generally, dispersions are prepared by incorporating the sterilized active ingredient into a sterile vehicle which contains the basic dispersion medium and the required other ingredients from those enumerated above. In the case of sterile powders for the preparation of sterile injectable solutions, the preferred methods of preparation are vacuum drying and the freeze drying technique that yield a powder of the active ingredient plus any additional desired ingredient from the previously sterile-filtered solution thereof.

The term "transduction" is used to refer to the administration/delivery of one or more DUX4 inhibitory RNA including, but not limited to, gRNA, and one or more Cas13-encoding nucleotides to a recipient cell either in vivo or in vitro, via a replication-deficient rAAV of the disclosure resulting in expression of DUX4 inhibitory RNAs by the recipient cell.

In one aspect, transduction with rAAV is carried out in vitro. In one embodiment, desired target cells are removed from the subject, transduced with rAAV and reintroduced into the subject. Alternatively, syngeneic or xenogeneic cells can be used where those cells will not generate an inappropriate immune response in the subject.

Suitable methods for the transduction and reintroduction of transduced cells into a subject are known in the art. In one embodiment, cells are transduced in vitro by combining rAAV with cells, e.g., in appropriate media, and screening for those cells harboring the DNA of interest using conventional techniques such as Southern blots and/or PCR, or by using selectable markers. Transduced cells can then be formulated into pharmaceutical compositions, and the composition introduced into the subject by various techniques, such as by intramuscular, intravenous, subcutaneous and intraperitoneal injection, or by injection into smooth and cardiac muscle, using e.g., a catheter.

The disclosure provides methods of administering an effective dose (or doses, administered essentially simultaneously or doses given at intervals) of rAAV that comprise DNA that encodes gRNA, targeted to interfere with DUX4 expression, and DNA that encodes Cas13b direct repeats and Cas13 to a subject in need thereof.

Transduction of cells with rAAV of the disclosure results in sustained expression of the guide RNAs targeting DUX4 expression and the Cas13b direct repeats. The present disclosure thus provides methods of administering/delivering rAAV which express inhibitory RNAs to a subject. Such subject is an animal subject, and in some aspects, the subject is human.

These methods include transducing the blood and vascular system, the central nervous system, and tissues (including, but not limited to, muscle cells and neurons, tissues, such as muscle, including skeletal muscle, organs, such as heart, brain, skin, eye, and the endocrine system, and glands, such as endocrine glands and salivary glands) with one or more rAAV of the present disclosure. In some aspects, transduction is carried out with gene cassettes comprising tissue specific control elements. For example, one embodiment of the disclosure provides methods of transducing muscle cells and muscle tissues directed by muscle specific control elements, including, but not limited to, those derived from the actin and myosin gene families, such as from the myoD gene family [See Weintraub et al., Science, 251: 761-766 (1991)], the myocyte-specific enhancer binding factor MEF-2 [Cserjesi and Olson, Mol Cell Biol 11: 4854-4862 (1991)], control elements derived from the human skeletal actin gene [Muscat et al., Mol Cell Biol, 7: 4089-4099 (1987)], the cardiac actin gene, muscle creatine kinase sequence elements [See Johnson et al., Mol Cell Biol, 9:3393-3399 (1989)] and the murine creatine kinase enhancer (mCK) element, control elements derived from the skeletal fast-twitch troponin C gene, the slow-twitch cardiac troponin C gene and the slow-twitch troponin I gene: hypozia-inducible nuclear factors [Semenza et al., Proc. Natl. Acad. Sci. USA, 88: 5680-5684 (1990], steroid-inducible elements and promoters including the glucocorticoid response element (GRE) [See Mader and White, Proc. Natl. Acad. Sci. USA, 90: 5603-5607 (1993)], the tMCK promoter [see Wang et al., Gene Therapy, 15: 1489-1499 (2008)], the CK6 promoter [see Wang et al., supra] and other control elements.

Because AAV targets every affected organ expressing DUX4, the disclosure includes the delivery of DNAs encoding the inhibitory RNAs to all cells, tissues, and organs of a subject. In some aspects, the blood and vascular system, the central nervous system, muscle tissue, the heart, and the brain are attractive targets for in vivo DNA delivery. The disclosure includes the sustained expression of DUX4 inhibitory gRNA from transduced cells to affect DUX4 expression (e.g., knockdown or inhibit expression). In some aspects, the disclosure includes sustained expression of DUX4 inhibitory gRNA from transduced myofibers. By "muscle cell" or "muscle tissue" is meant a cell or group of cells derived from muscle of any kind (for example, skeletal muscle and smooth muscle, e.g. from the digestive tract, urinary bladder, blood vessels or cardiac tissue). Such muscle cells, in some aspects, are differentiated or undifferentiated, such as myoblasts, myocytes, myotubes, cardiomyocytes and cardiomyoblasts.

In yet another aspect, the disclosure provides a method of preventing or inhibiting expression of the DUX4 gene in a cell comprising contacting the cell with a rAAV encoding a DUX4 inhibitory gRNA, wherein the gRNA is encoded by the nucleotide sequence set out in any one of SEQ ID NOs: 3-13 and 51-54. In some aspects the gRNA is encoded by a nucleotide sequence comprising about 80, 85, 90, 91, 92, 93, 94, 95, 96, 97, 98, or 99 percent identity to the sequence set out in any one of SEQ ID NOs: 3-13 and 51-54. In some aspects, expression of DUX4 is inhibited by at least about 5, about 10, about 15, about 20, about 25, about 30, about 35, about 40, about 45, about 50, about 55, about 60, about 65, about 70, about 75, about 80, about 85, about 90, about 95, about 96, about 97, about 98, about 99, or 100 percent.

In yet another aspect, the disclosure provides a method of preventing or inhibiting expression of the DUX4 gene in a cell comprising contacting the cell with a rAAV encoding a DUX4 inhibitory gRNA, wherein the gRNA specifically hybridizes to a target nucleic acid encoding DUX4 comprising the nucleotide sequence set forth in any one of SEQ ID NOs: 14-24 and 55-58. In some aspects, expression of DUX4 is inhibited by at least about 5, about 10, about 15, about 20, about 25, about 30, about 35, about 40, about 45, about 50, about 55, about 60, about 65, about 70, about 75, about 80, about 85, about 90, about 95, about 96, about 97, about 98, about 99, or 100 percent.

In yet another aspect, the disclosure provides a method of preventing or inhibiting expression of the DUX4 gene in a cell comprising contacting the cell with a vector, e.g., an rAAV vector, encoding a DUX4 inhibitory gRNA and a Cas13b direct repeat, wherein the gRNA and Cas13b repeat is encoded by a nucleotide sequence set out in SEQ ID NOs: 25-35 and 59-62, or a variant thereof. In another aspect, the disclosure provides a method of preventing or inhibiting expression of the DUX4 gene in a cell comprising contacting the cell with a vector comprising a nucleotide sequence encoding a promoter, a DUX4 inhibitory gRNA and a Cas13b direct repeat comprising the nucleotide sequence set out in SEQ ID NOs: 38-48 and 63-66, or a variant thereof. In some aspects, the variant thereof comprises at least about 80, 81, 82, 83, 84, 85, 86, 87, 88, 89, 90, 91, 92, 93, 94, 95, 96, 97, 98, or 99 percent identity to the sequence set out in any one of SEQ ID NOs: 25-35 and 59-62 or 38-48 and 63-66. In some aspects, expression of DUX4 is inhibited by at least about 5, about 10, about 15, about 20, about 25, about 30, about 35, about 40, about 45, about 50, about 55, about 60, about 65, about 70, about 75, about 80, about 85, about 90, about 95, about 96, about 97, about 98, about 99, or 100 percent.

In yet another aspect, the disclosure provides a method of preventing or treating a muscular dystrophy (including, but not limited to, FSHD) comprising administering to a subject a vector encoding a polynucleotide sequence comprising a U6 promoter sequence, a gRNA sequence targeting DUX4, and a Cas13b direct repeat sequence, wherein the polynucleotide sequence comprises the nucleotide sequence of any one of SEQ ID NOs: 3-13 and 51-54; 25-35 and 59-62; or 38-48 and 63-66. In some aspects, the Cas13b direct repeat sequence comprises the nucleotide sequence set out in SEQ ID NO: 37. In some aspects the vector is AAV. In some aspects, the AAV is recombinant AAV (rAAV). In some aspects, the rAAV lacks rep and cap genes. In some aspects, the rAAV is self-complementary (sc) AAV. In some aspects, the AAV is used with a Cas13 protein, which edits RNA. In some aspects, Cas13 is specifically directed to a transcript of interest using a sequence-specific gRNA.

In some aspects, the disclosure provides a recombinant gene editing complex comprising a nucleic acid comprising various gRNA nucleotide sequences described herein attached to a Cas13b direct repeat sequence, which is delivered in conjunction with Cas13 (e.g., Cas13b) to edit the DUX4 gene. Such gene editing complex is used for manipulating expression of DUX4 and for treating genetic disease associated with abnormal DUX4 expression, such as muscular dystrophy, particularly at the RNA level, where disease-relevant sequences, such as DUX4 are abhorrently expressed. Type VI CRISPR-Cas systems contain the programmable single-effector RNA-guided RNases Cas13. The Cas13 enzyme is capable of robust knockdown and demonstrate RNA editing by using catalytically-inactive Cas13 to transcripts in mammalian cells ((Cox et al., RNA Editing with CRISPR-Cas13, Science. 24; 358(6366): 1019-1027, 2017).

CRISPR-Cas13 does not depend upon endogenous enzymes to achieve target gene silencing, because Cas13 is prokaryotic in origin and is delivered to the target cell using more traditional gene replacement strategies. The CRISPR-Cas13 system disclosed herein to target DUX4 could be used alone or in combination with inhibitory RNA (RNAi) to improve silencing. Although RNAi efficiently accomplishes DUX4 silencing, said silencing by RNAi rarely elicits 100% silencing of the target DUX4 gene. Thus, the disclosure, in some aspects, provides for the use of both the recombinant gene editing system described herein in combination with other RNAi products and methods to target the DUX4 gene.

"Treating" includes ameliorating or inhibiting one or more symptoms of a muscular dystrophy including, but not limited to, muscle wasting, muscle weakness, myotonia, skeletal muscle problems, abnormalities of the retina, hip weakness, facial weakness, abdominal muscle weakness, joint and spinal abnormalities, lower leg weakness, shoulder weakness, hearing loss, muscle inflammation, and nonsymmetrical weakness.

Molecular, biochemical, histological, and functional endpoints demonstrate the therapeutic efficacy of the RNA interference-based products, including the Cas13 protein editing of RNA and methods disclosed herein for inhibiting the expression of the DUX4 gene on human chromosome 4q35. Endpoints contemplated by the disclosure include one or more of the reduction or elimination of DUX4 protein expression, which has application in the treatment of muscular dystrophies including, but not limited to, FSHD and other disorders associated with elevated DUX4 expression.

The disclosure also provides kits for use in the treatment of a disorder described herein. Such kits include at least a first sterile composition comprising any of the nucleic acids described herein above or any of the viral vectors described herein above in a pharmaceutically acceptable carrier. Another component is optionally a second therapeutic agent for the treatment of the disorder along with suitable container and vehicles for administrations of the therapeutic compositions. The kits optionally comprise solutions or buffers for suspending, diluting or effecting the delivery of the first and second compositions.

In one embodiment, such a kit includes the nucleic acids or vectors in a diluent packaged in a container such as a sealed bottle or vessel, with a label affixed to the container or included in the package that describes use of the nucleic acids or vectors. In one embodiment, the diluent is in a container such that the amount of headspace in the container (e.g., the amount of air between the liquid formulation and the top of the container) is very small. Preferably, the amount of headspace is negligible (i.e., almost none).

In some aspects, the formulation comprises a stabilizer. The term "stabilizer" refers to a substance or excipient which protects the formulation from adverse conditions, such as those which occur during heating or freezing, and/or prolongs the stability or shelf-life of the formulation in a stable state. Examples of stabilizers include, but are not limited to, sugars, such as sucrose, lactose and mannose; sugar alcohols, such as mannitol; amino acids, such as glycine or glutamic acid; and proteins, such as human serum albumin or gelatin.

In some aspects, the formulation comprises an antimicrobial preservative. The term "antimicrobial preservative" refers to any substance which is added to the composition that inhibits the growth of microorganisms that may be introduced upon repeated puncture of the vial or container being used. Examples of antimicrobial preservatives include, but are not limited to, substances such as thimerosal, 2-phenoxyethanol, benzethonium chloride, and phenol.

In some aspects, the kit comprises a label and/or instructions that describes use of the reagents provided in the kit. The kits also optionally comprise catheters, syringes or other delivering devices for the delivery of one or more of the compositions used in the methods described herein.

This entire document is intended to be related as a unified disclosure, and it should be understood that all combinations of features described herein are contemplated, even if the combination of features are not found together in the same sentence, or paragraph, or section of this document. The disclosure also includes, for instance, all embodiments of the disclosure narrower in scope in any way than the variations specifically mentioned above. With respect to aspects of the disclosure described as a genus, all individual species are considered separate aspects of the disclosure. With respect to aspects of the disclosure described or claimed with "a" or "an," it should be understood that these terms mean "one or more" unless context unambiguously requires a more restricted meaning. If aspects of the disclosure are described as "comprising" a feature, embodiments also are contemplated "consisting of" or "consisting essentially of" the feature.

All publications, patents and patent applications cited in this specification are herein incorporated by reference as if each individual publication or patent application were specifically and individually indicated to be incorporated by reference in its entirety to the extent that it is not inconsistent with the disclosure.

It is understood that the examples and embodiments described herein are for illustrative purposes only and that various modifications or changes in light thereof will be suggested to persons skilled in the art and are to be included within the spirit and purview of this application and scope of the appended claims.

EXAMPLES

Aspects and embodiments of the disclosure are illustrated by the following examples, which are not in any way meant to limit the scope of the invention.

Example 1

Designing and Testing DUX4 Targeting Cas13b-gRNAs

Designing DUX4-Targeting Cas13b-gRNAs

DUX4-targeting Cas13b-gRNAs were designed. Cas13b enzyme from Prevotella sp. P5-125 (PspCas13b) and relevant gRNA were used in this study. To design DUX4 specific gRNA, targeting sequences were selected to be position matched with lead microRNA (miRNA) miDUX4 constructs, such as mi405, mi406, and mi1155. See U.S. Pat. No. 9,469,851. The structure of PspCas13b gRNAs and their target sites are shown in FIG. 1. The gRNA sequences with human U6 promoter were synthesized by Integrated DNA Technologies (IDT) (Skokie, Ill). The plasmid expressing human codon optimized PspCas13b (pc0046) was purchased from Addgene (Cambridge, MA).

Western Blot Assay

HEK293 cells (250,000 cells/well) were seeded in a 24-well plate 16 hrs before transfection. The next morning, the cells were co-transfected with 900 ng of PspCas13b and 1800 ng gRNA plasmids using Lipofectamine 2000 (Thermofisher, US). The medium was changed 8-10 hrs after transfection, and the cells were re-transfected with 180 ng DUX4 plasmid. 20 hrs post-transfection, the cells were lysed in RIPA buffer (50 mM Tris, 150 mM NaCl, 0.1% SDS, 0.5% sodium deoxycholate, 1% Triton X 100) supplemented with a cocktail containing protease inhibitors. Protein concentration was determined by the DC protein assay kit (Bio-Rad Laboratories). 20 µg of each total protein sample were run on 12% SDS-olyacrylamide gels. GE Healthcare Rainbow Molecular Weight Marker (Fisherscientific, USA) was used to determine the molecular weight of the protein bands. The proteins were transferred from SDS-PAGE gels onto PVDF membranes via a semi-dried transfer method. The membrane was blocked in 5% non-fat milk, and then incubated with primary monoclonal mouse anti-DUX4 (1:500; P4H2, Novus Biologicals), or rabbit polyclonal anti-α Tubulin antibodies (1:1,000; ab15246, Abcam, Cambridge, MA) overnight at 4° C. The next day following the washes, blots were then probed with horseradish-peroxidase-conjugated goat anti-mouse or goat anti-rabbit secondary antibodies (1:100,000; Jackson ImmunoResearch, West Grove, PA) for 1 hr at room temperature. Relative protein bands were developed on X-ray films after short incubation in Immobilon Chemiluminescent HRP Substrate (Millipore, Billerica, MA).

Cell Death Assay

HEK293 cells (50,000 cells/well) were co-transfected with DUX4, Cas13b, and gRNA expressing plasmids using lipofectamine 2000 and plated on 96-well plates. Cell death was measured using the Apo-ONE Homogeneous caspase-3/7 Assay (Promega, Madison, WI) 48 hrs post-transfection using a fluorescent plate reader (Spectra max M2, Molecular Devices, Sunnyvale, CA). Individual assays were performed in triplicate (n=3), and data was reported as mean caspase activity relative to the only DUX4 transfected control. Results are shown in FIG. 2B.

Viability Assay

HEK293 cells (250,000 cells/well) were co-transfected with DUX4, Cas13b, and gRNA expressing plasmids using lipofectamine 2000 and plated on 24-well plates. After a 48 hr incubation at 37° C. with 5% $CO_2$, cells were trypsinized and collected in 1 ml of growth media. Automated cell counting was performed using the Countess® Cell Counting Chamber Slides (Thermofisher, US). The results were then confirmed with traditional cell counting using a hemacytometer and trypan blue staining. Data were reported as mean total cell number per experiment. The error bars indicate SD. Results are shown in FIG. 2C.

RNAscope Assay

Cas13b and gRNA plasmids, 3 and 6 μg respectively, were co-transfected into FSHD myoblasts [15A cells (Jones et al., Human Molecular Genetics 21(20):4419-30, 2012); 500,000 cells/reaction] using the Lonza Nucleofector Kit (Lonza, VVPD-1001). The FSHD myoblasts then were cultured on glass coverslips in two wells of 24-well plate containing myoblast growth media. Twenty-four hours later, the growth media was replaced with differentiation media and cells differentiated into myotubes for 7 days. Myotubes were fixed in 4% PFA (Fisher Scientific, USA) for 30 minutes at room temperature. They were then dehydrated by 50%, 70%, and 100% ethyl alcohol gradients at 5 minutes each at room temperature. Cells were stained with designed DUX4 probes using RNAscope 2.5 HD Assay Brown (Advanced Cell Diagnostics), according to the manufacturer's protocol. Images were taken with an Olympus DP71 microscope.

Quantitative Real Time-PCR Analysis of DUX4 Biomarkers

Cas13b and gRNA plasmids, 3 and 6 μg respectively, were co-transfected into FSHD myoblasts (15A, 500,000 cells/reaction) using the Lonza Nucleofector Kit (Lonza, VVPD-1001), and then were cultured in a 12-well plate. Twenty-four hours later, the growth media was discarded and fresh differentiation media was added on cells aimed to differentiating myoblasts into myotubes. Cells were differentiated for 7-9 days. Total RNA was extracted using Trizol (Fisher, Waltham, MA) according to the manufacturer's protocol. The quality and quantity of isolated RNA was examined by NanoDrop™ (ThermoFisher Scientific). The isolated RNA was then DNase-treated (DNA-Free, Ambion, TX), and was used for RT-PCR using random hexamers (Applied Biosystems cDNA Archive Kit; Applied Biosystems, Foster City, CA). Subsequent cDNA samples were then used as a template for the Taqman Assay using predesigned PRAMEF12 (a biomarker of DUX4 activity) and human RPL13A control primer/probe sets (Applied Biosystems). Each sample was run in duplicate. All data were normalized to Cas13b-expressing samples.

Example 2

DUX4-mRNA Targeting gRNAs

The CRISPR-Cas system, a bacterial immune system, has been used for genome or RNA editing in mammalian cells. The goal of this study was to develop a prospective treatment for a muscular dystrophy, such as FSHD, using a DUX4 gene silencing RNA targeting CRISPR-Cas13 approach. To do this, eleven different Cas13b gRNAs targeting the human DUX4 mRNA (FIG. 1) were engineered. Each gRNA sequence was cloned into an U6-promoter-driven expression cassette, and in vitro screening assays were performed to identify lead DUX4-targeted gRNAs.

According to Cox et al. (supra), Cas13b enzyme from Prevotella sp. P5-125 (PspCas13b) used in this study is a highly efficient Cas13 enzyme for mammalian RNA editing. Cas13b gRNAs do not have any particular protospacer-flanking sequence (PFS) constraints interfering in mammalian cells; however, a G base at the 5' end or dual 3' and 5' ends may slightly increase the efficiency of the PspCas13b enzyme (Cox et al., supra). Because of the lack of a strong PFS preference, any part of the desired mRNA could be selected as a target sequence and the relevant reverse complementary sequence can be used in Cas13b gRNA. Previously, researchers used shRNA position matched gRNAs to facilitate a better comparison between efficiency of each method (Omar et al., Nature 550(7675): 280-4, 2017).

Figure 1B:
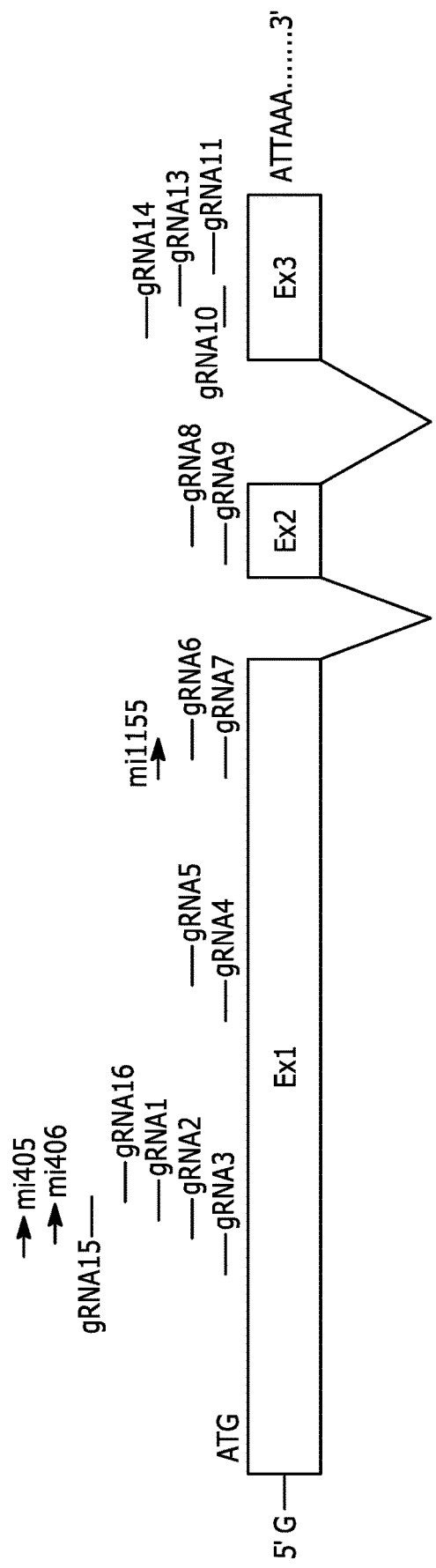

In this experiment, targeting sequences were selected to be position matched with several miDUX4 RNA sequences, such as mi405, mi406, and mi1155 (see U.S. Pat. No. 9,469,851). Because these miRNAs demonstrated a significant reduction in amount of DUX4 mRNA, it was theorized that the target mRNA sequences have good accessibility (open or partially open structures) for targeting miRNAs and, subsequently, position-matched gRNAs. The PspCas13b gRNAs' target sites are shown in FIG. 1A-B. The sequence of each gRNA is set out in SEQ ID NOs: 3-13 and 51-54. The DUX4 DNA target sequence for each gRNA is set out in SEQ ID NOs: 14-24 and 55-58.

Example 3

Selection of DUX4-mRNA Targeting gRNAs

The DUX4-mRNA targeting gRNA sequences disclosed herein were selected for their ability to decrease DUX4 protein and its toxicity.

Each gRNA plasmid was transfected along with a Cas13b plasmid and a DUX4 plasmid in HEK293 cells. The ability of each gRNA to silence DUX4 at the protein level was investigated (FIG. 2A). Each gRNA tested was found to reduce DUX4 protein expression in vitro.

Each gRNA was then tested for its ability to reduce DUX4 induced apoptosis in transfected cells via a caspase 3/7 assay. Each gRNA reduced caspase 3/7 activity compared to cells only transfected with DUX4 (control) (FIG. 2B). The cell viability assay carried out demonstrated that each gRNA increased viability of the treated cells, i.e., reducing DUX4-induced apoptosis (FIG. 2C).

HEK293 cells were co-transfected with different ratios of DUX4:Cas13b expressing plasmids to determine if different ratios worked better, and a Western blot assay was carried out to examine effects on DUX protein expression. All tested ratios showed a decrease in DUX4 protein amount (FIG. 2D).

Example 4

RNAscope In Situ Hybridization Demonstrated Significant Decreases in DUX4 mRNA Amount in Treated FSHD Myotubes To investigate DUX4 silencing at the RNA level, treated FSHD myoblasts differentiated into myotubes and RNAscope in situ hybridization was carried out using specifically designed DUX4-targeted probes.

Figure 3A:
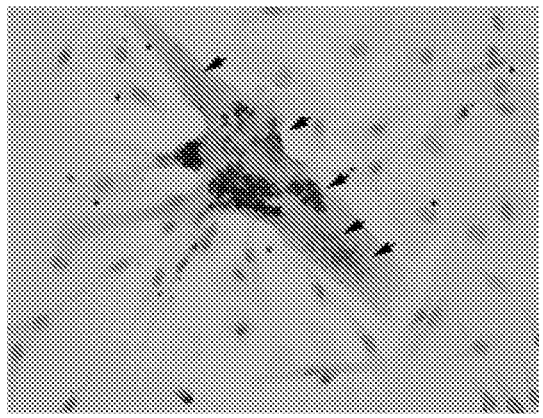
FIG. 3A-E shows RNAscope images of treated and untreated myotubes.
Figure 3B:
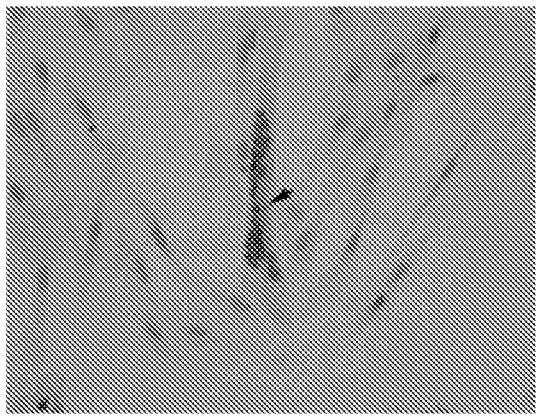
Figure 3C:
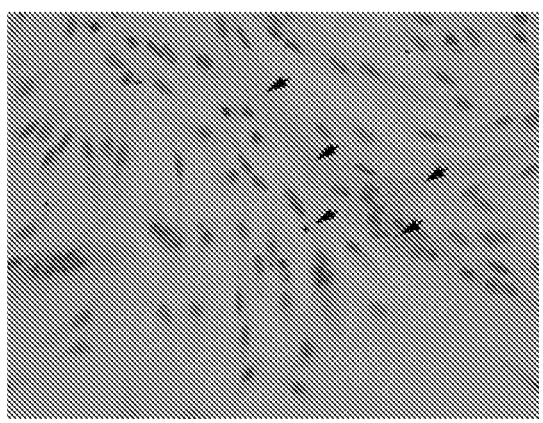
Figure 3D:
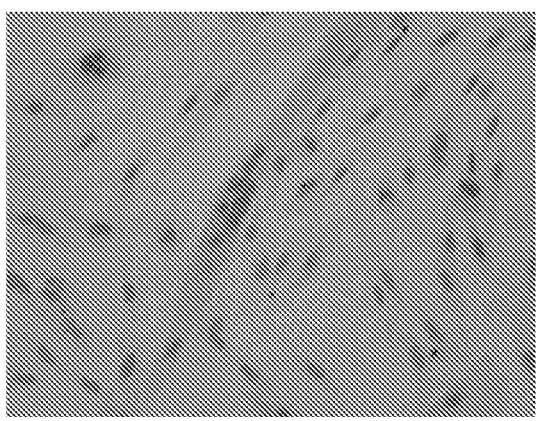
Figure 3E:
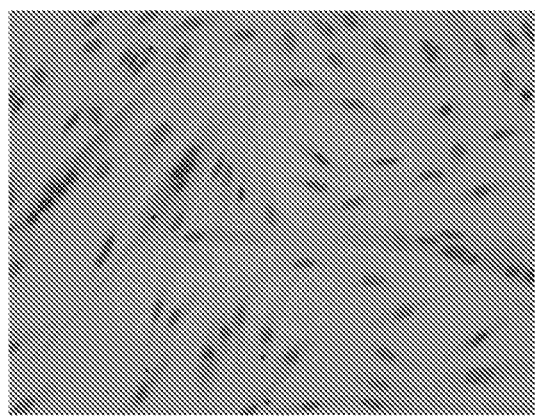

While untreated FSHD myotubes demonstrated a high level of DUX4 mRNA (FIG. 3A), all samples treated with gRNAs targeted for DUX4 with Cas13b showed significantly reduced amounts of DUX4 mRNA (FIG. 3D and FIG. 3E), as evidenced by the brown staining. In fact, samples treated with gRNAs targeted for DUX4 with Cas13b exhibited DUX4 mRNA levels similar to levels observed in healthy myotubes (FIG. 3B (control)). Treatment with Cas13b alone (control) led to some reductions in DUX4 mRNA level (FIG. 3C); however, the DUX4 mRNA level was still greater than that of the healthy control (FIG. 3B) and there was a significant difference between Cas13b controls (FIG. 3C) and DUX4-targeted gRNA-Cas13b-treated samples (FIGS. 3D and 3E).

Example 5

Decreased PRAMEF12 Biomarker Expression Level in Treated Cells Indicates a Reduction in DUX4 Activity To determine the decrease in gene expression of DUX4 targets brought about by the introduction of gRNAs targeting DUX4 with Cas13b, quantitative RT-PCR was carried out to measure PRAMEF12 expression (i.e., a biomarker indicative of DUX4 activity) in FSHD myotubes treated with DUX4-mRNA targeting gRNA-Cas13b sequences using PRAMEF12-specific probes and primers. FSHD affected human Myoblasts (15A) were co-transfected with plasmids expressing Cas13b and gRNAs, then differentiated into myotubes for more than seven days. Total RNA was isolated by Trizol (Ambion) according to the manufacturer's protocol. Complementary DNA (cDNA) were generated using the High-Capacity cDNA Reverse Transcription Kit (Applied Biosystems) after elimination of genomic DNA. Quantitative PCR (qPCR) reactions were carried out using the TaqMan Gene Expression Master Mix protocol (Thermo-Fisher Scientific). The following program was used for qPCR analysis: 1 cycle denaturation at 95° C. for 10 min, 39 cycles at 95° C. for 15 sec following at 60° C. for 1 min, and 1 cycle cooling at 40° C. Human Ribosomal Protein L13A (RPL13A) was used as a reference gene. Data were analyzed by Delta-Delta-CT ($2^{-\Delta\Delta CT}$) algorithm to calculate relative gene expression. The expression of PRAMEF12 was normalized to only Cas13b transfected myotubes as a negative control.

Figure 4:
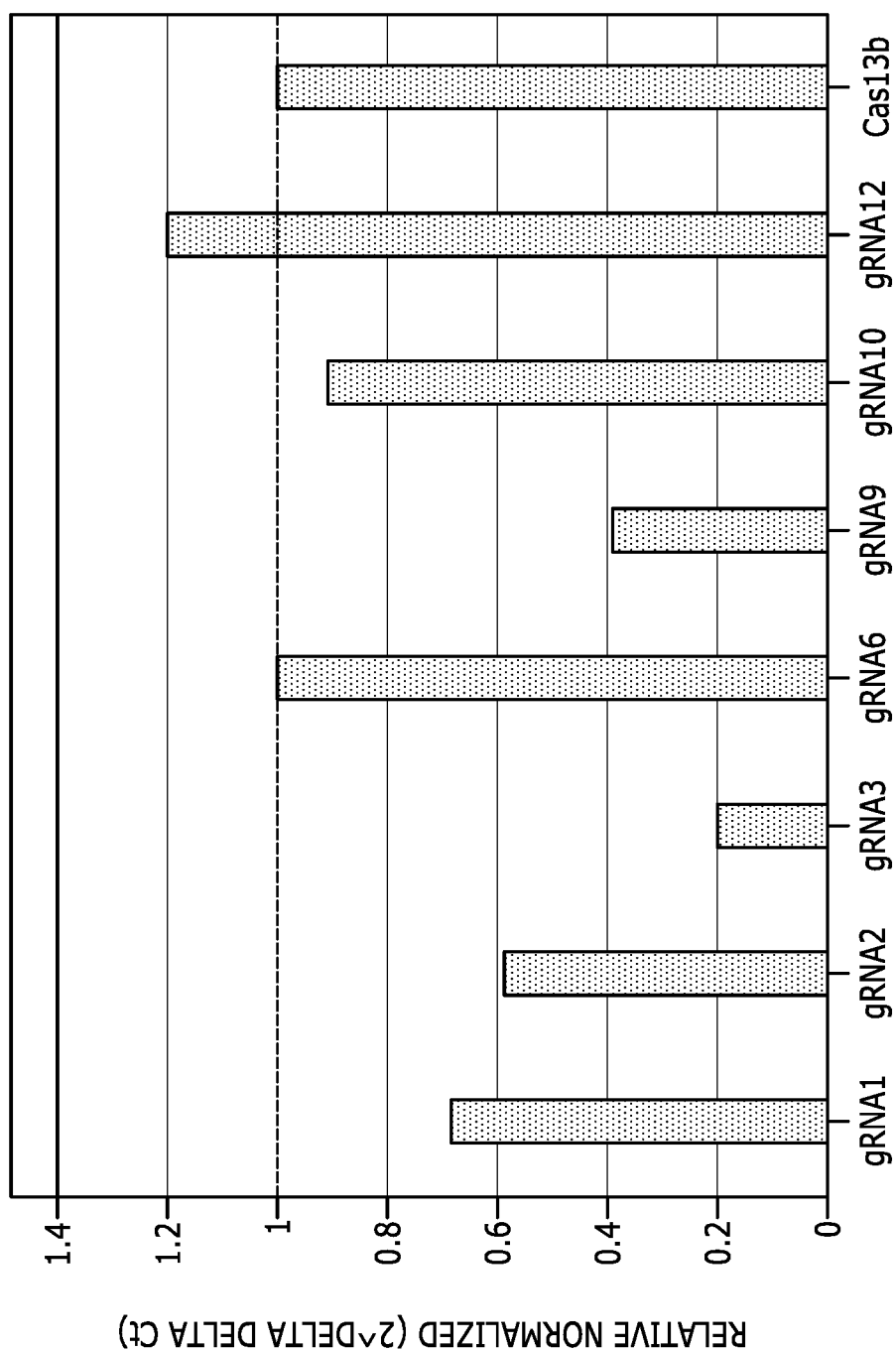
FIG. 4 shows expression of the DUX4-associated biomarker PRAME family member 12 (PRAMEF12) in FSHD myotubes treated with Cas13b+gRNAs or controls. DUX4 is a transcription factor known to activate several downstream genes, including PRAMEF12. FSHD myotubes treated with CRISPR-Cas13b gRNA1, gRNA2, gRNA3, and gRNA9 significantly reduced PRAMEF12 expression compared to cells treated with Cas13b alone, or Cas13b+gRNA12. These results indicate that reduction in DUX4 expression is associated with reduced DUX4-activated biomarkers. Each individual assay was performed in duplicate for each condition.

FSHD myotubes treated with CRISPR-Cas13b gRNA1, gRNA2, gRNA3, and gRNA9 significantly reduced PRAMEF12 expression (up to 80% in cells treated with gRNA3) compared to Cas13b alone, or Cas13b+gRNA12 transfected cells (see FIG. 4).

Example 6

Determining Effective Dosages

Cas13b and gRNA dose-escalation experiments are carried out to define an effective dose range for DUX4 knockdown. To increase the efficiency of DUX4 gene silencing using the CRISPR-Cas13 method described herein, combinations of each lead gRNA are cloned into the same plasmid backbone and tested for their ability to inhibit DUX4 expression in FSHD patient myoblast cell lines by examining DUX4 expression and the expression of various DUX4 biomarkers, such as ZSCAN4, PRAMEF12, PRAMEF2, MBD3L2, KHDC1L, TRIM43, LEUTX, and the like. Such FSHD myoblast cell lines include, but are not limited to, e.g., the Wellstone 17A, 12A, 18A, and the like (Jones et al., Human Mol. Genetics 21(20):4419-30, 2012). DUX4 expression and DUX4 biomarker expression levels are analyzed by qRT-PCR and/or RNAscope in situ hybridization.

Example 7

Cas13b and gRNA Packaging

Cas13b and the various gRNAs described herein are packaged into AAV vectors for testing the efficacy of DUX4 silencing in vivo. In some aspects, Cas13b and gRNAs are packaged into two different AAV vectors. The PspCas13b gene is a 3270 nucleotide sequence, also referred to as Prevotella sp. P5-125 (PspCas13b) (Cox et al., RNA Editing with CRISPR-Cas13, Science. 24; 358(6366): 1019-1027, 2017). Plasmid containing this sequence was purchased from Addgene (Cat No: 103862, plasmid name: pC0046-EF1a-PspCas13b-NES-HIV) and is of sufficient size for packaging into a single stranded (ss) AAV vector. In various aspects, Cas13b gene expression cassettes are constructed using shorter and weaker promoters, such as mini-CMV promoter, or skeletal muscle-specific promoters, such as compact unc45b and minimal MCK promoters, like CK6 or tMCK. In some aspects, regulatory sequences, such as Kozak sequence present at the beginning of Cas13b sequence described herein, Woodchuck Hepatitis Virus (WHP) Posttranscriptional Regulatory Element (WPRE), HIV nuclear export signal (NES), and SV40polyA signal, are added into the cassette to increase efficiency of translation and stability of the mRNA. For example, Kozak, WPRE, and HIV NES sequences are present in the Cas13b plasmid (Addgene (PC0046); see SEQ ID NO: 36).

In various aspects, gRNAs are expressed under different promoters, e.g., promoters such as U6, U7, tRNA, H1, miniCMV, T7, or minimal EF1-alpha. Specifically, this strategy is contemplated to provide more efficient expression of the same gRNA in multiple copies in a single backbone. AAV pro-viral plasmids containing multiple copies of each gRNA or a combination of two or more gRNAs is made and used for making AAV particles. Each gRNA is cloned with its own promoter, targeting sequence, Cas13b gRNA direct repeat, and terminal signal. These constructs are small enough to package into self-complementary AAV (scAAV) vectors. Different serotypes of AAV vectors including, but not limited to, AAV6, AAV9, and AAV2, are generated and tested. As described herein above, the disclosure is not limited to these AAV vectors, as all types of vectors are included for use with the products and methods of the disclosure. AAV particles carrying Cas13b or gRNA expressing cassettes are made by triple transient transfection of HEK293 cells, as described by Rashnonejad et al. (Mol. Biotechnol. 58(1):30-6, 2016) and Gao et al. (Introducing genes into mammalian cells: Viral vectors. In: Green MR, Sambrook J, editors. Molecular cloning: A laboratory manual. Vol. 2. New York: Cold Spring Harbor Laboratory Press; 2012. pp. 1209-1313).

Example 8

Testing in a DUX4 Mouse Model

Cas13b and the various gRNAs packaged into AAV vectors are tested for their efficacy in DUX4 silencing in vivo in various mouse models, e.g., the recently published TIC-DUX4 mouse model (Giesige et al., JCI Insight, 3(22): e123538, 2018) and/or the previously published iDUX4pA mouse model (Bosnakovski et al., Nature Commun. 8(1): 550, 2017). Intramuscular injection (IM) or intravascular injection is used for delivering AAV vectors into mice. DUX4 expression is activated by Tamoxifen (TIC-DUX4) or doxycycline (iDUX4pA) administration via oral gavage. Muscle histology, molecular analysis, physical activity, and physiological analysis of treated mice is performed as described (Giesige et al., supra).

Example 9

Testing in a DUX4 Mouse Model

To determine safety, toxicology, and efficacy of Cas13b and gRNA vectors, dose escalation experiments of AAV vectors expressing gRNAs, Cas13 enzyme, and their combinations are carried out.

For safety studies, various doses of AAV vectors carrying gRNAs, Cas13 enzyme, and their combinations are administrated into wild-type C57BL/6J mouse mice via intramuscular (IM, 40 ul=TA, 100 ul=GAS) or via tail vein injection in adult mice (7-8 week old). For IV administration, volumes are dependent on mouse weight/blood volume not to exceed 10% of the animals total body weight. AAV doses, in some aspects, range from 1E8 DNAse Resistant Particles (DRP) to 1E13 DRP or greater, and those shown to be non-toxic in wild-type mice are tested for protective properties in FSHD animals.

Phenotypes, histopathology, muscle degeneration, muscle regeneration, and moleculary analyses are measured at different time points. In various aspects, phosphate buffered saline (PBS)-injected mice are used as controls. Mice are euthanized at different time points after giving them a high dose of ketamine/xylazine. Various muscles and organs are extracted and isolated for histology, molecular analyses, and pathological analyses.

DUX4 expression in TIC-DUX4 or/and iDux4pA mice is induced. Several of the highest doses of gRNA and Cas13 that were shown to be safe and not cause toxicity in wild-type mouse dose escalations studies, are tested. AAV delivery of CRISPR-Cas components, such as gRNA and Cas13b is performed on neonates or young adult mice. Neonate injections are carried out at post-natal day 1 through day 3. A 10 microliter volume is used for neonate injections either by intramuscular or temporal vein injection. Adult injections are performed either by intramuscular or tail vein injection. At various time points after Cas13/gRNA gene delivery, animals have blood, organs, and limb muscles tested (including measuring strength and activity parameters) and/or collected for various molecular, histological, functional and physiological analyses to determine treatment efficacy.

Example 10

DUX4 Activity in FSHD Myotubes Decreased after Transfection with Cas13b and gRNA Plasmids To determine if the DUX4-mRNA targeting gRNA sequences disclosed herein were able to decrease DUX4 protein activity, 500,000 FSHD myoblasts (15A) were electroporated with 3 µg of Cas13b and 6 µg of gRNA plasmids. Cells then differentiated into myotubes for 7 days after adding differentiation media. Total RNA was isolated using the TRIZOL® method according to the manufacturer's protocol and qRT-PCR was carried out for three DUX4 activity biomarkers, i.e., TRIM43, MBD3L2, and PRAMEF12.

Quantitative Real Time-PCR Analysis of DUX4 Biomarkers
Cas13b and gRNA plasmids, 3 and 6 µg respectively, were co-transfected into FSHD myoblasts (15A, 500,000 cells/reaction) using the Lonza Nucleofector Kit (Lonza, VVPD-1001), and then were cultured in a 12-well plate. Twenty-four hours later, the growth media was discarded and fresh differentiation media was added on cells aimed to differentiating myoblasts into myotubes. Cells were differentiated for 7-9 days. Total RNA was extracted using Trizol (Fisher, Waltham, MA) according to the manufacturer's protocol. The quality and quantity of isolated RNA was examined by Nanodrop, then was DNase-treated (DNA-Free, Ambion, TX), and was used for RT-PCR using random hexamers (Applied Biosystems cDNA Archive Kit; Applied Biosystems, Foster City, CA). Subsequent cDNA samples were then used as a template for the Taqman Assay using predesigned TRIM43, MBD3L2, and PRAMEF12 (biomarkers of DUX4 activity) and human RPL13A control primer/probe sets (Applied Biosystems). Each sample was run in triplicate and experiments were repeated three times. All data were normalized to Cas13b-expressing samples.

Figure 6C:
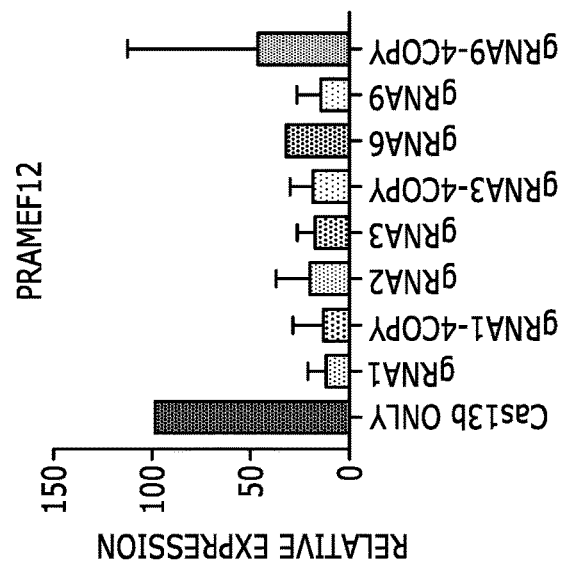
FIG. 6A-C shows qRT-PCR results of the inhibition of DUX4 activity as exhibited by the decrease in relative expression levels of various DUX 4 targets (biomarkers), i.e., TRIM43 (FIG. 6A), MBD3L2 (FIG. 6B), and PRAMEF12 (FIG. 6C), for DUX4 activity after transfection by Cas13b and various gRNA plasmids. Human RPL13A was used as the reference gene. The expression levels of these biomarkers was normalized to only Cas13b transfected myotubes as a negative control. The expression level of each of the three biomarkers was reduced after transfecting with Cas13b and gRNAs compared to only Cas13b transfected cells.
Figure 6B:
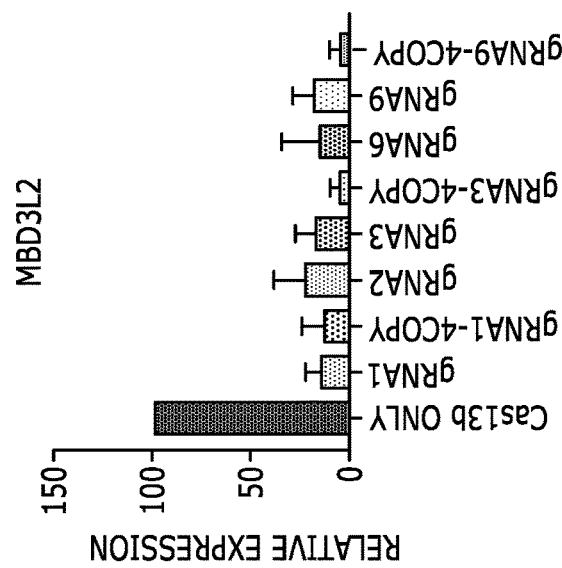
Figure 6A:
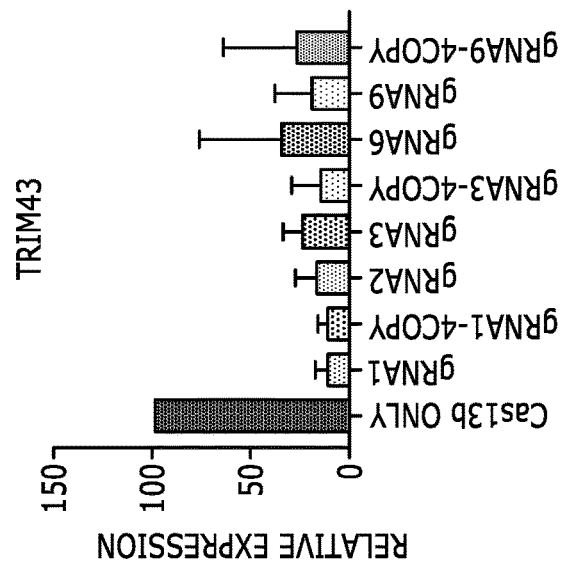

FIG. 6A-C shows qRT-PCR results of the inhibition of DUX4 activity as exhibited by the decrease in relative expression levels of various DUX 4 targets (biomarkers), i.e., TRIM43 (FIG. 6A), MBD3L2 (FIG. 6B), and PRAMEF12 (FIG. 6C), for DUX4 activity after transfection by Cas13b and various gRNA plasmids. Human RPL13A was used as the reference gene. The expression levels of these biomarkers was normalized to only Cas13b transfected myotubes as a negative control. The expression level of each of the three biomarkers was reduced after transfecting with Cas13b and gRNAs compared to only Cas13b transfected cells.

Compared to Cas13b transfected cells (control), all tested gRNAs were able to reduce the expression level of all three biomarkers (FIG. 6A-C).

These experiments show that the gRNA sequences disclosed herein were successful at reducing DUX4 activity as indicated by the decreased expression of the biomarkers for DUX4. These experiments also show that multiple copies of the gRNA sequences in one AAV vector plasmid are effective in decreasing expression of DUX4 biomarkers.

Example 11

Selection of Additional DUX4-mRNA Targeting gRNAs

Additional DUX4-mRNA targeting gRNA sequences (i.e., gRNA 13-16) were designed and selected for their ability to decrease DUX4 protein and its toxicity.

Guide RNAs 13 and 14 were designed to target DUX4 polyA signal (PLAM):

```
gRNA13 targeting site:
                                    (SEQ ID NO: 55)
TGTGCCCTTGTTCTTCCGTGAAATTCTGGC;
and gRNA14 targeting site:
                                    (SEQ ID NO: 56)
GTGCGCACCCCGGCTGACGTGCAAGGGAGC.
```

Guide RNAs 15 and 16 were designed to target DUX4 Exon 1:

```
gRNA15 targeting site:
                                    (SEQ ID NO: 57)
TCCCGGAGTCCAGGATTCAGATCTGGTTTC;
and gRNA16 targeting site:
                                    (SEQ ID NO: 58)
CTGGTTTCAGAATCGAAGGGCCAGGCACCC.
```

These additional gRNA were also tested out in the experiments described herein and shown to be effective in reducing DUX4 expression.

Example 12

DUX4-mRNA Expression Silenced by Cas13b and gRNAs

The ability of each gRNA to silence DUX4 was investigated using a luciferase assay and an in vitro fluorescent assay.

Luciferase Assay

The dual luciferase reporter plasmid was modified from Psicheck2 (Promega) with a firefly luciferase cassette serving as a transfection control and the human DUX4 gene (coding region plus 3' UTR including introns) cloned downstream of the Renilla luciferase stop codon, serving as a 3' UTR (Wallace et al., 2018, Pre-clinical Safety and Off-Target Studies to Support Translation of AAV-Mediated RNAi Therapy for FSHD, Mol Ther Methods Clin Dev.). HEK293 cells were co-transfected (Lipofectamine 2000; Invitrogen) with the luciferase DUX4 reporter, Cas13b, and individual U6.gRNA expression plasmids in a 1:6:28 molar ratio. DUX4 gene silencing was determined as previously described (Wallace et al., RNA interference inhibits DUX4-induced muscle toxicity in vivo: implications for a targeted FSHD therapy. Mol. Ther. 2012; 20:1417-1423.) Triplicate data were averaged per experiment and individual experiments performed three times. Results were reported as the average ratio of Renilla to firefly luciferase activity ±SD for all combined experiments.

All gRNAs were able to target DUX4 and reduce Renilla luciferase expression. The most significant silencing seen with this particular assay was achieved by gRNA1, 2, and 15 (FIG. 7).

In vitro Fluorescent Assay

HEK293 cells were co-transfected with a plasmid containing human DUX4 gene (coding region plus 3' UTR including introns) cloned downstream of the mCherry stop codon as a 3'UTR, and with Cas13b and gRNA expressing plasmids (gRNA1 and gRNA2). Pictures of the cells were taken 48 hours post-transfection.

Figure 8:
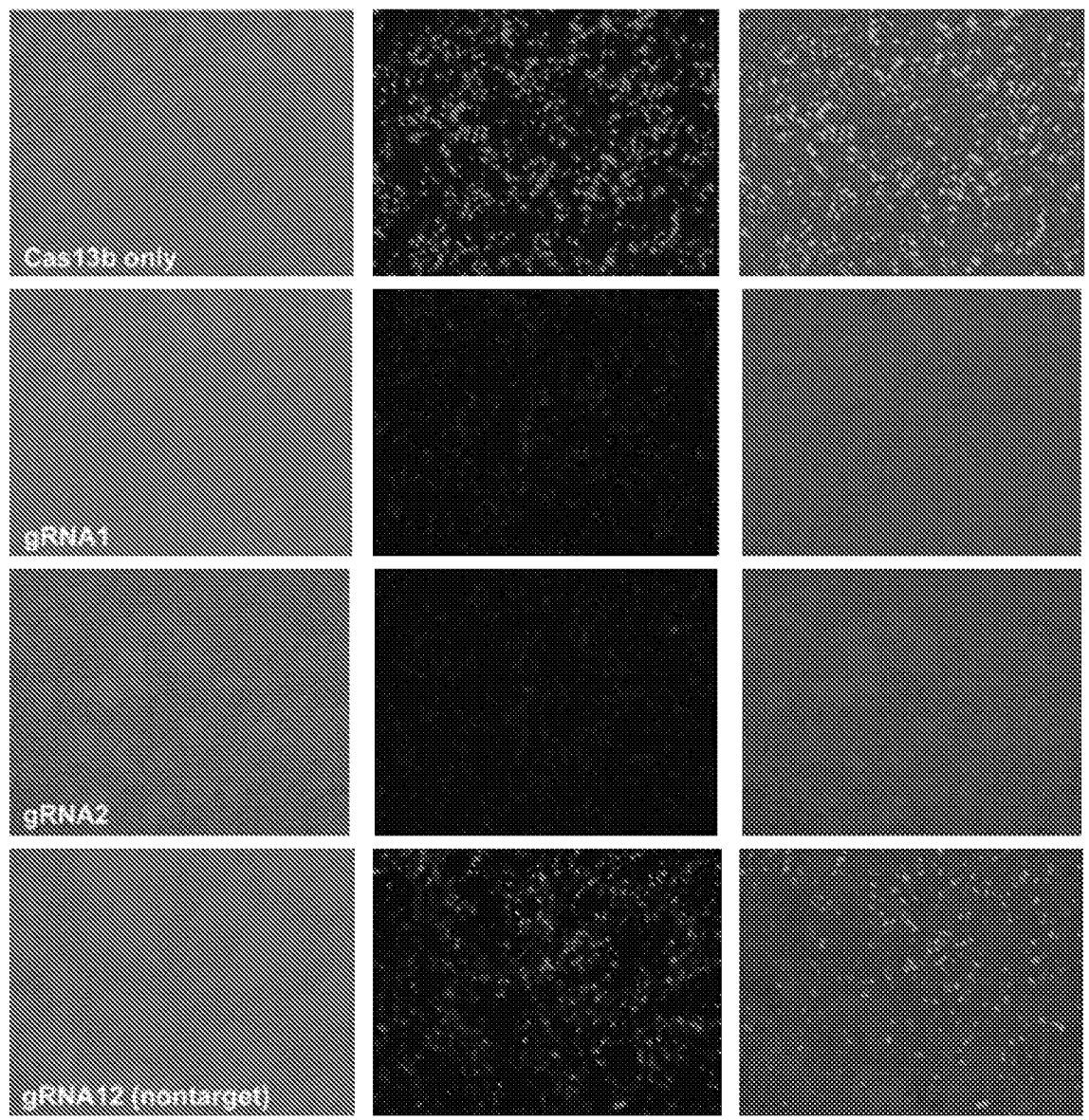
FIG. 8 shows the results of an in vitro fluorescent assay carried out to measure the reduction in DUX4 expression using mCherry expression as a marker. There was significant reduction mCherry expression with cells treated with gRNA1 and 2 compared to nontargeting gRNA (gRNA12) or Cas13b alone transfected cells.

There was significant reduction mCherry expression (as an indicator of DUX4 expression) with cells treated with gRNA1 and 2 compared to nontargeting gRNA (gRNA12) or compared to Cas13b alone transfected cells (FIG. 8).

Each gRNA tested was found to reduce DUX4 expression in vitro.

Example 13

Testing in a Neonatal TIC-DUX4 Mouse Model

TIC-DUX4 mice can be induced by tamoxifen to develop mild and progressive muscle pathology. Accordingly, TIC-DUX4 mice received 1 mg/kg tamoxifen three times per week to develop muscle pathology and then determine the effects of the administration of Cas13 and gRNAs of the disclosure on the muscle pathology. Mice were treated and sacrificed at different times after treatment with Cas13 and gRNA1.

Figure 9A:
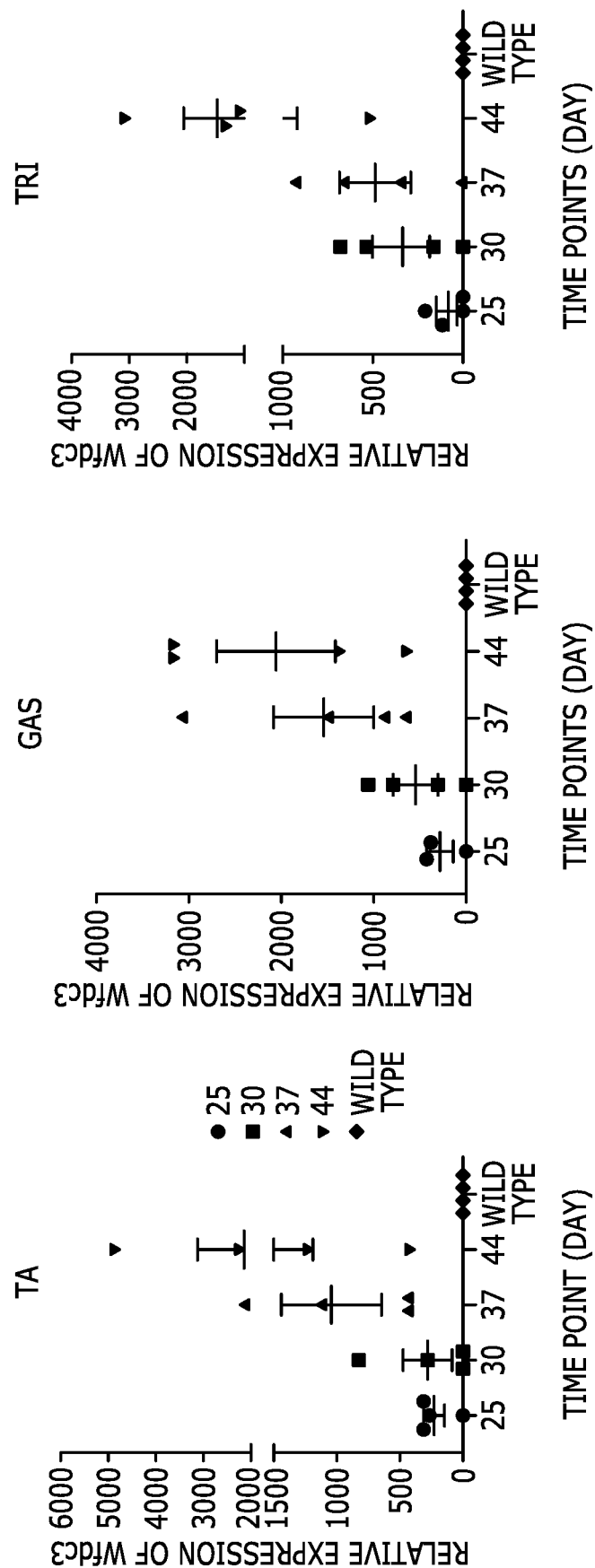
Figure 9B:
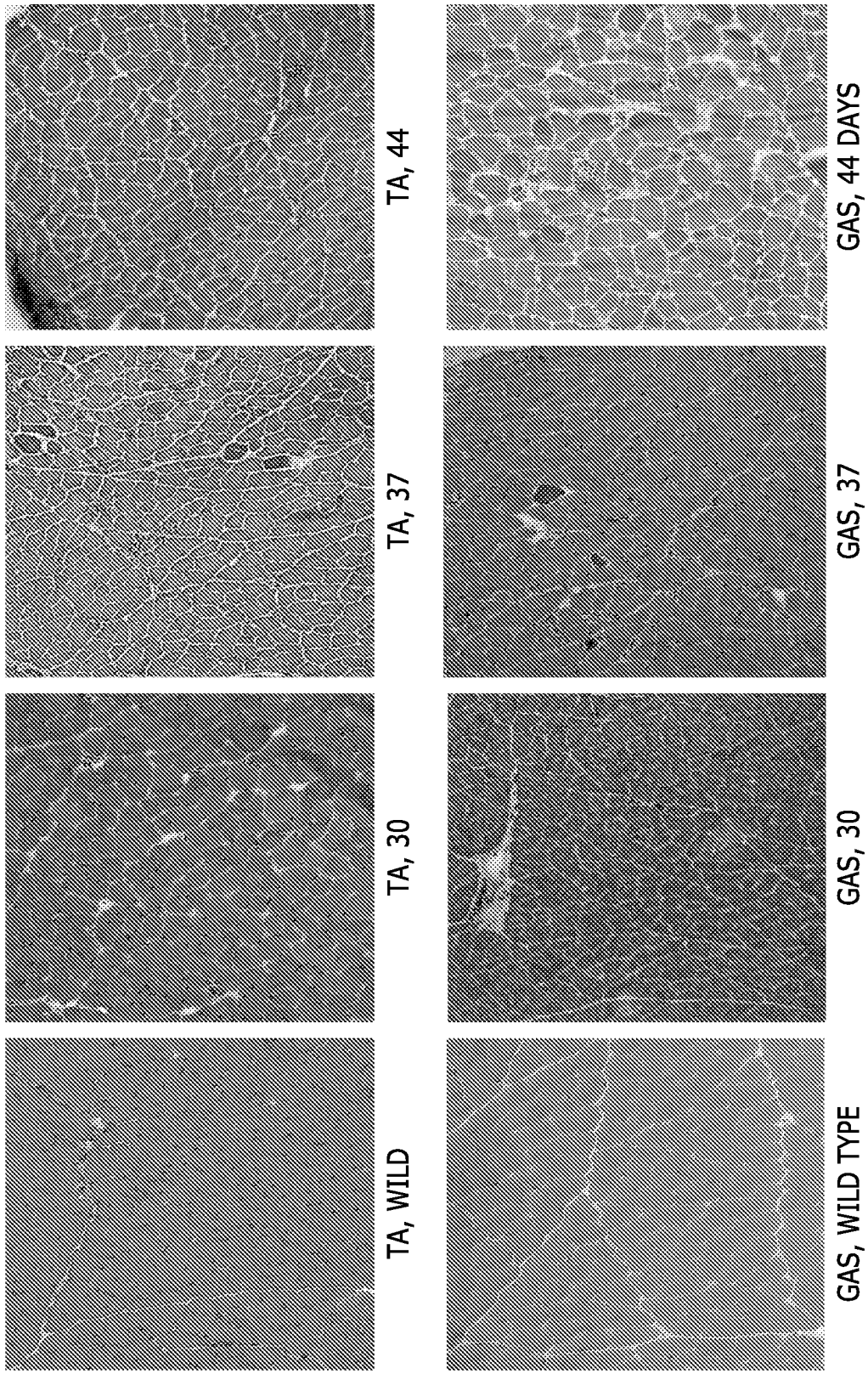

WAP four-disulfide core domain protein 3 (WFDC3) expression level increased in mouse muscle (tibia anterior (TA), gastrocnemius (GAS), and triceps (TRI) over time (FIG. 9A) with tamoxifen treatment alone as an indicator of progressive muscle pathology. DUX4 mediated muscle damage increased in mouse muscle (TA and GAS) over time (30, 37, and 44 days) (FIG. 9B).

1-2 day old TIC-DUX4 pups received unilateral co-injection of 5e10 AAV.Cas13 and AAV.gRNA1. Four weeks later mice started receiving 1 mg/kg tamoxifen, 3 times per week, for 4 weeks. Expression of WFDC3 in treated muscles was normalized to untreated muscles of same mouse. WFDC3 expression level (as measured by quantitative RT-PCR) in neonatal mouse muscles (TA (FIG. 9C), Quad (FIG. 9D), and Gas (FIG. 9E)) decreased after treatment with Cas13 and gRNA1, and showed significant reduction (*P<0.02) (FIG. 9D).

This study demonstrates the efficacy of the CRISPR-Cas13-DUX4 system in vivo and demonstrates proof of concept for CRISPR-Cas13 mediated DUX4 expression inhibition in vivo.

Example 14

Reduction in DUX4 Toxicity and Protection of Cells from Apoptosis

Each gRNA was then tested for its ability to reduce DUX4 induced apoptosis in transfected cells via a caspase 3/7 assay.

Cell Death Assay

To investigate gRNA abilities to reduce DUX4 toxicity and protect cells from apoptosis, a Caspase 3/7 assay was carried out. HEK293 cells (50,000 cells/well) were co-transfected with 30 ng DUX4 plasmid, 80 ng Cas13b plasmid, and 350 ng of each gRNA expressing plasmid using lipofectamine 2000 and plated on 96-well plates. Cell death was measured using the Apo-ONE Homogeneous caspase-3/7 Assay (Promega, Madison, WI) 48 hrs post-transfection using a fluorescent plate reader (Spectra max M2, Molecular Devices, Sunnyvale, CA). Three individual assays were performed in triplicate (n=3), and data was reported as mean caspase activity relative to the DUX4-only transfected control.

Figure 10:
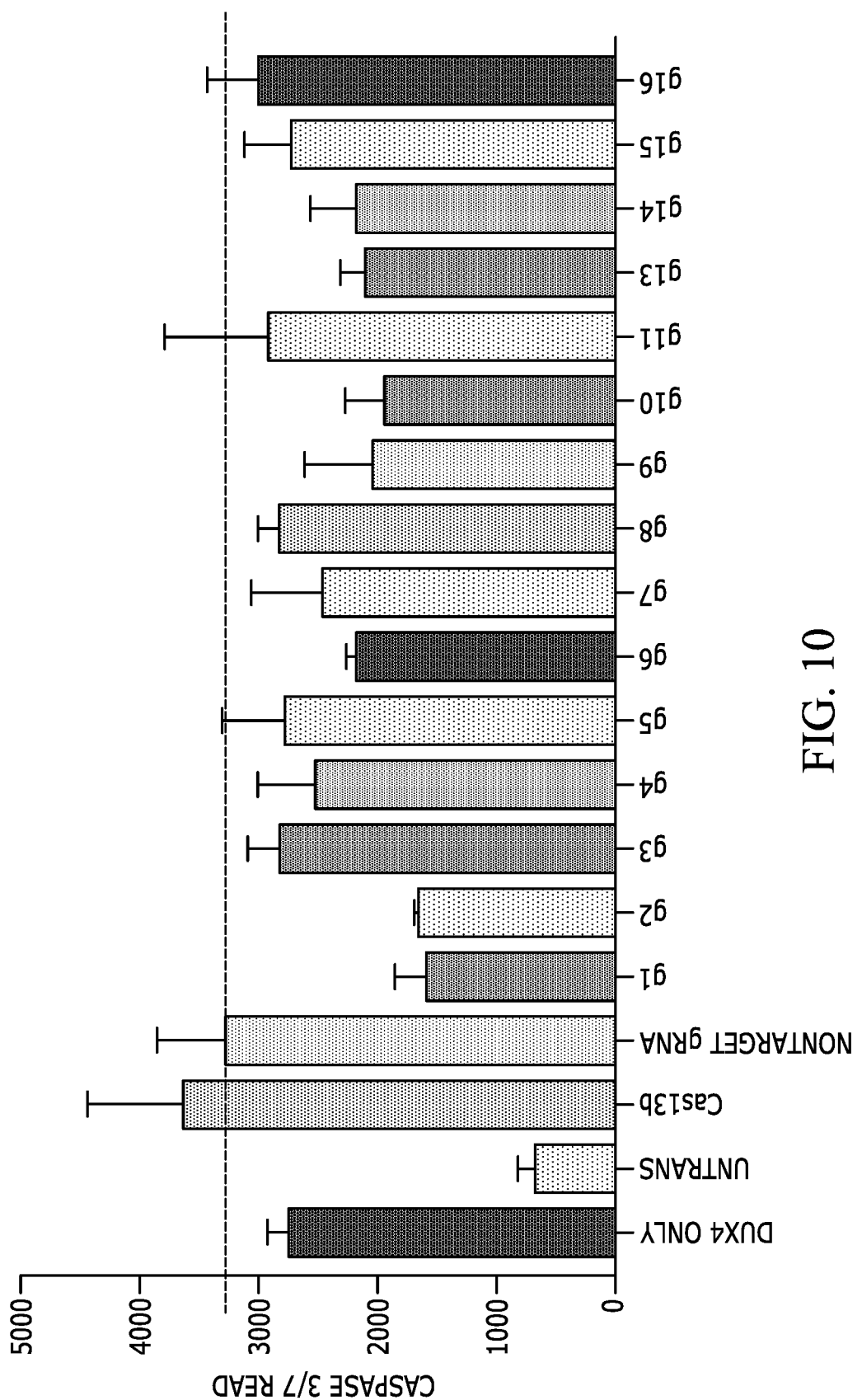
FIG. 10 shows that gRNA1-11 and 13-16 reduced toxicity of DUX4 and protected cells from apoptosis in a Caspase 3/7 assay.

Each gRNA reduced caspase 3/7 activity compared to cells only transfected with DUX4 (control) (FIG. 10) indicating that gRNA1-11 and 13-16 reduced toxicity of DUX4 and protected cells from apoptosis. The cell viability assay carried out demonstrated that each gRNA increased viability of the treated cells, i.e., reducing DUX4-induced apoptosis.

Example 15

Inhibition of DUX4 Expression in Mouse Muscle In Vivo

To investigate the ability of AAV.CRISPR-Cas13 therapy for targeting DUX4 in muscle, adult mice were co-injected into TA muscles with DUX4 (1E9), ssAAV6-Cas13b (2.5 E10) and scAAV6-gRNA1 (5E10), OR DUX4 alone (1E9).

Three weeks post-injection mice were sacrificed and TA muscles were extracted and frozen for histology and molecular analysis. As explained herein, DUX4 protein can function as a transcriptional activator for other genes in human and mouse cells. Therefore, any changes in expression level of DUX4 target genes is widely used as an indicator of DUX4 activity in human and mouse.

Figure 11:
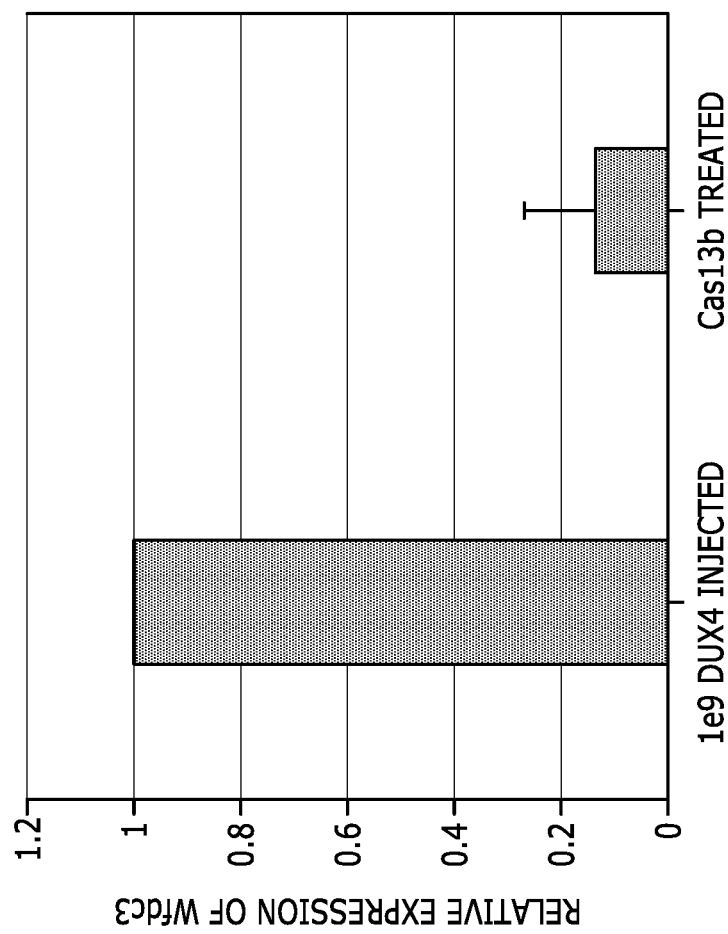
FIG. 11 shows the reduction of DUX4 mRNA and protein (as indicated by relative expression of WFDC3) three weeks post-injection with DUX4 (1e9) after co-injection of sAAV6-Cas13b and scAAV6-gRNA1 (5e10) into the mouse TA.

DUX4 activated biomarkers in mouse are WFDC3 and TRIM36. In this experiment, WFDC3 probe and primers were used to carry out QRT-PCR on RNA/cDNA harvested from treated and untreated muscles. FIG. 11 shows the reduction of DUX4 activated biomarker expression level (as indicated by relative expression of WFDC3) three weeks post-injection with DUX4 (1e9) after co-injection of sAAV6-Cas13b and scAAV6-gRNA1 (5e10) into the mouse TA. As shown in FIG. 11, more than 80% reduction in WFDC3 expression level was detected in treated muscles compared to untreated muscles.

While the present disclosure has been described in terms of specific embodiments, it is understood that variations and modifications will occur to those skilled in the art. Accordingly, only such limitations as appear in the claims should be placed on the disclosure.

All documents referred to in this application are hereby incorporated by reference in their entirety.

The nucleotide and amino acid sequences disclosed herein are set out in Table 1, set out below.

TABLE 1

Sequence Table

| Sequence Identification Number | Sequence |
| --- | --- |
| 1 | DUX4 NT:<br>atggccctcccgacaccctcggacagcaccctccccgcggaagcccggggacgaggacggcgacggag<br>actcgtttggaccccgagccaaagcgaggccctgcgagcctgctttgagcggaacccgtacccgggcatcg<br>ccaccagagaacggctggcccaggccatcggcattccggagcccagggtccagatttggtttcagaatgag<br>aggtcacgccagctgaggcagcaccggcgggaatctcggccctggcccgggagacgcggcccgccaga<br>aggccggcgaaagcggaccgccgtcaccggatcccagaccgccctgctcctccgagcctttgagaaggat<br>cgctttccaggcatcgccgcccggggaggagctggccagagagacgggcctcccggagtccaggattcag<br>atctggtttcagaatcgaagggccaggcacccgggacagggtggcagggcgcccgcgcaggcaggcgg<br>cctgtgcagcgcggccccggcggggtcaccctgctccctcgtgggtcgccttcgcccacaccggcgcg<br>tggggaacggggcttcccgcacccacgtgccctgcgcgcctggggctctcccacaggggcttcgtga<br>gccaggcagcgagggccgcccccgcgctgcagcccagccaggccgcgccggcagagggatctccca<br>acctgccccggcgcgcgggatttcgcctacgccgccccggctcctccggacggggcgctctcccaccct<br>caggctcctcggtggcctccgcacccgggcaaaagccgggaggaccgggaccccgcagcgcgacggcct<br>gccgggcccctgcgcggtggcacagcctgggcccgctcaagcggggccgcagggccaagggtgcttg<br>cgccacccacgtcccaggggagtccgtggtggggctggggccggggtcccaggtcgccggggcggcg<br>tgggaaccccaagccggggcagctccacctcccagcccgcgccccggacgcctccgcctccgcgcgg<br>caggggcagatgcaaggcatcccggcgccctcccaggcgctccaggagccggcgccctggtctgcactc<br>ccctgcggcctgctgctggatgagctcctggcgagcccggagtttctgcagcaggcgcaacctctcctagaa<br>acggaggccccgggggagctggaggcctcggaagaggccgcctcgctggaagcaccctcagcgagga<br>agaataccgggctctgctggaggagctttag |
| 2 | DUX4 AA:<br>MALPTPSDSTLPAEARGRGRRRRLVWTPSQSEALRACFERNPYPGIA<br>TRERLAQAIGIPEPRVQIWFQNERSRQLRQHRRESRPWPGRRGPPEGR<br>RKRTAVTGSQTALLLRAFEKDRFPGIAAREELARETGLPESRIQIWFQ<br>NRRARHPGQGGRAPAQAGGLCSAAPGGGHPAPSWVAFAHTGAWG<br>TGLPAPHVPCAPGALPQGAFVSQAARAAPALQPSQAAPAEGISQPAP<br>ARGDFAYAAPAPPDGALSHPQAPRWPPHPGKSREDRDPQRDGLPGP<br>CAVAQPGPAQAGPQGQGVLAPPTSQGSPWWGWGRGPQVAGAAWE<br>PQAGAAPPPQPAPPDASASARQGQMQGIPAPSQALQEPAPWSALPCG<br>LLLDELLASPEFLQQAQPLLETEAPGELEASEEAASLEAPLSEEEYRA<br>LLEEL |
| 3 | gRNA1 sequence:<br>GGCCCTTCGATTCTGAAACCAGATCTGAAT |
| 14 | gRNA1 DUX4 targeting sequence:<br>5'-ATTCAGATCTGGTTTCAGAATCGAAGGGCC-3' |
| 4 | gRNA2 sequence:<br>GATTCTGAAACCAGATCTGAATCCTGGACT |
| 15 | gRNA2 DUX4 targeting sequence:<br>5'-AGTCCAGGATTCAGATCTGGTTTCAGAATC-3' |
| 5 | gRNA3 sequence:<br>GACTCCGGGAGGCCCGTCTCTCTGGCCAGCT |
| 16 | gRNA3 DUX4 targeting sequence:<br>5'-AGCTGGCCAGAGAGACGGGCCTCCCGGAGTC-3' |
| 6 | gRNA4 sequence:<br>GAGGAGCCTGAGGGTGGGAGAGCGCCCCGT |
| 17 | gRNA4 DUX4 targeting sequence:<br>5'-ACGGGGCGCTCTCCCACCCTCAGGCTCCTC-3' |
| 7 | gRNA5 sequence:<br>GCTTTTGCCCGGGTGCGGAGGCCACCGAGGAG |
| 18 | gRNA5 DUX4 targeting sequence:<br>CTCCTCGGTGGCCTCCGCACCCGGGCAAAAGC |

TABLE 1-continued

Sequence Table

| Sequence Identification Number | Sequence |
|---|---|
| 8 | gRNA6 sequence:<br>TCTAGGAGAGGTTGCGCCTGCTGCAGAAACT |
| 19 | gRNA6 DUX4 targeting sequence:<br>5'-AGTTTCTGCAGCAGGCGCAACCTCTCCTAGA-3' |
| 9 | gRNA7 sequence:<br>GTTTCTAGGAGAGGTTGCGCCTGCTGCAGAAACT |
| 20 | gRNA7 DUX4 targeting sequence:<br>5'-AGTTTCTGCAGCAGGCGCAACCTCTCCTAGAAAC-3' |
| 10 | gRNA8 sequence:<br>TGGCAGTTCTCCGCGGTGTGGAGTCTCTCA |
| 21 | gRNA8 DUX4 targeting sequence:<br>5'-TGAGAGACTCCACACCGCGGAGAACTGCCA-3' |
| 11 | gRNA9 sequence:<br>GTTCTCCGCGGTGTGGAGTCTCTCACCGGG |
| 22 | gRNA9 DUX4 targeting sequence:<br>5'-CCCGGTGAGAGACTCCACACCGCGGAGAAC-3' |
| 12 | gRNA10 sequence:<br>GAACAAGGGCACAGAGAGGCCAGCGAGCTC |
| 23 | gRNA10 DUX4 targeting sequence:<br>5'-GAGCTCGCTGGCCTCTCTGTGCCCTTGTTC-3' |
| 13 | gRNA11 sequence:<br>GACAGCGTCGGAAGGTGGGGGGAGACATTCAG |
| 24 | gRNA11 DUX4 targeting sequence:<br>5'-CTGAATGTCTCCCCCCACCTTCCGACGCTGTC-3' |
| 25 | gRNA1 + Cas13b direct repeat:<br>GGCCCTTCGATTCTGAAACCAGATCTGAATGTTGTGGAAGGTCCA<br>GTTTTGAGGGGCTATTACAAC |
| 26 | gRNA2 + Cas13b direct repeat:<br>GATTCTGAAACCAGATCTGAATCCTGGACTGTTGTGGAAGGTCCA<br>GTTTTGAGGGGCTATTACAAC |
| 27 | gRNA3 + Cas13b direct repeat:<br>GACTCCGGGAGGCCCGTCTCTCTGGCCAGCTGTTGTGGAAGGTCC<br>AGTTTTGAGGGGCTATTACAAC |
| 28 | gRNA4 + Cas13b direct repeat:<br>GAGGAGCCTGAGGGTGGGAGAGCGCCCCGTGTTGTGGAAGGTCC<br>AGTTTTGAGGGGCTATTACAAC |
| 29 | gRNA5 + Cas13b direct repeat:<br>GCTTTTGCCCGGGTGCGGAGGCCACCGAGGAGGTTGTGGAAGGTC<br>CAGTTTTGAGGGGCTATTACAAC |
| 30 | gRNA6 + Cas13b direct repeat:<br>TCTAGGAGAGGTTGCGCCTGCTGCAGAAACTGTTGTGGAAGGTCC<br>AGTTTTGAGGGGCTATTACAAC |
| 31 | gRNA7 + Cas13b direct repeat:<br>GTTTCTAGGAGAGGTTGCGCCTGCTGCAGAAACTGTTGTGGAAGG<br>TCCAGTTTTGAGGGGCTATTACAAC |
| 32 | gRNA8 + Cas13b direct repeat:<br>TGGCAGTTCTCCGCGGTGTGGAGTCTCTCAGTTGTGGAAGGTCCA<br>GTTTTGAGGGGCTATTACAAC |

TABLE 1-continued

Sequence Table

| Sequence Identification Number | Sequence |
|---|---|
| 33 | gRNA9 + Cas13b direct repeat:<br>GTTCTCCGCGGTGTGGAGTCTCTCACCGGGGTTGTGGAAGGTCCA<br>GTTTTGAGGGGCTATTACAAC |
| 34 | gRNA10 +Cas13b direct repeat:<br>GAACAAGGGCACAGAGAGGCCAGCGAGCTCGTTGTGGAAGGTCC<br>AGTTTTGAGGGGCTATTACAAC |
| 35 | gRNA11 +Cas13b direct repeat:<br>GACAGCGTCGGAAGGTGGGGGGAGACATTCAGGTTGTGGAAGGT<br>CCAGTTTTGAGGGGCTATTACAAC |
| 36 | Cas13b nucleotide sequence:<br>ATGAACATCCCCGCTCTGGTGGAAAACCAGAAGAAGTACTTTGGC<br>ACCTACAGCGTGATGGCCATGCTGAACGCTCAGACCGTGCTGGAC<br>CACATCCAGAAGGTGGCCGATATTGAGGGCGAGCAGAACGAGAA<br>CAACGAGAATCTGTGGTTTCACCCCGTGATGAGCCACCTGTACAA<br>CGCCAAGAACGGCTACGACAAGCAGCCCGAGAAAACCATGTTCA<br>TCATCGAGCGGCTGCAGAGCTACTTCCCATTCCTGAAGATCATGG<br>CCGAGAACCAGAGAGAGTACAGCAACGGCAAGTACAAGCAGAAC<br>CGCGTGGAAGTGAACAGCAACGACATCTTCGAGGTGCTGAAGCG<br>CGCCTTCGGCGTGCTGAAGATGTACAGGGACCTGACCAACCACTA<br>CAAGACCTACGAGGAAAAGCTGAACGACGGCTGCGAGTTCCTGA<br>CCAGCACAGAGCAACCTCTGAGCGGCATGATCAACAACTACTAC<br>ACAGTGGCCCTGCGGAACATGAACGAGAGATACGGCTACAAGAC<br>AGAGGACCTGGCCTTCATCCAGGACAAGCGGTTCAAGTTCGTGAA<br>GGACGCCTACGGCAAGAAAAAGTCCCAAGTGAATACCGGATTCT<br>TCCTGAGCCTGCAGGACTACAACGGCGACACACAGAAGAAGCTG<br>CACCTGAGCGGAGTGGGAATCGCCCTGCTGATCTGCCTGTTCCTG<br>GACAAGCAGTACATCAACATCTTTCTGAGCAGGCTGCCCATCTTC<br>TCCAGCTACAATGCCCAGAGCGAGGAACGGCGGATCATCATCAG<br>ATCCTTCGGCATCAACAGCATCAAGCTGCCCAAGGACCGGATCCA<br>CAGCGAGAAGTCCAACAAGAGCGTGGCCATGGATATGCTCAACG<br>AAGTGAAGCGGTGCCCCGACGAGCTGTTCACAACACTGTCTGCCG<br>AGAAGCAGTCCCGGTTCAGAATCATCAGCGACGACCACAATGAA<br>GTGCTGATGAAGCGGAGCAGCGACAGATTCGTGCCTCTGCTGCTG<br>CAGTATATCGATTACGGCAAGCTGTTCGACCACATCAGGTTCCAC<br>GTGAACATGGGCAAGCTGAGATACCTGCTGAAGGCCGACAAGAC<br>CTGCATCGACGGCCAGACCAGAGTCAGAGTGATCGAGCAGCCCC<br>TGAACGGCTTCGGCAGACTGGAAGAGGCCGAGACAATGCGGAAG<br>CAAGAGAACGGCACCTTCGGCAACAGCGGCATCCGGATCAGAGA<br>CTTCGAGAACATGAAGCGGGACGACGCCAATCCTGCCAACTATCC<br>CTACATCGTGGACACCTACACACACTACATCCTGGAAAACAACAA<br>GGTCGAGATGTTTATCAACGACAAAGAGGACAGCGCCCCACTGCT<br>GCCCGTGATCGAGGATGATAGATACGTGGTCAAGACAATCCCCA<br>GCTGCCGGATGAGCACCCTGGAAATTCCAGCCATGGCCTTCCACA<br>TGTTTCTGTTCGGCAGCAAGAAAACCGAGAAGCTGATCGTGGACG<br>TGCACAACCGGTACAAGAGACTGTTCCAGGCCATGCAGAAAGAA<br>GAAGTGACCGCCGAGAATATCGCCAGCTTCGGAATCGCCGAGAG<br>CGACCTGCCTCAGAAGATCCTGGATCTGATCAGCGGCAATGCCCA<br>CGGCAAGGATGTGGACGCCTTCATCAGACTGACCGTGGACGACAT<br>GCTGACCGACACCGAGCGGAGAATCAAGGACGACC<br>GGAAGTCCATTCGGAGCGCCGACAACAAGATGGGAAAGAGAGGC<br>TTCAAGCAGATCTCCACAGGCAAGCTGGCCGACTTCCTGGCCAAG<br>GACATCGTGCTGTTTCAGCCCAGCGTGAACGATGGCGAGAACAA<br>GATCACCGGCCTGAACTACCGGATCATGCAGAGCGCCATTGCCGT<br>GTACGATAGCGGCGACGATTACGAGGCCAAGCAGCAGTTCAAGC<br>TGATGTTCGAGAAGGCCCGGCTGATCGGCAAGGGCACAACAGAG<br>CCTCATCCATTTCTGTACAAGGTGTTCGCCCGCAGCATCCCCGCCA<br>ATGCCGTCGAGTTCTACGAGCGCTACCTGATCGAGCGGAAGTTCT<br>ACCTGACCGGCCTGTCCAACGAGATCAAGAAAGGCAACAGAGTG<br>GATGTGCCCTTCATCCGGCGGGACCAGAACAAGTGGAAAACACC<br>CGCCATGAAGACCCTGGGCAGAATCTACAGCGAGGATCTGCCCGT<br>GGAACTGCCCAGACAGATGTTCGACAATGAGATCAAGTCCCACCT<br>GAAGTCCCTGCCACAGATGGAAGGCATCGACTTCAACAATGCCA<br>ACGTGACCTATCTGATCGCCGAGTACATGAAGAGAGTGCTGGACG<br>ACGACTTCCAGACCTTCTACCAGTGGAACCGCAACTACCGGTACA<br>TGGACATGCTTAAGGGCGAGTACGACAGAAAGGGCTCCCTGCAG<br>CACTGCTTCACCAGCGTGGAAGAGAGAGAAGGCCTCTGGAAAGA<br>GCGGGCCTCCAGAACAGAGCGGTACAGAAAGCAGGCCAGCAACA<br>AGATCCGCAGCAACCGGCAGATGAGAAACGCCAGCAGCGAAGAG<br>ATCGAGACAATCCTGGATAAGCGGCTGAGCAACAGCCGGAACGA<br>GTACCAGAAAAGCGAGAAAGTGATCCGGCGCTACAGAGTGCAGG<br>ATGCCCTGCTGTTTCTGCTGGCCAAAAAGACCCTGACCGAACTGG |

TABLE 1-continued

Sequence Table

| Sequence Identification Number | Sequence |
|---|---|
|  | CCGATTTCGACGGCGAGAGGTTCAAACTGAAAGAAATCATGCCC<br>GACGCCGAGAAGGGAATCCTGAGCGAGATCATGCCCATGAGCTT<br>CACCTTCGAGAAAGGCGGCAAGAAGTACACCATCACCAGCGAGG<br>GCATGAAGCTGAAGAACTACGGCGACTTCTTTGTGCTGGCTAGCG<br>ACAAGAGGATCGGCAACCTGCTGGAACTCGTGGGCAGCGACATC<br>GTGTCCAAAGAGGATATCATGGAAGAGTTCAACAAATACGACCA<br>GTGCAGGCCCGAGATCAGCTCCATCGTGTTCAACCTGGAAAAGTG<br>GGCCTTCGACACATACCCCGAGCTGTCTGCCAGAGTGGACCGGGA<br>AGAGAAGGTGGACTTCAAGAGCATCCTGAAAATCCTGCTGAACA<br>ACAAGAACATCAACAAAGAGCAGAGCGACATCCTGCGGAAGATC<br>CGGAACGCCTTCGATCACAACAATTACCCCGACAAAGGCGTGGTG<br>GAAATCAAGGCCCTGCCTGAGATCGCCATGAGCATCAAGAAGGC<br>CTTTGGGGAGTACGCCATCATGAAG |
| 37 | Cas13b direct repeat:<br>GTTGTGGAAGGTCCAGTTTTGAGGGGCTATTACAAC |
| 38 | gRNA1 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCggcccttcgattctgaaaccagatctgaatGTTGTG<br>GAAGGTCCAGTTTTGAGGGGCTATTACAACTTTTTT |
| 39 | gRNA2 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgattctgaaaccagatctgaatcctggactGTTGTG<br>GAAGGTCCAGTTTTGAGGGGCTATTACAACTTTTTT |
| 40 | gRNA3 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgactccgggaggcccgtctctctggccagctGTTG<br>TGGAAGGTCCAGTTTTGAGGGGCTATTACAACTTTTTT |
| 41 | gRNA4 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgaggagcctgagggtgggagagcgccccgtGTTG<br>TGGAAGGTCCAGTTTTGAGGGGCTATTACAACTTTTTT |
| 42 | gRNA5 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgcttttgcccgggtgcggaggccaccgaggagGTT<br>GTGGAAGGTCCAGTTTTGAGGGGCTATTACAACTTTTTT |
| 43 | gRNA6 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgtctaggagaggttgcgcctgctgcagaaactGTTG<br>TGGAAGGTCCAGTTTTGAGGGGCTATTACAACTTTTTT |
| 44 | gRNA7 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA |

TABLE 1-continued

Sequence Table

| Sequence Identification Number | Sequence |
|---|---|
| | AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgtttctaggagaggttgcgcctgctgcagaaactGTT<br>GTGGAAGGTCCAGTTTTGAGGGGCTATTACAACTTTTTT |
| 45 | gRNA8 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgtggcagttctccgcggtgtggagtctctcaGTTGT<br>GGAAGGTCCAGTTTTGAGGGGCTATTACAACTTTTTT |
| 46 | gRNA9 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgttctccgcggtgtggagtctctcaccgggGTTGT<br>GGAAGGTCCAGTTTTGAGGGGCTATTACAACTTTTTT |
| 47 | gRNA10 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgaacaagggcacagagaggccagcgagctcGTT<br>GTGGAAGGTCCAGTTTTGAGGGGCTATTACAACTTTTTT |
| 48 | gRNA11 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgacagcgtcggaaggtgggggagacattcagGTT<br>GTGGAAGGTCCAGTTTTGAGGGGCTATTACAACTTTTTT |
| 49 | gRNA12 sequence (control):<br>GCAGGGTTTTCCCAGTCACGACGTTGTAAA |
| 50 | gRNA12 expression cassette sequence (control):<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgcagggttttcccagtcacgacgttgtaaaaGTTGT<br>GGAAGGTCCAGTTTTGAGGGGCTATTACAACTTTTTT |
| 51 | gRNA13 sequence:<br>GCCAGAATTTCACGGAAGAACAAGGGCACA |
| 55 | gRNA13 DUX4 targeting sequence:<br>5'-TGTGCCCTTGTTCTTCCGTGAAATTCTGGC-3' |
| 59 | gRNA13 + Cas13b direct repeat:<br>GCCAGAATTTCACGGAAGAACAAGGGCACAGTTGTGGAAGGTCC<br>AGTTTTGAGGGGCTATTACAAC |
| 63 | gRNA13 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgccagaatttcacggaagaacaagggcacaGTTG<br>TGGAAGGTCCAGTTTTGAGGGGCTATTACAACTTTTTT |

TABLE 1-continued

Sequence Table

| Sequence Identification Number | Sequence |
|---|---|
| 52 | gRNA14 sequence:<br>GCTCCCTTGCACGTCAGCCGGGGTGCGCAC |
| 56 | gRNA14 DUX4 targeting sequence:<br>5'-GTGCGCACCCCGGCTGACGTGCAAGGGAGC-3' |
| 60 | gRNA14 + Cas13b direct repeat:<br>GCTCCCTTGCACGTCAGCCGGGGTGCGCACGTTGTGGAAGGTCCA<br>GTTTTGAGGGGCTATTACAAC |
| 64 | gRNA14 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgctcccttgcacgtcagccggggtgcgcacGTTGT<br>GGAAGGTCCAGTTTTGAGGGGCTATTACAACTTTTTT |
| 53 | gRNA15 sequence:<br>GAAACCAGATCTGAATCCTGGACTCCGGGA |
| 57 | gRNA15 DUX4 targeting sequence:<br>5'-TCCCGGAGTCCAGGATTCAGATCTGGTTTC-3' |
| 61 | gRNA15 + Cas13b direct repeat:<br>GAAACCAGATCTGAATCCTGGACTCCGGGAGTTGTGGAAGGTCCA<br>GTTTTGAGGGGCTATTACAAC |
| 65 | gRNA15 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgaaaccagatctgaatcctggactccgggaGTTGT<br>GGAAGGTCCAGTTTTGAGGGGCTATTACAACTTTTTT |
| 54 | gRNA16 sequence:<br>GGGTGCCTGGCCCTTCGATTCTGAAACCAG |
| 58 | gRNA16 DUX4 targeting sequence:<br>5'-CTGGTTTCAGAATCGAAGGGCCAGGCACCC-3' |
| 62 | gRNA16 + Cas13b direct repeat:<br>GGGTGCCTGGCCCTTCGATTCTGAAACCAGGTTGTGGAAGGTCCA<br>GTTTTGAGGGGCTATTACAAC |
| 66 | gRNA16 expression cassette sequence:<br>GAGGGCCTATTTCCCATGATTCCTTCATATTTGCATATACGATACA<br>AGGCTGTTAGAGAGATAATTGGAATTAATTTGACTGTAAACACAA<br>AGATATTAGTACAAAATACGTGACGTAGAAAGTAATAATTTCTTG<br>GGTAGTTTGCAGTTTTAAAATTATGTTTTAAAATGGACTATCATAT<br>GCTTACCGTAACTTGAAAGTATTTCGATTTCTTGGCTTTATATATC<br>TTGTGGAAAGGACGAAACACCgggtgcctggcccttcgattctgaaaccagGTTGT<br>GGAAGGTCCAGTTTTGAGGGGCTATTACAACTTTTTT |

We claim:

1. A nucleic acid encoding a double homeobox 4 (DUX4)-encoding guide RNA (gRNA) selected from the group consisting of:
   (a) a gRNA comprising the nucleotide sequence set forth in any one of SEQ ID NOs: 3-13 and 51-54; and
   (b) a gRNA that specifically hybridizes to a target nucleic acid encoding DUX4, wherein the target nucleic acid comprises the nucleotide sequence set forth in any one of SEQ ID NOs: 14-24 and 55-58.

2. The nucleic acid of claim 1, further comprising a Cas13b direct repeat sequence.

3. The nucleic acid of claim 2, wherein the Cas13b direct repeat is located downstream or at the 3' terminus of the nucleic acid encoding the DUX4-encoding gRNA.

4. The nucleic acid of claim 2, wherein the Cas13b direct repeating sequence comprises the nucleotide sequence set forth in SEQ ID NO: 37 or a sequence comprising at least 90% identity to the nucleotide sequence set forth in SEQ ID NO: 37.

5. The nucleic acid of claim 4, comprising the nucleotide sequence set forth in any one of SEQ ID NOs: 25-35 and 59-62 or a sequence comprising at least 90% identity to the nucleotide sequence set forth in any one of SEQ ID NOs: 25-35 and 59-62.

6. The nucleic acid of claim 1, further comprising a promoter sequence.

7. The nucleic acid of claim 6, wherein the promoter is any of U6, U7, tRNA, H1, minimal CMV, T7, EF1-alpha, Minimal EF1-alpha, a muscle-specific promoter, or a skeletal muscle-specific promoter.

8. The nucleic acid of claim 7, wherein the muscle-specific promoter or the skeletal muscle-specific promoter is unc45b, tMCK, minimal MCK, CK6, CK7, MHCK7, or CK1.

9. The nucleic acid of claim 7, comprising the nucleotide sequence set forth in any one of SEQ ID NOs: 38-48 and 63-66 or a sequence comprising at least 90% identity to the nucleotide sequence set forth in any one of SEQ ID NOs: 38-48 and 63-66.

10. An adeno-associated virus comprising the nucleic acid of claim 1.

11. The adeno-associated virus of claim 10, wherein the virus lacks rep and cap genes.

12. The adeno-associated virus of claim 10, wherein the virus is a recombinant AAV (rAAV) or a self-complementary recombinant AAV (scAAV).

13. The adeno-associated virus of claim 10, wherein the virus is AAV-1, AAV-2, AAV-3, AAV-4, AAV-5, AAV-6, AAV-7, AAV-8, AAV-9, AAV-10, AAV-11, AAV-12, AAV-13, AAV-anc80, or AAV rh.74.

14. The adeno-associated virus of claim 10, wherein the virus is AAV-9.

15. A composition comprising the adeno-associated virus of claim 10 and a pharmaceutically acceptable carrier.

16. A method of inhibiting and/or interfering with expression of a double homeobox 4 (DUX4) gene in a cell comprising contacting the cell with
   (a) the adeno-associated virus of claim 10; and
   (b) an adeno-associated virus comprising a nucleic acid encoding a Cas13 protein, or a Cas13 ortholog or variant thereof.

17. A method of treating a subject suffering from a muscular dystrophy comprising administering to the subject an effective amount of
   (a) the adeno-associated virus of claim 10; and
   (b) an adeno-associated virus comprising a nucleic acid encoding a Cas13 protein, or a Cas13 ortholog or variant.

18. A method of treating a muscular dystrophy in a subject in need thereof comprising administering an effective amount of an adeno-associated virus to the subject, wherein the genome of the adeno-associated virus comprises
   (a) at least one nucleic acid encoding a double homeobox 4 (DUX4)-encoding guide RNA (gRNA) comprising the nucleotide sequence set forth in any one of SEQ ID NOs: 3-13 and 51-54;
   (b) at least one nucleic acid encoding a DUX4-encoding guide RNA (gRNA) that specifically hybridizes to a target nucleic acid encoding DUX4, wherein the target nucleic acid comprises the nucleotide sequence set forth in any one of SEQ ID NOs: 14-24 and 55-58;
   (c) at least one nucleic acid comprising the nucleotide sequence set forth in any one of SEQ ID NOs: 25-35 and 59-62, or a sequence comprising at least 90% identity to the nucleotide sequence set forth in any one of SEQ ID NOs: 25-35 and 59-62;
   (d) at least one nucleic acid comprising the nucleotide sequence set forth in any one of SEQ ID NOs: 38-48 and 63-66, or a sequence comprising at least 90% identity to the nucleotide sequence set forth in any one of SEQ ID NOs: 38-48 and 63-66; or
   (e) a combination of any of (a)-(d) thereof.

19. The method of claim 18, further comprising administering to the subject an effective amount of an adeno-associated virus comprising a nucleic acid encoding a Cas13 protein, or a Cas13 ortholog or variant.

20. The method of claim 17, wherein the muscular dystrophy is facioscapulohumeral muscular dystrophy (FSHD).

21. A method of treating a cancer in a subject in need thereof comprising administering an effective amount of an adeno-associated virus to the subject, wherein the genome of the adeno-associated virus comprises
   (a) at least one nucleic acid encoding a double homeobox 4 (DUX4)-encoding guide RNA (gRNA) comprising the nucleotide sequence set forth in any one of SEQ ID NOs: 3-13 and 51-54;
   (b) at least one nucleic acid encoding a DUX4-encoding guide RNA (gRNA) that specifically hybridizes to a target nucleic acid encoding DUX4, wherein the target nucleic acid comprises the nucleotide sequence set forth in any one of SEQ ID NOs: 14-24 and 55-58;
   (c) at least one nucleic acid comprising the nucleotide sequence set forth in any one of SEQ ID NOs: 25-35 and 59-62, or a sequence comprising at least 90% identity to the nucleotide sequence set forth in any one of SEQ ID NOs: 25-35 and 59-62;
   (d) at least one nucleic acid comprising the nucleotide sequence set forth in any one of SEQ ID NOs: 38-48 and 63-66, or a sequence comprising at least 90% identity to the nucleotide sequence set forth in any one of SEQ ID NOs: 38-48 and 63-66; or
   (e) a combination of any of (a)-(d) thereof.

22. The method of claim 21, wherein the cancer is bladder cancer, breast cancer, cervical cancer, endometrial cancer, esophageal cancer, lung cancer, kidney cancer, ovarian cancer, rhabdoid tumor, rhabdomyosarcoma, sarcoma, stomach cancer, testicular cancer, thymoma, melanoma, or metastatic melanoma.

* * * * *

SEQUENCE LISTING

<160> NUMBER OF SEQ ID NOS: 66

<210> SEQ ID NO 1
<211> LENGTH: 1275
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature

<223> OTHER INFORMATION: DUX4 NT

<400> SEQUENCE: 1

| | | | | | |
|---|---|---|---|---|---|
| atggccctcc | cgacaccctc | ggacagcacc | ctccccgcgg | aagcccgggg | acgaggacgg | 60 |
| cgacggagac | tcgtttggac | cccgagccaa | agcgaggccc | tgcgagcctg | ctttgagcgg | 120 |
| aacccgtacc | cgggcatcgc | caccagagaa | cggctggccc | aggccatcgg | cattccggag | 180 |
| cccagggtcc | agatttggtt | tcagaatgag | aggtcacgcc | agctgaggca | gcaccggcgg | 240 |
| gaatctcggc | cctggcccgg | gagacgcggc | ccgccagaag | gccggcgaaa | gcggaccgcc | 300 |
| gtcaccggat | cccagaccgc | cctgctcctc | cgagcctttg | agaaggatcg | ctttccaggc | 360 |
| atcgccgccc | gggaggagct | ggccagagag | acgggcctcc | cggagtccag | gattcagatc | 420 |
| tggtttcaga | atcgaagggc | caggcacccg | ggacagggtg | gcagggcgcc | cgcgcaggca | 480 |
| ggcggcctgt | gcagcgcggc | ccccggcggg | ggtcaccctg | ctccctcgtg | gtcgccttc | 540 |
| gcccacaccg | cgcgcgtgggg | aacggggctt | cccgcacccc | acgtgccctg | cgcgcctggg | 600 |
| gctctcccac | agggggcttt | cgtgagccag | gcagcgaggg | ccgcccccgc | gctgcagccc | 660 |
| agccaggccg | cgccggcaga | ggggatctcc | caacctgccc | cggcgcgcgg | ggatttcgcc | 720 |
| tacgccgccc | cggctcctcc | ggacggggcg | ctctcccacc | ctcaggctcc | tcggtggcct | 780 |
| ccgcacccgg | gcaaaagccg | ggaggaccgg | gacccgcagc | gcgacggcct | gccgggcccc | 840 |
| tgcgcggtgg | cacagcctgg | gcccgctcaa | gcggggccgc | agggccaagg | ggtgcttgcg | 900 |
| ccacccacgt | cccagggggag | tccgtggtgg | ggctggggcc | ggggtcccca | ggtcgccggg | 960 |
| gcggcgtggg | aacccaagc | cggggcagct | ccacctcccc | agcccgcgcc | ccggacgcc | 1020 |
| tccgcctccg | cgcggcaggg | gcagatgcaa | ggcatcccgg | cgccctccca | ggcgctccag | 1080 |
| gagccggcgc | cctggtctgc | actccccctgc | ggcctgctgc | tggatgagct | cctggcgagc | 1140 |
| ccggagtttc | tgcagcaggc | gcaacctctc | ctagaaacgg | aggccccggg | ggagctggag | 1200 |
| gcctcggaag | aggccgcctc | gctggaagca | cccctcagcg | aggaagaata | ccgggctctg | 1260 |
| ctggaggagc | tttag | | | | | 1275 |

<210> SEQ ID NO 2
<211> LENGTH: 424
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<223> OTHER INFORMATION: DUX4 AA

<400> SEQUENCE: 2

Met Ala Leu Pro Thr Pro Ser Asp Ser Thr Leu Pro Ala Glu Ala Arg
1               5                   10                  15

Gly Arg Gly Arg Arg Arg Arg Leu Val Trp Thr Pro Ser Gln Ser Glu
            20                  25                  30

Ala Leu Arg Ala Cys Phe Glu Arg Asn Pro Tyr Pro Gly Ile Ala Thr
        35                  40                  45

Arg Glu Arg Leu Ala Gln Ala Ile Gly Ile Pro Glu Pro Arg Val Gln
    50                  55                  60

Ile Trp Phe Gln Asn Glu Arg Ser Arg Gln Leu Arg Gln His Arg Arg
65                  70                  75                  80

Glu Ser Arg Pro Trp Pro Gly Arg Gly Pro Pro Glu Gly Arg Arg
                85                  90                  95

-continued

```
Lys Arg Thr Ala Val Thr Gly Ser Gln Thr Ala Leu Leu Leu Arg Ala
            100                 105                 110
Phe Glu Lys Asp Arg Phe Pro Gly Ile Ala Ala Arg Glu Glu Leu Ala
        115                 120                 125
Arg Glu Thr Gly Leu Pro Glu Ser Arg Ile Gln Ile Trp Phe Gln Asn
    130                 135                 140
Arg Arg Ala Arg His Pro Gly Gln Gly Gly Arg Ala Pro Ala Gln Ala
145                 150                 155                 160
Gly Gly Leu Cys Ser Ala Ala Pro Gly Gly His Pro Ala Pro Ser
                165                 170                 175
Trp Val Ala Phe Ala His Thr Gly Ala Trp Gly Thr Gly Leu Pro Ala
            180                 185                 190
Pro His Val Pro Cys Ala Pro Gly Ala Leu Pro Gln Gly Ala Phe Val
        195                 200                 205
Ser Gln Ala Ala Arg Ala Ala Pro Ala Leu Gln Pro Ser Gln Ala Ala
    210                 215                 220
Pro Ala Glu Gly Ile Ser Gln Pro Ala Pro Ala Arg Gly Asp Phe Ala
225                 230                 235                 240
Tyr Ala Ala Pro Ala Pro Pro Asp Gly Ala Leu Ser His Pro Gln Ala
            245                 250                 255
Pro Arg Trp Pro Pro His Pro Gly Lys Ser Arg Glu Asp Arg Asp Pro
        260                 265                 270
Gln Arg Asp Gly Leu Pro Gly Pro Cys Ala Val Ala Gln Pro Gly Pro
    275                 280                 285
Ala Gln Ala Gly Pro Gln Gly Gln Gly Val Leu Ala Pro Pro Thr Ser
290                 295                 300
Gln Gly Ser Pro Trp Trp Gly Trp Gly Arg Gly Pro Gln Val Ala Gly
305                 310                 315                 320
Ala Ala Trp Glu Pro Gln Ala Gly Ala Ala Pro Pro Gln Pro Ala
            325                 330                 335
Pro Pro Asp Ala Ser Ala Ser Ala Arg Gln Gly Gln Met Gln Gly Ile
        340                 345                 350
Pro Ala Pro Ser Gln Ala Leu Gln Glu Pro Ala Pro Trp Ser Ala Leu
    355                 360                 365
Pro Cys Gly Leu Leu Leu Asp Glu Leu Leu Ala Ser Pro Glu Phe Leu
370                 375                 380
Gln Gln Ala Gln Pro Leu Leu Glu Thr Glu Ala Pro Gly Glu Leu Glu
385                 390                 395                 400
Ala Ser Glu Glu Ala Ala Ser Leu Glu Ala Pro Leu Ser Glu Glu Glu
            405                 410                 415
Tyr Arg Ala Leu Leu Glu Glu Leu
            420
```

<210> SEQ ID NO 3
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA1 sequence

<400> SEQUENCE: 3
ggcccttcga ttctgaaacc agatctgaat                           30

-continued

```
<210> SEQ ID NO 4
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA2 sequence

<400> SEQUENCE: 4
gattctgaaa ccagatctga atcctggact                                       30

<210> SEQ ID NO 5
<211> LENGTH: 31
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA3 sequence

<400> SEQUENCE: 5
gactccggga ggcccgtctc tctggccagc t                                     31

<210> SEQ ID NO 6
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA4 sequence

<400> SEQUENCE: 6
gaggagcctg agggtgggag agcgccccgt                                       30

<210> SEQ ID NO 7
<211> LENGTH: 32
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA5 sequence

<400> SEQUENCE: 7
gcttttgccc gggtgcggag gccaccgagg ag                                    32

<210> SEQ ID NO 8
<211> LENGTH: 31
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA6 sequence

<400> SEQUENCE: 8
tctaggagag gttgcgcctg ctgcagaaac t                                     31

<210> SEQ ID NO 9
<211> LENGTH: 34
<212> TYPE: DNA
<213> ORGANISM: Artificial Sequence
```

```
<220> FEATURE:
<223> OTHER INFORMATION: Synthetic Polynucleoide
<220> FEATURE:
<221> NAME/KEY: misc_feature
<223> OTHER INFORMATION: gRNA7 sequence

<400> SEQUENCE: 9
gtttctagga gaggttgcgc ctgctgcaga aact                            34

<210> SEQ ID NO 10
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA8 sequence

<400> SEQUENCE: 10
tggcagttct ccgcggtgtg gagtctctca                                 30

<210> SEQ ID NO 11
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA9 sequence

<400> SEQUENCE: 11
gttctccgcg gtgtggagtc tctcaccggg                                 30

<210> SEQ ID NO 12
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA10 sequence

<400> SEQUENCE: 12
gaacaagggc acagagaggc cagcgagctc                                 30

<210> SEQ ID NO 13
<211> LENGTH: 32
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA11 sequence

<400> SEQUENCE: 13
gacagcgtcg gaaggtgggg ggagacattc ag                              32

<210> SEQ ID NO 14
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
```

<223> OTHER INFORMATION: gRNA1 DUX4 targeting sequence

<400> SEQUENCE: 14
attcagatct ggtttcagaa tcgaagggcc                                               30

<210> SEQ ID NO 15
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA2 DUX4 targeting sequence

<400> SEQUENCE: 15
agtccaggat tcagatctgg tttcagaatc                                               30

<210> SEQ ID NO 16
<211> LENGTH: 31
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA3 DUX4 targeting sequence

<400> SEQUENCE: 16
agctggccag agagacgggc ctcccggagt c                                             31

<210> SEQ ID NO 17
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA4 DUX4 targeting sequence

<400> SEQUENCE: 17
acggggcgct ctcccaccct caggctcctc                                               30

<210> SEQ ID NO 18
<211> LENGTH: 32
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA5 DUX4 targeting sequence

<400> SEQUENCE: 18
ctcctcggtg gcctccgcac ccgggcaaaa gc                                            32

<210> SEQ ID NO 19
<211> LENGTH: 31
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA6 DUX4 targeting sequence

<400> SEQUENCE: 19
agtttctgca gcaggcgcaa cctctcctag a                                                31

<210> SEQ ID NO 20
<211> LENGTH: 34
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA7 DUX4 targeting sequence

<400> SEQUENCE: 20
agtttctgca gcaggcgcaa cctctcctag aaac                                             34

<210> SEQ ID NO 21
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA8 DUX4 targeting sequence

<400> SEQUENCE: 21
tgagagactc cacaccgcgg agaactgcca                                                  30

<210> SEQ ID NO 22
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA9 DUX4 targeting sequence

<400> SEQUENCE: 22
cccggtgaga gactccacac cgcggagaac                                                  30

<210> SEQ ID NO 23
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA10 DUX4 targeting sequence

<400> SEQUENCE: 23
gagctcgctg gcctctctgt gcccttgttc                                                  30

<210> SEQ ID NO 24
<211> LENGTH: 32
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA11 DUX4 targeting sequence

<400> SEQUENCE: 24
ctgaatgtct cccccacct tccgacgctg tc                                                32

<210> SEQ ID NO 25

```
<211> LENGTH: 66
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA1 + Cas13b direct repeat

<400> SEQUENCE: 25
ggcccttcga ttctgaaacc agatctgaat gttgtggaag gtccagtttt gagggggctat    60 tacaac                                                                66

<210> SEQ ID NO 26
<211> LENGTH: 66
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA2 + Cas13b direct repeat

<400> SEQUENCE: 26
gattctgaaa ccagatctga atcctggact gttgtggaag gtccagtttt gagggggctat    60 tacaac                                                                66

<210> SEQ ID NO 27
<211> LENGTH: 67
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA3 + Cas13b direct repeat

<400> SEQUENCE: 27
gactccggga ggcccgtctc tctggccagc tgttgtggaa ggtccagttt tgagggggcta    60 ttacaac                                                               67

<210> SEQ ID NO 28
<211> LENGTH: 66
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA4 + Cas13b direct repeat

<400> SEQUENCE: 28
gaggagcctg agggtgggag agcgccccgt gttgtggaag gtccagtttt gagggggctat    60 tacaac                                                                66

<210> SEQ ID NO 29
<211> LENGTH: 68
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA5 + Cas13b direct repeat

<400> SEQUENCE: 29
```

```
gcttttgccc gggtgcggag gccaccgagg aggttgtgga aggtccagtt ttgaggggct    60
attacaac                                                             68
```

<210> SEQ ID NO 30
<211> LENGTH: 67
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA6 + Cas13b direct repeat

<400> SEQUENCE: 30

```
tctaggagag gttgcgcctg ctgcagaaac tgttgtggaa ggtccagttt tgagggcta     60 ttacaac                                                              67
```

<210> SEQ ID NO 31
<211> LENGTH: 70
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA7 + Cas13b direct repeat

<400> SEQUENCE: 31

```
gtttctagga gaggttgcgc ctgctgcaga aactgttgtg gaaggtccag ttttgagggg    60
ctattacaac                                                           70
```

<210> SEQ ID NO 32
<211> LENGTH: 66
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA8 + Cas13b direct repeat

<400> SEQUENCE: 32

```
tggcagttct ccgcggtgtg gagtctctca gttgtggaag gtccagtttt gagggctat     60 tacaac                                                               66
```

<210> SEQ ID NO 33
<211> LENGTH: 66
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA9 + Cas13b direct repeat

<400> SEQUENCE: 33

```
gttctccgcg gtgtggagtc tctcaccggg gttgtggaag gtccagtttt gagggctat     60 tacaac                                                               66
```

<210> SEQ ID NO 34
<211> LENGTH: 66
<212> TYPE: DNA
<213> ORGANISM: Artificial Sequence
<220> FEATURE:
<223> OTHER INFORMATION: Synthetic Polynucleoide

```
<220> FEATURE:
<221> NAME/KEY: misc_feature
<223> OTHER INFORMATION: gRNA10 + Cas13b direct repeat

<400> SEQUENCE: 34
gaacaagggc acagagaggc cagcgagctc gttgtggaag gtccagtttt gagggctat       60 tacaac                                                                66

<210> SEQ ID NO 35
<211> LENGTH: 68
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA11 + Cas13b direct repeat

<400> SEQUENCE: 35
gacagcgtcg aaggtgggg ggagacattc aggttgtgga aggtccagtt ttgagggct        60 attacaac                                                              68

<210> SEQ ID NO 36
<211> LENGTH: 3270
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: Cas13b nucleotide sequence

<400> SEQUENCE: 36
atgaacatcc ccgctctggt ggaaaaccag aagaagtact ttggcaccta cagcgtgatg      60
gccatgctga acgctcagac cgtgctggac cacatccaga aggtggccga tattgagggc    120
gagcagaacg agaacaacga gaatctgtgg tttcaccccg tgatgagcca cctgtacaac    180
gccaagaacg gctacgacaa gcagcccgag aaaaccatgt tcatcatcga gcggctgcag    240
agctacttcc cattcctgaa gatcatggcc gagaaccaga gagtacagca acggcaag     300 tacaagcaga accgcgtgga agtgaacagc aacgacatct tcgaggtgct gaagcgcgcc    360
ttcggcgtgc tgaagatgta cagggacctg accaaccact acaagaccta cgaggaaaag    420
ctgaacgacg gctgcgagtt cctgaccagc acagagcaac ctctgagcgg catgatcaac    480
aactactaca cagtggccct gcggaacatg aacgagagat acggctacaa gacagaggac    540
ctggccttca tccaggacaa gcggttcaag ttcgtgaagg acgcctacgg caagaaaaag    600
tcccaagtga ataccggatt cttcctgagc ctgcaggact acaacggcga cacacagaag    660
aagctgcacc tgagcggagt gggaatcgcc ctgctgatct gcctgttcct ggacaagcag    720
tacatcaaca tctttctgag caggctgccc atcttctcca gctacaatgc ccagagcgag    780
gaacggcgga tcatcatcag atccttcggc atcaacagca tcaagctgcc caaggaccgg    840
atccacagcg agaagtccaa caagagcgtg gccatggata tgctcaacga agtgaagcgg    900
tgccccgacg agctgttcac aacactgtct gccgagaagc agtcccggtt cagaatcatc    960
agcgacgacc acaatgaagt gctgatgaag cggagcagcg acagattcgt gcctctgctg    1020
ctgcagtata tcgattacgg caagctgttc gaccacatca ggttccacgt gaacatgggc    1080
aagctgagat acctgctgaa ggccgacaag acctgcatcg acggccagac cagagtcaga    1140
gtgatcgagc agcccctgaa cggcttcggc agactggaag aggccgagac aatgcggaag    1200
```

```
caagagaacg gcaccttcgg caacagcggc atccggatca gagacttcga gaacatgaag    1260
cgggacgacg ccaatcctgc caactatccc tacatcgtgg acacctacac acactacatc    1320
ctggaaaaca acaaggtcga gatgtttatc aacgacaaag aggacagcgc cccactgctg    1380
cccgtgatcg aggatgatag atacgtggtc aagacaatcc ccagctgccg gatgagcacc    1440
ctggaaattc cagccatggc cttccacatg tttctgttcg gcagcaagaa aaccgagaag    1500
ctgatcgtgg acgtgcacaa ccggtacaag agactgttcc aggccatgca gaaagaagaa    1560
gtgaccgccg agaatatcgc cagcttcgga atcgccgaga gcgacctgcc tcagaagatc    1620
ctggatctga tcagcggcaa tgcccacggc aaggatgtgg acgccttcat cagactgacc    1680
gtggacgaca tgctgaccga caccgagcgg agaatcaaga gattcaagga cgaccggaag    1740
tccattcgga gcgccgacaa caagatggga agagaggct tcaagcagat ctccacaggc    1800
aagctggccg acttcctggc caaggacatc gtgctgtttc agcccagcgt gaacgatggc    1860
gagaacaaga tcaccggcct gaactaccgg atcatgcaga gcgccattgc cgtgtacgat    1920
agcggcgacg attacgaggc caagcagcag ttcaagctga tgttcgagaa ggcccggctg    1980
atcggcaagg gcacaacaga gcctcatcca tttctgtaca aggtgttcgc ccgcagcatc    2040
cccgccaatg ccgtcgagtt ctacgagcgc tacctgatcg agcggaagtt ctacctgacc    2100
ggcctgtcca cgagatcaa gaaaggcaac agagtggatg tgcccttcat ccggcgggac    2160
cagaacaagt ggaaaacacc cgccatgaag accctgggca gaatctacag cgaggatctg    2220
cccgtggaac tgcccagaca gatgttcgac aatgagatca gtccacct gaagtccctg    2280 ccacagatgg aaggcatcga cttcaacaat gccaacgtga cctatctgat cgccgagtac    2340
atgaagagag tgctggacga cgacttccag accttctacc agtggaaccg caactaccgg    2400
tacatggaca tgcttaaggg cgagtacgac agaaagggct ccctgcagca ctgcttcacc    2460
agcgtggaag agagagaagg cctctggaaa gagcgggcct ccagaacaga gcggtacaga    2520
aagcaggcca gcaacaagat ccgcagcaac cggcagatga aaacgccag cagcgaagag    2580 atcgagacaa tcctggataa gcggctgagc aacagccgga acgagtacca gaaaagcgag    2640
aaagtgatcc ggcgctacag agtgcaggat gccctgctgt ttctgctggc caaaaagacc    2700
ctgaccgaac tggccgattt cgacggcgag aggttcaaac tgaaagaaat catgcccgac    2760
gccgagaagg gaatcctgag cgagatcatg cccatgagct tcaccttcga gaaggcggc    2820 aagaagtaca ccatcaccag cgagggcatg aagctgaaga actacggcga cttctttgtg    2880
ctggctagcg acaagaggat cggcaacctg ctggaactcg tgggcagcga catcgtgtcc    2940
aaagaggata tcatggaaga gttcaacaaa tacgaccagt gcaggcccga gatcagctcc    3000
atcgtgttca acctggaaaa gtgggccttc gacacatacc ccgagctgtc tgccagagtg    3060
gaccgggaag agaaggtgga cttcaagagc atcctgaaaa tcctgctgaa caacaagaac    3120
atcaacaaag agcagagcga catcctgcgg aagatccgga acgccttcga tcacaacaat    3180
taccccgaca aaggcgtggt ggaaatcaag gccctgcctg agatcgccat gagcatcaag    3240
aaggcctttg gggagtacgc catcatgaag                                    3270
```

<210> SEQ ID NO 37
<211> LENGTH: 36
<212> TYPE: DNA
<213> ORGANISM: Artificial Sequence
<220> FEATURE:
<223> OTHER INFORMATION: Synthetic Polynucleoide
<220> FEATURE:

```
<221> NAME/KEY: misc_feature
<223> OTHER INFORMATION: Cas13b direct repeat

<400> SEQUENCE: 37
gttgtggaag gtccagtttt gaggggctat tacaac                                 36

<210> SEQ ID NO 38
<211> LENGTH: 321
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA1 expression cassette sequence

<400> SEQUENCE: 38
gagggcctat ttcccatgat tccttcatat ttgcatatac gatacaaggc tgttagagag        60
ataattggaa ttaatttgac tgtaaacaca aagatattag tacaaaatac gtgacgtaga       120
aagtaataat ttcttgggta gtttgcagtt ttaaaattat gttttaaaat ggactatcat       180
atgcttaccg taacttgaaa gtatttcgat ttcttggctt tatatatctt gtggaaagga       240
cgaaacaccg gcccttcgat tctgaaacca gatctgaatg ttgtggaagg tccagttttg       300
aggggctatt acaacttttt t                                                 321

<210> SEQ ID NO 39
<211> LENGTH: 321
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA2 expression cassette sequence

<400> SEQUENCE: 39
gagggcctat ttcccatgat tccttcatat ttgcatatac gatacaaggc tgttagagag        60
ataattggaa ttaatttgac tgtaaacaca aagatattag tacaaaatac gtgacgtaga       120
aagtaataat ttcttgggta gtttgcagtt ttaaaattat gttttaaaat ggactatcat       180
atgcttaccg taacttgaaa gtatttcgat ttcttggctt tatatatctt gtggaaagga       240
cgaaacaccg attctgaaac cagatctgaa tcctggactg ttgtggaagg tccagttttg       300
aggggctatt acaacttttt t                                                 321

<210> SEQ ID NO 40
<211> LENGTH: 322
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA3 expression cassette sequence

<400> SEQUENCE: 40
gagggcctat ttcccatgat tccttcatat ttgcatatac gatacaaggc tgttagagag        60
ataattggaa ttaatttgac tgtaaacaca aagatattag tacaaaatac gtgacgtaga       120
aagtaataat ttcttgggta gtttgcagtt ttaaaattat gttttaaaat ggactatcat       180
atgcttaccg taacttgaaa gtatttcgat ttcttggctt tatatatctt gtggaaagga       240
cgaaacaccg actccgggag gcccgtctct ctggccagct gttgtggaag gtccagtttt       300
```

-continued

```
gagggctat tacaactttt tt                                              322

<210> SEQ ID NO 41
<211> LENGTH: 321
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA4 expression cassette sequence

<400> SEQUENCE: 41
gagggcctat ttcccatgat tccttcatat ttgcatatac gatacaaggc tgttagagag     60
ataattggaa ttaatttgac tgtaaacaca aagatattag tacaaaatac gtgacgtaga   120
aagtaataat ttcttgggta gtttgcagtt ttaaaattat gttttaaaat ggactatcat   180
atgcttaccg taacttgaaa gtatttcgat ttcttggctt tatatatctt gtggaaagga   240
cgaaacaccg aggagcctga gggtgggaga gcgccccgtg ttgtggaagg tccagttttg   300
aggggctatt acaactttttt t                                            321

<210> SEQ ID NO 42
<211> LENGTH: 323
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA5 expression cassette sequence

<400> SEQUENCE: 42
gagggcctat ttcccatgat tccttcatat ttgcatatac gatacaaggc tgttagagag     60
ataattggaa ttaatttgac tgtaaacaca aagatattag tacaaaatac gtgacgtaga   120
aagtaataat ttcttgggta gtttgcagtt ttaaaattat gttttaaaat ggactatcat   180
atgcttaccg taacttgaaa gtatttcgat ttcttggctt tatatatctt gtggaaagga   240
cgaaacaccg cttttgcccg ggtgcggagg ccaccgagga ggttgtggaa ggtccagttt   300
tgagggctat tacaacttt ttt                                            323

<210> SEQ ID NO 43
<211> LENGTH: 323
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA6 expression cassette sequence

<400> SEQUENCE: 43
gagggcctat ttcccatgat tccttcatat ttgcatatac gatacaaggc tgttagagag     60
ataattggaa ttaatttgac tgtaaacaca aagatattag tacaaaatac gtgacgtaga   120
aagtaataat ttcttgggta gtttgcagtt ttaaaattat gttttaaaat ggactatcat   180
atgcttaccg taacttgaaa gtatttcgat ttcttggctt tatatatctt gtggaaagga   240
cgaaacaccg tctaggagag gttgcgcctg ctgcagaaac tgttgtggaa ggtccagttt   300
tgagggctat tacaacttt ttt                                            323
```

```
<210> SEQ ID NO 44
<211> LENGTH: 325
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA7 expression cassette sequence

<400> SEQUENCE: 44
gagggcctat ttcccatgat tccttcatat ttgcatatac gatacaaggc tgttagagag      60
ataattggaa ttaatttgac tgtaaacaca aagatattag tacaaaatac gtgacgtaga     120
aagtaataat ttcttgggta gtttgcagtt ttaaaattat gttttaaaat ggactatcat     180
atgcttaccg taacttgaaa gtatttcgat ttcttggctt tatatatctt gtggaaagga     240
cgaaacaccg tttctaggag aggttgcgcc tgctgcagaa actgttgtgg aaggtccagt     300
tttgaggggc tattacaact ttttt                                           325

<210> SEQ ID NO 45
<211> LENGTH: 322
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA8 expression cassette sequence

<400> SEQUENCE: 45
gagggcctat ttcccatgat tccttcatat ttgcatatac gatacaaggc tgttagagag      60
ataattggaa ttaatttgac tgtaaacaca aagatattag tacaaaatac gtgacgtaga     120
aagtaataat ttcttgggta gtttgcagtt ttaaaattat gttttaaaat ggactatcat     180
atgcttaccg taacttgaaa gtatttcgat ttcttggctt tatatatctt gtggaaagga     240
cgaaacaccg tggcagttct ccgcggtgtg gagtctctca gttgtggaag gtccagtttt     300
gaggggctat tacaactttt tt                                              322

<210> SEQ ID NO 46
<211> LENGTH: 321
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA9 expression cassette sequence

<400> SEQUENCE: 46
gagggcctat ttcccatgat tccttcatat ttgcatatac gatacaaggc tgttagagag      60
ataattggaa ttaatttgac tgtaaacaca aagatattag tacaaaatac gtgacgtaga     120
aagtaataat ttcttgggta gtttgcagtt ttaaaattat gttttaaaat ggactatcat     180
atgcttaccg taacttgaaa gtatttcgat ttcttggctt tatatatctt gtggaaagga     240
cgaaacaccg ttctccgcgg tgtggagtct ctcaccgggg ttgtggaagg tccagttttg     300
aggggctatt acaactttt t                                                321

<210> SEQ ID NO 47
<211> LENGTH: 321
<212> TYPE: DNA
<213> ORGANISM: Artificial Sequence
```

```
<220> FEATURE:
<223> OTHER INFORMATION: Synthetic Polynucleoide
<220> FEATURE:
<221> NAME/KEY: misc_feature
<223> OTHER INFORMATION: gRNA10 expression cassette sequence

<400> SEQUENCE: 47
gagggcctat ttcccatgat tccttcatat ttgcatatac gatacaaggc tgttagagag      60
ataattggaa ttaatttgac tgtaaacaca aagatattag tacaaaatac gtgacgtaga     120
aagtaataat ttcttgggta gtttgcagtt ttaaaattat gttttaaaat ggactatcat     180
atgcttaccg taacttgaaa gtatttcgat ttcttggctt tatatatctt gtggaaagga     240
cgaaacaccg aacaagggca cagagaggcc agcgagctcg ttgtggaagg tccagttttg     300 agggggctatt acaacttttt t                                              321

<210> SEQ ID NO 48
<211> LENGTH: 323
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA11 expression cassette sequence

<400> SEQUENCE: 48
gagggcctat ttcccatgat tccttcatat ttgcatatac gatacaaggc tgttagagag      60
ataattggaa ttaatttgac tgtaaacaca aagatattag tacaaaatac gtgacgtaga     120
aagtaataat ttcttgggta gtttgcagtt ttaaaattat gttttaaaat ggactatcat     180
atgcttaccg taacttgaaa gtatttcgat ttcttggctt tatatatctt gtggaaagga     240
cgaaacaccg acagcgtcgg aaggtggggg gagacattca ggttgtggaa ggtccagttt     300
tgaggggcta ttacaacttt ttt                                             323

<210> SEQ ID NO 49
<211> LENGTH: 30
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA12 sequence (control)

<400> SEQUENCE: 49
gcagggtttt cccagtcacg acgttgtaaa                                       30

<210> SEQ ID NO 50
<211> LENGTH: 322
<212> TYPE: DNA
<213> ORGANISM: Artificial Sequence
<220> FEATURE:
<223> OTHER INFORMATION: Synthetic Polynucleoide
<220> FEATURE:
<221> NAME/KEY: misc_feature
<223> OTHER INFORMATION: gRNA12 expression cassette sequence (control)

<400> SEQUENCE: 50
gagggcctat ttcccatgat tccttcatat ttgcatatac gatacaaggc tgttagagag      60
ataattggaa ttaatttgac tgtaaacaca aagatattag tacaaaatac gtgacgtaga     120
aagtaataat ttcttgggta gtttgcagtt ttaaaattat gttttaaaat ggactatcat     180
```

```
atgcttaccg taacttgaaa gtatttcgat ttcttggctt tatatatctt gtggaaagga      240
cgaaacaccg cagggttttc ccagtcacga cgttgtaaaa gttgtggaag gtccagtttt      300 gagggctat tacaacttttt tt                                               322
```

<210> SEQ ID NO 51
<211> LENGTH: 30
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA13 sequence

<400> SEQUENCE: 51

```
gccagaattt cacggaagaa caagggcaca                                        30
```

<210> SEQ ID NO 52
<211> LENGTH: 30
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA14 sequence

<400> SEQUENCE: 52

```
gctcccttgc acgtcagccg gggtgcgcac                                        30
```

<210> SEQ ID NO 53
<211> LENGTH: 30
<212> TYPE: DNA
<213> ORGANISM: Artificial
<220> FEATURE:
<223> OTHER INFORMATION: Synthetic Polynucleotide
<220> FEATURE:
<221> NAME/KEY: misc_feature
<223> OTHER INFORMATION: gRNA15 sequence

<400> SEQUENCE: 53

```
gaaaccagat ctgaatcctg gactccggga                                        30
```

<210> SEQ ID NO 54
<211> LENGTH: 30
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA16 sequence

<400> SEQUENCE: 54

```
gggtgcctgg cccttcgatt ctgaaaccag                                        30
```

<210> SEQ ID NO 55
<211> LENGTH: 30
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA 13 targeting site

<400> SEQUENCE: 55
tgtgcccttg ttcttccgtg aaattctggc					30

<210> SEQ ID NO 56
<211> LENGTH: 30
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA14 targeting site

<400> SEQUENCE: 56
gtgcgcaccc cggctgacgt gcaagggagc					30

<210> SEQ ID NO 57
<211> LENGTH: 30
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA15 targeting site

<400> SEQUENCE: 57
tcccggagtc caggattcag atctggtttc					30

<210> SEQ ID NO 58
<211> LENGTH: 30
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA16 targeting site

<400> SEQUENCE: 58
ctggtttcag aatcgaaggg ccaggcaccc					30

<210> SEQ ID NO 59
<211> LENGTH: 66
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA13 + Cas13b direct repeat

<400> SEQUENCE: 59
gccagaattt cacggaagaa caagggcaca gttgtggaag gtccagtttt gagggctat		60 tacaac										66

<210> SEQ ID NO 60
<211> LENGTH: 66
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA14 + Cas13b direct repeat

<400> SEQUENCE: 60
gctcccttgc acgtcagccg gggtgcgcac gttgtggaag gtccagtttt gagggctat		60

```
tacaac                                                              66

<210> SEQ ID NO 61
<211> LENGTH: 66
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA15 + Cas13b direct repeat

<400> SEQUENCE: 61
gaaaccagat ctgaatcctg gactccggga gttgtggaag gtccagtttt gaggggctat  60
tacaac                                                              66

<210> SEQ ID NO 62
<211> LENGTH: 66
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA16 + Cas13b direct repeat

<400> SEQUENCE: 62
gggtgcctgg cccttcgatt ctgaaaccag gttgtggaag gtccagtttt gaggggctat  60
tacaac                                                              66

<210> SEQ ID NO 63
<211> LENGTH: 321
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA13 expression cassette sequence

<400> SEQUENCE: 63
gagggcctat ttcccatgat tccttcatat ttgcatatac gatacaaggc tgttagagag  60
ataattggaa ttaatttgac tgtaaacaca aagatattag tacaaaatac gtgacgtaga 120
aagtaataat ttcttgggta gtttgcagtt ttaaaattat gttttaaaat ggactatcat 180
atgcttaccg taacttgaaa gtatttcgat ttcttggctt tatatatctt gtggaaagga 240
cgaaacaccg ccagaatttc acggaagaac aagggcacag ttgtggaagg tccagttttg 300
aggggctatt acaacttttt t                                            321

<210> SEQ ID NO 64
<211> LENGTH: 321
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA14 expression cassette sequence

<400> SEQUENCE: 64
gagggcctat ttcccatgat tccttcatat ttgcatatac gatacaaggc tgttagagag  60
ataattggaa ttaatttgac tgtaaacaca aagatattag tacaaaatac gtgacgtaga 120
aagtaataat ttcttgggta gtttgcagtt ttaaaattat gttttaaaat ggactatcat 180
```

```
atgcttaccg taacttgaaa gtatttcgat ttcttggctt tatatatctt gtggaaagga    240
cgaaacaccg ctcccttgca cgtcagccgg ggtgcgcacg ttgtggaagg tccagttttg    300
aggggctatt acaactttt t                                               321
```

```
<210> SEQ ID NO 65
<211> LENGTH: 321
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA15 expression cassette sequence

<400> SEQUENCE: 65
gagggcctat ttcccatgat tccttcatat ttgcatatac gatacaaggc tgttagagag     60
ataattggaa ttaatttgac tgtaaacaca aagatattag tacaaaatac gtgacgtaga   120
aagtaataat ttcttgggta gtttgcagtt ttaaaattat gttttaaaat ggactatcat   180
atgcttaccg taacttgaaa gtatttcgat ttcttggctt tatatatctt gtggaaagga   240
cgaaacaccg aaaccagatc tgaatcctgg actccgggag ttgtggaagg tccagttttg   300
aggggctatt acaactttt t                                              321
```

```
<210> SEQ ID NO 66
<211> LENGTH: 321
<212> TYPE: DNA
<213> ORGANISM: Artificial Sequence
<220> FEATURE:
<223> OTHER INFORMATION: Synthetic Polynucleotide
<220> FEATURE:
<221> NAME/KEY: misc_feature
<223> OTHER INFORMATION: gRNA16 expression cassette sequence

<400> SEQUENCE: 66
gagggcctat ttcccatgat tccttcatat ttgcatatac gatacaaggc tgttagagag     60
ataattggaa ttaatttgac tgtaaacaca aagatattag tacaaaatac gtgacgtaga   120
aagtaataat ttcttgggta gtttgcagtt ttaaaattat gttttaaaat ggactatcat   180
atgcttaccg taacttgaaa gtatttcgat ttcttggctt tatatatctt gtggaaagga   240
cgaaacaccg ggtgcctggc ccttcgattc tgaaaccagg ttgtggaagg tccagttttg   300
aggggctatt acaactttt t                                              321
```